(12) United States Patent
Kriegel et al.

(10) Patent No.: US 10,676,567 B2
(45) Date of Patent: Jun. 9, 2020

(54) POLY(ETHYLENEFURANOATE) COPOLYMERS AND METHODS

(71) Applicant: The Coca-Cola Company, Atlanta, GA (US)

(72) Inventors: Robert M. Kriegel, Decatur, GA (US); Yu Shi, Branchburg, NJ (US); Ronald D. Moffitt, Spartanburg, SC (US)

(73) Assignee: The Coca-Cola Company, Atlanta, GA (US)

( * ) Notice: Subject to any disclaimer, the term of this patent is extended or adjusted under 35 U.S.C. 154(b) by 655 days.

(21) Appl. No.: 14/475,488

(22) Filed: Sep. 2, 2014

(65) Prior Publication Data

US 2015/0064383 A1    Mar. 5, 2015

Related U.S. Application Data

(60) Provisional application No. 61/872,305, filed on Aug. 30, 2013, provisional application No. 61/872,310, filed on Aug. 30, 2013.

(51) Int. Cl.

| | |
|---|---|
| *C08G 63/80* | (2006.01) |
| *C08G 63/91* | (2006.01) |
| *B29C 49/12* | (2006.01) |
| *B29C 49/00* | (2006.01) |
| *B29D 22/00* | (2006.01) |
| *B29L 31/00* | (2006.01) |
| *B29K 67/00* | (2006.01) |
| *B29C 49/04* | (2006.01) |
| *B29C 49/06* | (2006.01) |

(52) U.S. Cl.
CPC ........ *C08G 63/916* (2013.01); *B29C 49/0005* (2013.01); *B29C 49/12* (2013.01); *B29D 22/003* (2013.01); *B29B 2911/14986* (2013.01); *B29C 49/04* (2013.01); *B29C 49/06* (2013.01); *B29K 2023/06* (2013.01); *B29K 2067/06* (2013.01); *B29L 2031/7158* (2013.01); *Y10T 428/1397* (2015.01)

(58) Field of Classification Search
CPC .... C08G 63/80; C08G 63/181; C08G 63/672; C08G 63/866; B29C 49/0005; B65D 1/00
USPC .................... 428/36.92, 34.1; 264/37.1, 540
See application file for complete search history.

(56) References Cited

U.S. PATENT DOCUMENTS

| | | | |
|---|---|---|---|
| 4,145,466 A | 3/1979 | Leslie et al. | |
| 9,527,954 B2* | 12/2016 | Sipos ................... | C08G 63/181 |
| 2006/0287441 A1 | 12/2006 | Miyama et al. | |

(Continued)

FOREIGN PATENT DOCUMENTS

| | | |
|---|---|---|
| JP | 2008-291243 | 12/2008 |
| WO | WO 2012/005647 | 1/2012 |

(Continued)

OTHER PUBLICATIONS

International Search Report from PCT Patent Application No. PCT/US2014/053755, dated Nov. 12, 2014.

(Continued)

*Primary Examiner* — Ellen S Hock
(74) *Attorney, Agent, or Firm* — King & Spalding

(57) ABSTRACT

The present invention relates to polyethylene furanoate (PEF) copolymers and methods for processing the same to provide PEF articles, as well as the articles so produced.

21 Claims, 4 Drawing Sheets

(56) References Cited

U.S. PATENT DOCUMENTS

2013/0216753 A1* 8/2013 Sequeira ............ B29B 17/0042
428/36.92

FOREIGN PATENT DOCUMENTS

| WO | WO 2013/007585 | 1/2013 |
| WO | WO 2013/028289 | 2/2013 |

OTHER PUBLICATIONS

Wordsmithy Open Happiness from a Renewable Bottle. E&E Exchange, 2012 <http://cr4.globalspec.com/blogentry/18979/Open-Happiness-from-a-Renewable-Bottles>.
European Search Report for European Patent Application No. 14840777.8, dated Mar. 13, 2017.

* cited by examiner

POLY(ETHYLENEFURANOATE) COPOLYMERS AND METHODS

CROSS REFERENCE TO RELATED APPLICATIONS

This non-provisional patent application claims the benefit of U.S. provisional application Ser. Nos. 61/872,310 and 61/872,305, both filed Aug. 30, 2013, both hereby incorporated by reference in their entirety.

FIELD OF THE ART

The present invention relates to polyethylene furanoate (PEF) copolymers and methods for processing the same to provide PEF preforms and articles (e.g., containers), as well as the preforms articles so produced.

BACKGROUND

Plastic containers are preferred for holding various products, such as beverages, because of their light weight and excellent impact resistance. These containers are often prepared by blow molding a thermoplastic preform in a blow mold. One commonly used thermoplastic resin is polyethylene terephthalate (PET), which has high transparency, good gas-barrier property, a light weight, excellent impact resistance and an appropriate rigidity. PET is manufactured from ethylene glycol and terephthalic acid.

Polyethylene furanoate (PEF) is manufactured from furan dicarboxylic acid (FDCA) and ethylene glycol. FDCA is produced from bio-based sugars. Although PEF is attractive for use in production of plastic containers, certain properties of PEF differ—impacting processing and container performance.

There remains a need for substantially bio-based polymers with properties optimized for their packaging applications.

BRIEF SUMMARY

The present invention is directed to a PEF copolymers, methods for processing the same to provide PEF preforms and articles (e.g., containers), as well as the preforms and articles formed by such methods. Advantageously, the PEF copolymers, preforms and articles of the present invention have one or more improved properties relative to unmodified (i.e., neat) PEF and articles formed therefrom.

In one aspect, the present invention is a PEF copolymer comprising PEF and at least one chain architecture modifying agent.

In one embodiment, the chain architecture modifying agent has a reactive functionality of greater than two (F>2), more particularly, three or more (F=3, F>3).

In another embodiment, the chain architecture modifying agent has a reactive functionality of four (F=4) or more (F>4).

In a further embodiment, the present invention is a PEF copolymer comprising PEF and at least two chain architecture modifying agents, wherein the chain architecture modifying agents each have a reactive functionality of four (F=4).

In a still further embodiment, the present invention is a PEF copolymer comprising PEF and two chain architecture modifying agents, wherein the chain architecture modifying agents have a reactive functionality of four (F=4).

In exemplary embodiments, the present invention is a PEF copolymer comprising PEF and at least one chain architecture modifying agent, wherein the at least one chain architecture modifying agent is selected from pryomellitic dianhydride (PMDA), pentaerythritol (PENTA) and combinations thereof.

In exemplary embodiments, the present invention is a PEF copolymer comprising PEF, PMDA and PENTA.

In exemplary embodiments, the present invention is a PEF copolymer comprising PEF and at least one chain architecture modifying agent, wherein the chain architecture modifying agent is selected from an electron-deficient alkene compound or an electron-deficient multialkene compound.

In exemplary embodiments, the present invention is a PEF copolymer comprising PEF and at least one chain architecture modifying agent, wherein the at least one chain architecture modifying agent is an electron-deficient alkene selected from dimethyl maleate, maleic acid, acrylates, acrylic acid, and halogenated alkyl-substituted alkenes and combinations thereof.

In exemplary embodiments, the present invention is a PEF copolymer comprising PEF and at least one the chain architecture modifying agent, wherein the at least one chain architecture modifying agent is an electron-deficient multialkene selected from a multimaleamide, a multiacrylate, a bisnitroalkene, an amide-substituted alkene, an imide-substituted alkene, a haloalkyl-substituted alkene and combinations thereof.

In exemplary embodiments, the present invention is a PEF copolymer comprising PEF and at least one chain architecture modifying agent, wherein the at least one chain architecture modifying agent is selected from a multianhydride, a multioxazoline, a multiepoxide, a multilactone and combinations thereof.

In exemplary embodiments, the present invention is a PEF copolymer comprising PEF and at least one chain architecture modifying agent, wherein the at least one chain architecture modifying agent is a multianhydride selected from a dianhydride, trianhydride, tetraanhydride, pentaanhydride, a hexaanhydride compound and combinations thereof.

In exemplary embodiments, the present invention is a PEF copolymer comprising PEF and at least one chain architecture modifying agent, wherein the at least one chain architecture modifying agent is a multioxazoline selected from a dioxazoline, trioxazoline, tetraoxazoline, pentaoxazoline, a hexaoxazoline compound and combinations thereof.

In exemplary embodiments, the present invention is a PEF copolymer comprising PEF and at least one chain architecture modifying agent, wherein the at least one chain architecture modifying agent is a multiepoxide selected from a diepoxide, triepoxide, tetraepoxide, pentaepoxide, hexaepoxide compound and combinations thereof.

The weight percentage of the at least one chain architecture modifying agent may vary. In one embodiment, the weight percentage of the chain architecture modifying agent is from about 0.010 to about 1.0%, about 0.01 to about 0.90%, about 0.010 to about 0.80%, about 0.010 to about 0.70%, about 0.010 to about 0.60%, about 0.010 to about 0.60%, about 0.010 to about 0.50%, about 0.010 to about 0.40%, about 0.010 to about 0.30%, about 0.010 to about 0.20%, or about 0.010 to about 0.10%.

In exemplary embodiments, the weight percentage of the at least one chain architecture modifying agent is from about 0.010 to about 1.0%, about 0.010 to about 0.50%, about 0.010 to about 0.45%, about 0.010 to about 0.25%, about 0.010 to about 0.20%, about 0.010 to about 0.12%.

In exemplary embodiments, the weight percentage of the at least one chain architecture modifying agent is from about 0.025 to about 0.20%, about 0.025 to about 0.15%, or about 0.025 to about 0.125%.

In exemplary embodiments, the present invention is a PEF copolymer comprising PEF and PMDA, wherein the weight percentage of PMDA in the copolymer is about 0.01 to about 1.0, about 0.01 to about 0.50%, about 0.010 to about 0.20%, about 0.025 to about 2.0, or about 0.025 to about 0.125%.

In a preferred embodiment, the weight percent of PMDA in the PEF copolymer if about 0.1 to about 0.9%, or more particularly, about 0.025 to about 0.9%.

In exemplary embodiments, the present invention is a PEF copolymer comprising PEF and PENTA, wherein the weight percentage of PENTA in the copolymer is about 0.010 to about 0.45%, about 0.10 to about 0.30%, about 0.010 to about 0.25%, about 0.010 to about 0.12%, about 0.015 to about 0.20%, or about 0.015 to about 0.122%.

In a preferred embodiment, the weight percentage of PENTA in the PEF copolymer is between about 0.010 to about 0.30%.

In exemplary embodiments, the present invention is a PEF copolymer comprising PEF, PMDA and PENTA, wherein the weight percentage of PENTA is about 0.9 or less and the weight percentage of PENTA is about 0.3 or less.

The mole percent of the at least one chain architecture modifying agent may vary. In one embodiment, the mole percent of the chain architecture modifying agent is from about 1 to about 200,000 ppm, about 1 to about 10,000 ppm, about 25 to about 10,000 ppm, about 200 to about 800 ppm, or about 300 to about 500 ppm.

In embodiments where the PEF copolymer comprises two chain architecture modifying agents, wherein the mole ratio of the two chain architecture modifying agents may be from about 1:1 to about 1:9, and more particularly, about 1:9, about 1:8, about 1:7, about 1:6, about 1:5, about 1:4, about 1:3, about 1:2, or about 1:1.

In exemplary embodiments, the present invention is a PEF copolymer comprising PEF, PMDA and PENTA, wherein the mole ratio of PENTA to PMDA is about 1:1.

The PEF copolymer of the present invention has one or more improved physical properties in resin form relative to unmodified (i.e., neat) PEF in resin form, wherein the improved physical property is selected from increased number average molecular weight ($M_n$), increased weight average molecular weight ($M_w$), increased entanglement density, decreased entanglement molecular weight ($M_e$), increased shear viscosity, increased melt strength, relaxation time ratio, primary relaxation time and combinations thereof.

The number average molecular weight of the PEF copolymer may vary, but in certain embodiments is increased relative to unmodified PEF. In one embodiment, the PEF copolymer has a number average molecular weight that is about 10 to about 60%, about 20 to about 70%, about 30 to about 80%, about 40 to about 90%, or about 50 to 100% more than the number average molecular weight of unmodified PEF.

In another embodiment, the PEF copolymer has a number average molecular weight that is about 10%, about 20%, about 30%, about 40%, about 50%, about 60%, about 70%, about 80%, about 90%, or about 100% or more than the number average molecular weight of unmodified PEF.

In exemplary embodiments, the present invention is a PEF copolymer having a number average molecular weight of between about 30,000 and about 100,000 daltons (Da), or about 35,000 and about 90,000 Da.

In exemplary embodiments, the present invention is a PEF copolymer comprising PEF and PDMA, wherein the PEF copolymer has a number average molecular weight between about 39,000 and about 85,000 Da.

The weight average molecular weight of the PEF copolymer may vary, but in certain embodiments is increased relative to unmodified PEF In one embodiment, the PEF copolymer has a weight average molecular weight that is about 5, about 10, about 20, about 30, about 40, about 50, about 60, about 70, about 80, about 90 or about 100% or more than the number average molecular weight of unmodified PEF.

In exemplary embodiments, the PEF copolymer has weight average molecular weight ($M_w$), of between about 50,000 and about 180,000 Da, about 55,000 and about 140,000 Da, about 60,000 and about 120,000 Da.

In a preferred embodiment, the present invention is a PEF copolymer comprising PEF and PMDA, wherein the PEF copolymer has a weight average molecular weight of about 55,000 to about 120,000.

The entanglement density of the PEF copolymer may vary, but in certain embodiments is increased relative to unmodified PEF and/or amorphous PET. In one embodiment, the PEF copolymer has an entanglement density that is about 5, about 10, about 20, about 30, about 40, about 50, about 60, about 70, about 80, about 90, about 100% or more than the entanglement density of unmodified PEF.

In exemplary embodiments, the present invention is a PEF copolymer having an entanglement density that is about 10 to about 40%, about 20 to about 50%, about 30 to about 60%, about 40 to about 70%, about 50 to about 80%, about 60 to about 90%, or about 70 to about 100% more than the entanglement density of unmodified PEF.

In one embodiment, the PEF copolymer has a entanglement density that is about 50, about 55, about 60, about 65, about 70, about 75, about 80, about 85 about 90%, about 100% or more than the entanglement density of amorphous PET.

In exemplary embodiments, the present invention is a PEF copolymer having an entanglement density that is about 10 to about 40%, about 20 to about 50%, about 30 to about 60%, about 40 to about 70%, about 50 to about 80%, about 60 to about 90%, or about 70 to about 100%, more than the entanglement density of amorphous PET.

In exemplary embodiments, the PEF copolymer has an entanglement density of about 0.13 to about 6.7, about 0.30 to about 4, about 0.34 to about 4, or about 3.4 to about 0.45 mmol/cm$^3$.

In exemplary embodiments, the PEF copolymer has an entanglement density at least about 0.382, at least about 0.40, at least about 0.42, at least about 0.44, at least about 0.46, at least about 0.48, at least about 0.50, at least about 0.60, at least about 0.70, at least about 0.80, at least about 0.90, at least about 1.0, or at least about 1.1 mmol/cm$^3$.

In exemplary embodiments, the present invention is a PEF copolymer comprising PEF and PMDA, wherein the PEF copolymer resin has an entanglement density of between about 0.3 and about 0.4, or more particularly, at least about 0.42 mmol/cm$^3$.

The entanglement molecular weight of the PEF copolymer may vary, but in certain embodiments is decreased relative to unmodified PEF. In one embodiment, the PEF copolymer has an entanglement molecular weight that is about 5, about 10, about 20, about 30, about 40, about 50, about 60, about 70, about 80, or about 90 less than the entanglement molecular weight of unmodified PEF.

In exemplary embodiments, the present invention is a PEF copolymer having an entanglement molecular weight that is about 10 to about 30%, about 20 to about 40%, about 30 to about 50%, about 40 to about 60%, or about 50 to about 60% less than the entanglement molecular weight of unmodified PEF.

In exemplary embodiments, the PEF copolymer has an entanglement molecular weight in the range of about 1,500 to about 3,600 g/mol, about 1,600 to about 3,500 g/mol, about 1,700 to about 3,400 g/mol, about 1,800 to about 3,300 g/mol, about 1,900 to about 3,100 g/mol, about 2,000 to about 3,000 g/mol, about 2,100 to about 2,800 g/mol, about 2,200 to about 2,700 g/mol, about 2,300 to about 2,600 g/mol or about 2,400 to about 2,500 g/ml.

In exemplary embodiments, the PEF copolymer has an entanglement molecular weight of about 1,600 to 3,000.

The zero sheer viscosity of the PEF copolymer may vary, but in certain embodiments is increased relative to unmodified PEF. In one embodiment, the zero sheer viscosity of the PEF copolymer is about 1 to about 5×, about 5 to about 10×, about 10 to about 20× the zero sheer viscosity of unmodified PEF.

In exemplary embodiments, the zero sheer viscosity of the PEF copolymer is about 10× the zero sheer viscosity of unmodified PEF.

In exemplary embodiments, the zero sheer viscosity of the PEF copolymer is about 10× the zero sheer viscosity of unmodified PEF.

In exemplary embodiments, the PEF copolymer has a zero shear viscosity that is about 5, about 10, about 25, about 50, about 75, about 100, about 125, about 150, about 175, about 200, about 225, about 250, about 275, about 300, about 325, or about 350% or more than the zero shear viscosity of unmodified PEF.

In exemplary embodiments, the PEF copolymer has a zero shear viscosity that is between about 6 and about 325% more than the zero shear viscosity of unmodified PEF.

In exemplary embodiments, the zero shear viscosity of the PEF copolymer at 230-280° C. is between about 2,000 and about 125,000 Pa·s, about 8,000 and about 90,000 Pa·s, about 10,000 and about 80,000 Pa·s, about 20,000 and about 70,000 Pa·s, about 30,000 and about 60,000 Pa·s, or about 40,000 and about 50,000 Pa·s.

The melt strength of the PEF copolymer may vary, but is increased relative to unmodified PEF. In one embodiment, the melt strength of the PEF copolymer is about 1 to about 5×, about 5 to about 10×, about 10 to about 20× the melt strength of unmodified PEF.

In exemplary embodiments, the melt strength of the PEF copolymer is about 10× the melt strength of unmodified PEF.

In exemplary embodiments, the melt strength of the PEF copolymer is about 10× the melt strength of unmodified PEF.

In exemplary embodiments, the melt strength of the PEF copolymer is about 5, about 10, about 25, about 50, about 75, about 100, about 125, about 150, about 175, about 200, about 225, about 250, about 300, about 325, or about 350% greater than an unmodified PEF resin.

The primary relaxation time of the PEF copolymer may vary, but in certain embodiments is increased relative to unmodified PEF. In exemplary embodiments, the primary relaxation time of the PEF copolymer is between about 1.25× and about 200×. In exemplary embodiments, the PEF copolymer has a primary relaxation time that is about 1× to about 10×, about 10× to about 50×, about 50× to about 100×, about 100× to about 150×, about 150× to about 200× than the primary relaxation time of unmodified PEF.

In exemplary embodiments, the PEF copolymer has a primary relaxation time of at least about 50 s at about 230° C.

In exemplary embodiments, the PEF copolymer has a relaxation time ratio of at least about 90, at least about 100, at least about 250, at least about 300, at least about 500, at least about 800, at least about 1000, at least about 10,000, at least about 50,000, at least about 100,000 or at least about 150,000. In a second aspect, the present invention is a method of processing the PEF copolymer resin disclosed herein to provide a preform or container (e.g., a bottle).

In one embodiment, the present invention is a method of processing the PEF copolymer to provide a PEF preform.

In exemplary embodiments, the present invention is a method of providing a PEF preform, comprising (i) providing the PEF copolymer in a suitable form (e.g., a pellet); (ii) heating the PET copolymer to provide an amorphous PEF copolymer melt; and (iii) injecting the amorphous PEF copolymer melt into a mold, to provide a PEF preform.

In another embodiment, the present invention is a method of processing the PEF copolymer to provide a PEF container (e.g., a bottle). In one embodiment, the PEF copolymer is processed by extrusion blow molding to provide a PEF container (e.g, a bottle). The extrusion blow molding method may be continuous or intermittent.

In exemplary embodiments, the present invention is a method of producing a PEF container, comprising: (i) providing a parison comprising the PEF copolymer; (ii) extruding the parson; (iii) clamping the parison within a mold; (iv) inflating the parison to form a PEF container; and (v) opening the mold to remove the PEF container.

In another embodiment, the parison has a parison sag ratio of less than about 1.5, about 1.4, about 1.3, about 1.2, about 1.1 or about 1.0.

In a further embodiment, the parison has about 5%, about 10%, about 25%, about 50%, about 75% or about 100% less sag that a parison made from unmodified PEF.

In another embodiment, the PEF copolymer is processed by injection stretch blow molding to provide a PEF container (e.g., a bottle). The injection stretch blow molding may be single stage or two stage (i.e., reheat injection stretch blow molding).

In exemplary embodiments, the present invention is a method of producing a PEF container; comprising (i) providing the PEF copolymer in a suitable form (e.g., a pellet); (ii) heating the PET copolymer to provide an amorphous melt; (iii) injecting the amorphous melt into a mold, to provide a preform; and (iv) biaxially stretching the preform by means of a stretch rod and pressurized air, thereby producing a PEF container.

In exemplary embodiments, the present invention is a method of producing a PEF container, comprising (i) providing a preform comprising the PEF copolymer; (ii) heating the preform to a temperature suitable for stretching; and (iii) biaxially stretching the preform by means of a stretch rod and pressurized air, thereby producing a PEF container.

In a third aspect, the present invention is a PEF preform formed by processing the PEF copolymer resin disclosed herein.

In a fourth aspect, the present invention is a PEF article formed by processing the PEF copolymer sin disclosed herein.

In one embodiment, the PEF article is a container, or more particularly, a food or beverage container (e.g., a bottle).

In exemplary embodiments, the PEF container has one or more improved performance properties relative to a similar container made from PET and/or unmodified (i.e., neat) PEF.

In exemplary embodiments, the present invention is a PEF container having reduced creep relative to a similar container formed from PET or unmodified PEF, and more particularly, about 1% less, about 3% less, about 4%, about 5% less, about 10% less, about 15% less, about 20% less, about 25% less, about 30% less, about 35% less, about 40% less, about 45% less or about 50% or less creep.

In exemplary embodiments, the present invention is a the present invention is a PEF container (e.g., an extrusion blow molded or stretch blow molded container) having extended shelf life relative to a similar container formed from PET or unmodified PEF, and more particularly, at least about 25% more or at least about 50% more shelf life.

In exemplary embodiments, the present invention is a container ((e.g., an extrusion blow molded or stretch blow molded container) formed from the PEF copolymer having a shelf life of about 8, about 10, about 12, about 14, about 16, about 18 or about 20 weeks or greater. In a particular embodiment, the container has a shelf life of about 20 weeks, about 30 weeks, about 40 weeks or about 50 weeks or longer.

FIGURES

Figure 3:
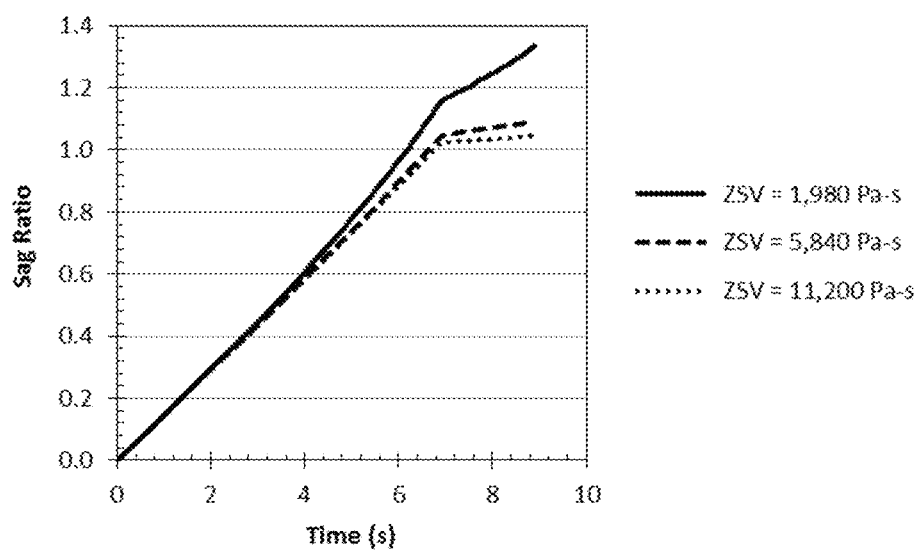

FIG. 3 shows a graph of Parison sag ratio as a function of time for various values of the zero-shear viscosity (ZSV), $\eta_0$ for neat (solid line) and modified (broken lines) PEF at 250° C. Assumed processing conditions for model calculation are: extrusion rate=2.00 g/s, parison crossection area=2.00 cm$^2$, preform extruded length=5.50 cm, preform hang time=2.00 s. Conditions conform to a bottle mass of 13.8 g.

Figure 4:
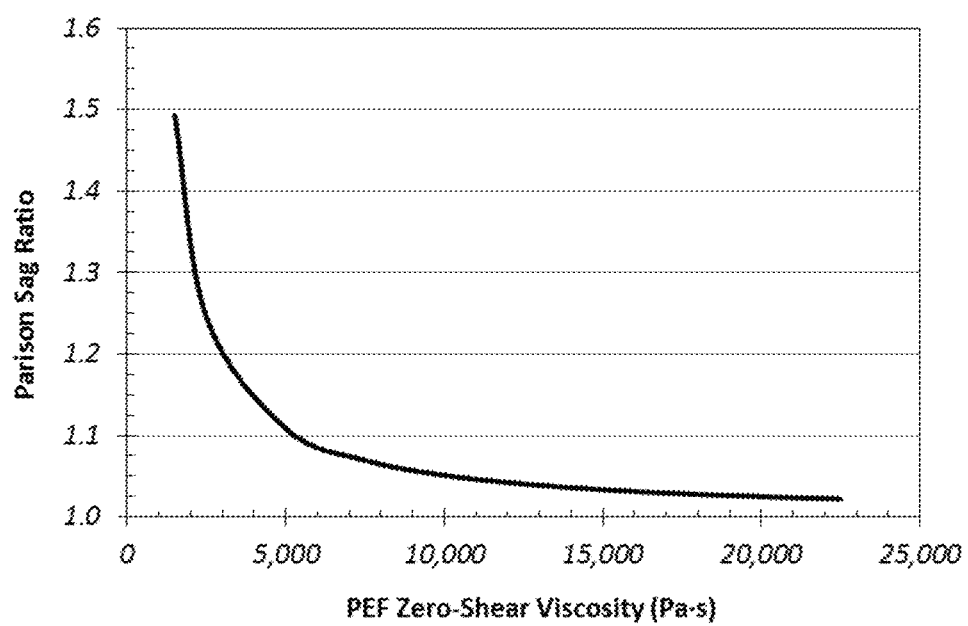

FIG. 4 shows a graph of effect of PEF zero-shear viscosity on parsion sag ratio based upon model calculations.

DETAILED DESCRIPTION

Copolymers useful in the manufacture of plastic articles such as packaging materials (e.g., containers) and that are prepared substantially from bio-based feedstocks are described herein. The exemplary copolymers exhibit advantageous physical properties which render them suitable for use in forming molded articles, such as bottles. In particular, the copolymers described here exhibit advantageous physical properties which render them suitable for processing into plastic articles (e.g., preforms, containers), while the articles so formed also exhibit advantageous properties. In certain embodiment, the copolymers have high melt strength relative to unmodified PEF, making them suitable for use in extrusion blow molding and other processes that require high melt strength.

The copolymers disclosed herein are formed from the reaction of PEF with at least one chain architecture modifying agents, such as branching agents or chain extenders. The chain architecture modifying agents have a reactive functionality of at least two and preferably, four. Process of preparing the copolymers and methods of processing such copolymers are disclosed herein, as well as articles formed therefrom—including preforms and articles, such as packing articles including but not limited to containers (e.g., bottles).

Definitions

As used herein, the terms "polymer," "polymers," "polymeric," and similar terms are used in their ordinary sense as understood by one skilled in the art, and thus may be used herein to refer to or describe a large molecule (or group of such molecules) that contains recurring units. Polymers may be formed in various ways, including by polymerizing monomers and/or by chemically modifying one or more recurring units of a precursor polymer. A polymer may be a "homopolymer" comprising substantially identical recurring units formed by, e.g., polymerizing a particular monomer. A polymer may also be a "copolymer" comprising two or more different recurring units formed by, e.g., copolymerizing two or more different monomers, and/or by chemically modifying one or more recurring units of a precursor polymer. The term "terpolymer" may be used herein to refer to polymers containing three or more different recurring units.

Whenever a range is presented herein it should be understood to include each element of the range. For example, the range "$C_1$ to $C_4$" alkyl independently includes $C_1$, $C_2$, $C_3$ and $C_4$ alkyl groups. When such a range is stated, each element has been contemplated and the range is used merely for convenience.

Generally, while the polymers, compositions and processes are described in terms of "comprising" various components or steps, the polymers, compositions and processes can also "consist essentially of" or "consist of" the various components and steps.

The term "alkyl" is used herein, unless otherwise specified, refers to a saturated straight, branched, primary, secondary, or tertiary hydrocarbon, including but not limited to those of $C_1$ to $C_8$. Illustrative examples of alkyl groups are methyl, ethyl, propyl, isopropyl, butyl, secbutyl, isobutyl, tertbutyl, 1-methylbutyl, 1,1-dimethylpropyl, pentyl, isopentyl, neopentyl, hexyl, and isohexyl.

The term "cycloalkyl," unless otherwise specified refers to a carbon based non-aromatic ring or ring system, but not limited to those of $C_3$ to $C_{15}$. It may contain from 1 to 4 rings, which are fused. Illustrative examples of cycloalkyl groups are for example cyclopropyl, cyclobutyl, cyclopentyl, cyclohexyl, cycloheptyl and cyclooctyl.

The term "heterocycloalkyl" refers to a $C_3$ to $C_{15}$ cycloalkyl group (nonaromatic) in which one of the carbon atoms in the ring is replaced by a heteroatom selected from O, S or N, and in which up to three additional carbon atoms may be replaced by heteroatoms.

The term "aryl," unless otherwise specified, refers to a $C_6$ to $C_{32}$ carbon based aromatic ring, including phenyl, naphthyl, phenanthryl, and anthracyl.

Any of the alkyl, cycloalkyl, aryl, alkenyl, or heterocycloalkyl groups may be substituted or unsubstituted. Unless otherwise specified, the each of these groups may be independently substituted with one or more moieties selected from the group consisting of alkyl, cycloalkyl, halo, haloalkyl, hydroxyl, carboxyl, acyl, acyloxy, amino, amido, alkylamino, dialkylamino, arylamino, alkoxy, aryloxy, nitro, cyano, thio, sulfonyl, sulfonic acid, ester, ether, carboxylic acid, phosphonyl, phosphinyl, thioether, oxime, aryl, heteroaryl, heterocycloalkyl, or any other viable functional group, either unprotected, or protected as necessary, as known to those skilled in the art, for example, as taught in Greene, et al., *Protective Groups in Organic Synthesis*, John Wiley and Sons, Second Edition, 1991. Halogen and "halo", as used herein, includes bromine, chlorine, fluorine and iodine.

The term "entanglement density" as used herein refers to the number of chain entanglements in a given volume or amount of polymer and is proportional to the plateau modulus for the polymer at a given temperature. The concept of chain entanglement density may be understood by considering the definitions provided herein for chain entanglement, physical network and entanglement network. These definitions correspond to those provided by the International Union of Pure and Applied Chemistry (IUPAC), as given in the IUPAC reference document PAC, 2007, 79, 1801 (Definitions of terms relating to the structure and processing of sols, gels, networks, and inorganic-organic hybrid materials," (IUPAC Recommendations 2007) doi: 10.1351/pac200779101801.)

The term "chain entanglement" as used herein refers to the interlocking of polymer chains in a polymer material forming a transient or permanent network junction over the time-scale of the measurement.

The term "physical network" as used herein refers to a polymer network with junction points or zones formed by physically interacting chains which need not be permanent: (1) the junction points or zones need not be permanent over the time scale of the observation or measurement, (2) the interaction can be due to hydrogen bonds, π-π interactions, chain entanglements, etc., and (3) modification of the entry given as a note within the definition of network in polymer chemistry.

The term "entanglement network" as used herein refers to a polymer network with junction points or zones formed by physically entangled chains.

The term "number average molecular weight" ($M_n$) as used herein is the ordinary arithmetic mean or average of the molecular masses of the individual macromolecules. It is determined by measuring the molecular mass of n polymer molecules, summing the masses, and dividing by n.

$$\overline{M}_n = \frac{\sum_i N_i M_i}{\sum_i N_i}$$

The number average molecular mass of a polymer can be determined by gel permeation chromatography, viscometry via the (Mark-Houwink equation), colligative methods such as vapor pressure osmometry, end-group determination or proton NMR.

The term "weight average molecular weight" ($M_w$) as used herein describes the molecular mass of a polymer. Polymer molecules, even if of the same type, come in different sizes (chain lengths, for linear polymers), so it is necessary to take an average of some kind. For the mass average molecular mass, this is calculated by $$\overline{M}_w = \frac{\sum_i N_i M_i^2}{\sum_i N_i M_i}$$

where $N_i$ is the number of molecules of molecular mass $M_i$.

If the mass average molecular mass is m, and one chooses a random monomer, then the polymer it belongs to will have a mass of m on average (for a homopolymer). The mass average molecular mass can be determined by static light scattering, small angle neutron scattering, X-ray scattering, and sedimentation velocity. The ratio of the mass average to the number average is called the dispersity or the polydispersity index.

The term "entanglement molecular weight (Me) as used herein means as used herein refers to the molecular weight of a chain segment between two nearest junction points in an entanglement network or physical network as described above.

The term "zero sheer viscosity" as used herein means the viscosity at the limit of low shear rate. In other words, the maximum plateau value attained as shear stress or shear rate is reduced. Zero-shear viscosity is effectively the viscosity of a product whilst at rest.

The term "creep" as used herein means the tendency of a solid material to move slowly or deform permanently under the influence of mechanical stresses. It can occur as a result of long-term exposure to high levels of stress that are still below the yield strength of the material. Plastic products are said to show a "creep behavior" where the product is deformed at room temperature as time elapses when an external force is applied continuously. Creep resistance, corresponding, refers to the a material's ability to resist any kind of distortion when under a load over an extended period of time.

Creep testing entails applying a small constant stress to a sample and monitoring its deformation over time. When a viscoelastic material is subjected to a creep test the initial stage of the test is dominated by elastic, recoverable deformation. As the test progresses the sample reaches an elastic equilibrium and only residual viscous non-recoverable flow persists. From the gradient of the strain/time plot in the later viscous-flow stage of the test zero-shear viscosity can be calculated. By extrapolating the straight-line regression from this part of the curve to an intercept on the strain axis it is possible to obtain the equilibrium elastic strain obtained from the sample—the maximum elastic recoverable strain under the specific imposed stress. Strain values can be divided by the applied stresses to obtain compliance, (symbol: J(t)), useful for where differing stresses are employed and the results are to be overlaid.

The term "relaxation" as used herein means a time constant describing the rate of relaxation of stresses in a material (e.g. a viscoelastic fluid) that has been deformed to a defined strain.

The term "melt strength" (MS) refers to the resistance of polymer melt to deformation is under the given set of conditions. The melt strength of a polymer indicates the resistance of a melt to extension, or sag. A variety of methods have been developed to measure melt strength as it applies to practical extrusion. The main one has been the Goettfert Rheotens device where a molten extrudate or fiber strand is pulled between two powered rollers as it leaves a downward-extruding orifice. As the speed of the rollers is increased, tension is created in the strand, which is measured by the Rheotens device. The loss modulus (G") and storage modulus (G') crossover as measured on an oscillatory rheometer has become useful for estimating melt strength.

The term "relaxation time" refers to the rate of relaxation of stresses in a material (e.g. a viscoelastic fluid) that has been deformed to a defined strain.

The term "viscosity" refers to the resistance to flow of a material. Viscosity is reported in units of Pa·s (Pascal·second).

The term "chain architecture modifying agent" refers to a compound with functional groups capable of additional reactions with the terminal groups of a polyester resin, e.g., hydroxyl or carboxyl groups. These functional groups reacts with the terminal groups, resulting in chain extension or branching.

The term "hot-fill" refers to a container where the contents of the container are at an elevated temperature when introduced into the container.

Copolymers

The copolymers of the present invention are copolymers of poly(ethylenefuranoate) or PEF, a polymer manufactured from furan dicarboxylic acid (FDCA) and ethylene glycol.

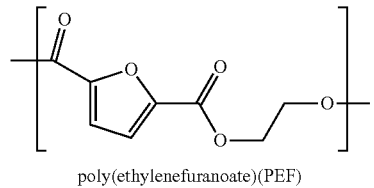

poly(ethylenefuranoate)(PEF)

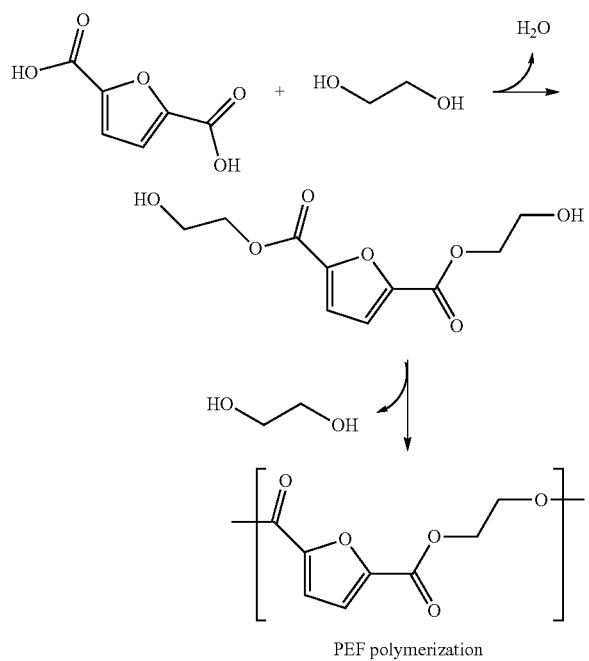

PEF polymerization

FDCA is produced from bio-based sugars, making PEF a renewable, sustainable bio-based polymer. PEF is structurally similar to polyethylene terephthalate (PET), but significantly different properties than PET—making it attractive for use in the manufacture of plastic articles, such as plastic packaging (e.g., bottles). The properties of PEF are shown in Table 1, below.

TABLE 1

Properties of PEF

| Property | Value | Units |
|---|---|---|
| Repeat unit Formula Weight | 192 | g/mol |
| Glass Transition | 85-90 | ° C. |
| Melting Range | 210-235 | ° C. |
| Amorphous Density | 1.44 | g/mL |
| Crystalline Density | | g/mL |
| Entanglement Molecular Weight | 3,545 | g/mol |
| Amorphous Entanglement Density | $4.06 \times 10^{-4}$ | mol/cm$^3$ |
| CO$_2$ barrier | 3-6x PET | |
| O$_2$ Barrier | 11x PET | |
| H$_2$O barrier | 2.5x PET | |

In exemplary embodiments, the present invention is a copolymer formed from the reaction of poly(ethylenefuranoate) (PEF) and at least one chain architecture modifying agents. In exemplary embodiments, the copolymers have increased branching, compared to PEF.

In exemplary embodiments, the PEF used to form the copolymers is any source of poly(ethylenefuranoate), for PEF formed from 2,5-dimethyl furanoate. In exemplary embodiments, the PEF used to form the copolymers described herein has an inherent viscosity (IV) in the range of about 0.6 to about 1.5. In exemplary embodiments, the PEF used to form the copolymers described herein has an average molecular weight in the range of about 5,000 to about 1,000,000. In exemplary embodiments, is obtained or prepared from a plant-derived raw material or biomass. In exemplary embodiments, the PEF, or the dimethyl-2,5-furanoate used to prepare the PEF, is obtained or prepared from fructose or glucose. In exemplary embodiments, the PEF, or the dimethyl-2,5-furanoate used to prepare the PEF, is prepared from 2,5-furandicarboxylic acid, which is prepared from 5-hydroxymethylfurfural, which is obtained from the dehydration of fructose or glucose. In exemplary embodiments, the PEF used to form the copolymers may be a blend of PEF with any suitable polymer or combinations of polymers, for example a PEF blend containing at least about 80%, at least about 90%, or at least about 95% PEF. In exemplary embodiments, the PEF is substantially free of bisphenol A and related compounds.

In exemplary embodiments, the ethylene glycol component of the polymer may be replaced (at least partially) with a non-ethylene glycol diol, i.e., an alternative diol. In exemplary embodiments, the PEF copolymer has less than about 20% ethylene glycol replacement/modification In alternative embodiments, the copolymer of the present invention is an FDCA-based copolymer, i.e., comprises FDCA and at least one diol, for example, at least one bio-based diol.

In exemplary embodiments, the FDCA component may be replaced (at least partially) with a non-FDCA diacid, i.e., an alternative diacid. Alternatively, the ethylene glycol and/or FDCA component of the polymer may be (at least partially) modified. In exemplary embodiments, the PEF copolymer has less than about 20% FDCA replacement/modification.

The at least one chain architecture modifying agent may be any suitable chain architecture modifying agent. In a particular embodiment, the PEF copolymer comprises two or more chain architecture modifying agents. In exemplary embodiments, the PEF copolymer comprises three or more chain architecture modifying agents. The chain architecture modifying agents may be added to PEF either directly, or in a carrier, as described further below.

In exemplary embodiments, the chain architecture modifying agent has a reactive functionality of at least two (F=2 or >2). In a particular embodiment, the chain architecture modifying agent has a reactive functionality of two (F=2), three (F=3), four (F=4) or greater than four (e.g., F=5, F=6).

The effect of functionality on the chain length and degree of branching is shown in the equation:

$$x_n = \frac{2}{2 - p f_{av}}$$

Were p is the extent of the reaction, xn is the degree of polymerization, and fav is the average functionality. P and fav are defined in terms of number of moles of reactants as follows:

$$p = \frac{2(N_0 - N)}{N_0 * f_{av}}$$

$$f_{av} = \frac{f_A N_A + f_B N_B + f_C N_C}{N_A + N_B + N_C}$$

Where No is the starting total moles of reactive functional groups and N is the total number of functional groups reacted. $N_A$, $N_B$, and $N_C$ are the number of moles of monomers A, B, and C respectively and $f_A$, $f_B$, and $f_C$ represent the functionality of the monomers.

Chain architecture modifying agents of varying functionality are in Table II, below:

TABLE II

Chain Architecture Modifying Agent Functionality

| Functionality (f) | Acid Monomers | Glycol Monomers |
|---|---|---|
| 3 | [structure] | [structure] |
| 4 | [structure] | [structure] |
| 5 | [structure] | [structure] |
| 6 | [structure] | [structure] |

TABLE II-continued

| Chain Architecture Modifying Agent Functionality | | |
|---|---|---|
| Functionality (f) | Acid Monomers | Glycol Monomers |
| >6 | 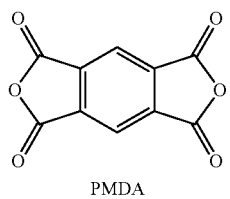 | 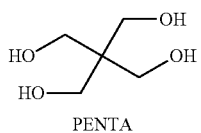 |

In exemplary embodiments, the at least one chain architecture modifying agent has a reactive functionality of at least two (F=2 or F>2).

In exemplary embodiments, the at least one chain architecture modifying agent has a reactive functionality of at least three (F=3 or F>3).

In exemplary embodiments, the at least one chain architecture modifying agent has a reactive functionality of at least four (F=4 or F>4). The chain architecture modifying agent with a reactive functionality of at least four (F=4 or F>4) may be any chain architecture modifying agent having the requisite reactive functionality.

In an exemplary embodiment, the at least one chain architecture modifying agent has a reactive functionality of four (F=4).

In one embodiment, the at least one chain architecture modifying agent is pryomellitic dianhydride (PMDA). PMDA has a reactive functionality of 4 (F=4). Reactivity can also be described as $A_2A'_2$ since the reactivity of the molecule will change once the $A_2$ units are consumed.

PMDA

In another embodiment, the at least one chain architecture modifying agent is pentaerythritol (PENTA). has a reactive functionality of 4 (F=4).

PENTA

In another embodiments, the copolymer is formed from the reaction of PEF and at least one chain architecture modifying agent selected from the group consisting of an electron-deficient alkene compound, an electron-deficient multialkene compound, and combinations thereof, is provided. In exemplary embodiments the branching agent is an electron-deficient alkyne molecules.

In exemplary embodiments, the at least one chain architecture modifying agent is an electron-deficient alkene, for example dimethyl maleate, maleic acid, acrylates, acrylic acid, and halogenated alkyl-substituted alkenes.

In exemplary embodiments, the electron-deficient multialkene is, for example a multimaleamide, a multiacrylate, a bisnitroalkene, an amide-substituted alkene, an imide-substituted alkene, a haloalkyl-substituted alkene, or a combination thereof.

In exemplary embodiments, the electron-deficient multialkene is a multimaleamide or combination thereof.

In exemplary embodiments, the multimaleamide is a bismaleamide, trimaleamide, tetramaleamide, pentamaleamide, or hexamaleamide.

In exemplary embodiments, the bismaleamide is selected from the group consisting of:

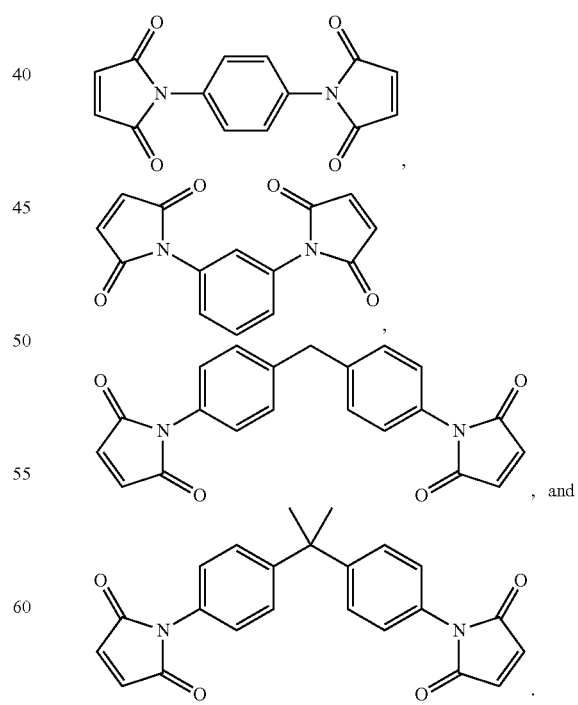

In exemplary embodiments, the bismaleamide is selected from the group consisting of:

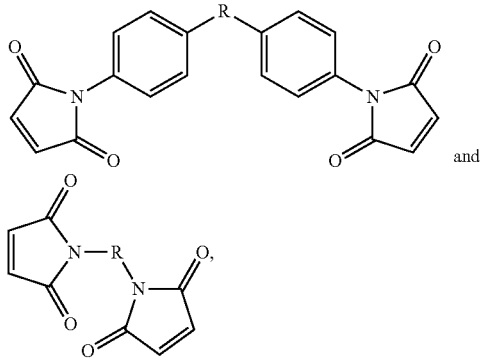

and wherein R is divalent and selected from the group consisting $C_{1-4}$ alkyl, $C_{1-4}$ haloalkyl, phenyl, O, S, NR', C(=O), S(=O), NR'C(=O), S(=O)$_2$, O—($C_{1-4}$ alkyl), S—($C_{1-4}$ alkyl), NR'($C_{1-4}$ alkyl), C(=O)—($C_{1-4}$ alkyl), S(=O)—($C_{1-4}$ alkyl), NR'C(=O)—($C_{1-4}$ alkyl), S(=O)$_2$—($C_{1-4}$ alkyl), O-phenyl, S-phenyl, NR'-phenyl, C(=O)-phenyl, S(=O)-phenyl, NR'C(=O)-phenyl, S(=O)$_2$-phenyl, N(=O), N($C_{1-4}$ alkyl), N-aryl, phosphorus, P($C_{1-4}$ alkyl), P-aryl; and wherein R' is H or $C_{1-6}$ alkyl.

In exemplary embodiments, the trimaleamide is selected from the group consisting of:

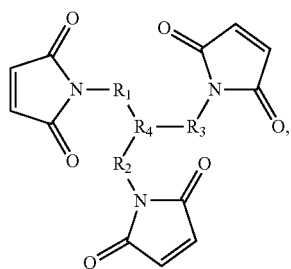

and wherein $R^1$, $R^2$, and $R^3$ are each divalent and selected from the group consisting of $C_{1-4}$ alkyl, $C_{1-4}$ haloalkyl, phenyl, O, S, NR', S(=O), NR'C(=O), S(=O)$_2$, O—($C_{1-4}$ alkyl), S—($C_{1-4}$ alkyl), NR'($C_{1-4}$ alkyl), C(=O)—($C_{1-4}$ alkyl), S(=O)—($C_{1-4}$ alkyl), NR'C(=O)—($C_{1-4}$ alkyl), S(=O)$_2$—($C_{1-4}$ alkyl), O-phenyl, S-phenyl, NR'-phenyl, C(=O)-phenyl, S(=O)-phenyl, NR'C(=O)-phenyl, S(=O)$_2$-phenyl, N(=O), N($C_{1-4}$ alkyl), N-aryl, phosphorus, P($C_{1-4}$ alkyl), P-aryl; and wherein R' is H or $C_{1-6}$ alkyl; and $R^4$ is a $C_{1-4}$ alkyl or phenyl group substituted by $R^1$, $R^2$, and $R^3$.

In exemplary embodiments, the trimaleamide is selected from the group consisting of:

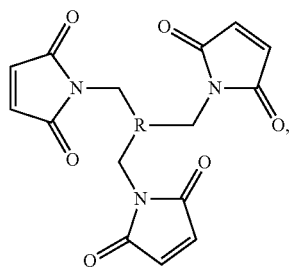

and wherein the R group is substituted by the three methylmaleamide groups and is selected from the group consisting of $C_{1-4}$ alkyl, $C_{1-4}$ haloalkyl, phenyl, O, S, NR', C(=O), S(=O), NR'C(=O), S(=O)$_2$, O—($C_{1-4}$ alkyl), S—($C_{1-4}$ alkyl), NR'($C_{1-4}$ alkyl), C(=O)—($C_{1-4}$ alkyl), S(=O)—($C_{1-4}$ alkyl), NR'C(=O)—($C_{1-4}$ alkyl), S(=O)$_2$—($C_{1-4}$ alkyl), O-phenyl, S-phenyl, NR'-phenyl, C(=O)-phenyl, S(=O)-phenyl, NR'C(=O)-phenyl, S(=O)$_2$-phenyl, N(=O), N($C_{1-4}$ alkyl), N-aryl, phosphorus, P($C_{1-4}$ alkyl), P-aryl; and wherein R' is H or $C_{1-6}$ alkyl.

In exemplary embodiments, the tetramaleamide is selected from the group consisting of:

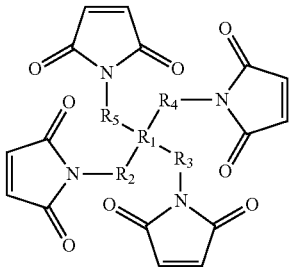

and wherein $R^1$ is substituted by $R^2$, $R^3$, $R^4$ and $R^5$; and $R^1$ is selected from the group consisting of $C_{1-4}$ alkyl, $C_{1-4}$ haloalkyl, phenyl, O, S, NR', C(=O), S(=O), NR'C(=O), S(=O)$_2$, O—($C_{1-4}$ alkyl), S—($C_{1-4}$ alkyl), NR'($C_{1-4}$ alkyl), C(=O)—($C_{1-4}$ alkyl), S(=O)—($C_{1-4}$ alkyl), NR'C(=O)—($C_{1-4}$ alkyl), S(=O)$_2$—($C_{1-4}$ alkyl), O-phenyl, S-phenyl, NR'-phenyl, C(=O)-phenyl, S(=O)-phenyl, NR'C(=O)-phenyl, S(=O)$_2$-phenyl, N(=O), N($C_{1-4}$ alkyl), N-aryl, phosphorus, P($C_{1-4}$ alkyl), P-aryl; and wherein each R' is independently H or $C_{1-6}$ alkyl; and $R^2$, $R^3$, $R^4$ and $R^5$ are each independently selected from the group consisting of $C_{1-4}$ alkyl, $C_{1-4}$ haloalkyl, phenyl, O, S, NR', C(=O), S(=O), NR'C(=O), S(=O)$_2$, O—($C_{1-4}$ alkyl), S—($C_{1-4}$ alkyl), NR'($C_{1-4}$ alkyl), C(=O)—($C_{1-4}$ alkyl), S(=O)—($C_{1-4}$ alkyl), NR'C(=O)—($C_{1-4}$ alkyl), S(=O)$_2$—($C_{1-4}$ alkyl), O-phenyl, S-phenyl, NR'-phenyl, C(=O)-phenyl, S(=O)-phenyl, NR'C(=O)-phenyl, S(=O)$_2$-phenyl, N(=O), N($C_{1-4}$ alkyl), N-aryl, phosphorus, P($C_{1-4}$ alkyl), P-aryl.

In exemplary embodiments, the multimaleamide is selected from the group consisting of:

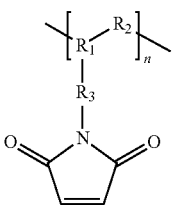

wherein $R^1$ and $R^2$ are each independently selected from the group consisting of $C_{1-4}$ alkyl, aryl, NR', NR'C(=O), NR' ($C_{1-4}$ alkyl), NR'C(=O)—($C_{1-4}$ alkyl), NR'-phenyl, NR'C (=O)-phenyl, N(=O), N($C_{1-4}$ alkyl), N-aryl; wherein each R' is independently H or $C_{1-6}$ alkyl; and $R^3$ is selected from the group consisting $C_{1-4}$ alkyl, $C_{1-4}$ haloalkyl, phenyl, O, S, C(=O), S(=O), S(=O)$_2$, O—($C_{1-4}$ alkyl), S—($C_{1-4}$ alkyl), C(=O)—($C_{1-4}$ alkyl), S(=O)—($C_{1-4}$ alkyl), S(=O)$_2$—($C_{1-4}$ alkyl), O-phenyl, S-phenyl, C(=O)-phenyl, S(=O)-phenyl, and S(=O)$_2$-phenyl; and n is 1-500,000.

In exemplary embodiments, the electron-deficient multialkene is a multiacrylate or combination thereof. In exemplary embodiments, the multiacrylate is a diacrylate, triacrylate, tetraacrylate, pentaacrylate, or hexaacrylate. In exemplary embodiments, the diacrylate is selected from the group consisting of:

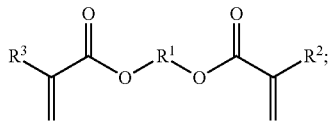

wherein $R^1$ is substituted by the two oxygen moieties and is selected from the group consisting of $C_{1-4}$ alkyl, $C_{1-4}$ haloalkyl, phenyl, O, S, NR', C(=O), S(=O), NR'C(=O), S(=O)$_2$, O—($C_{1-4}$ alkyl), S—($C_{1-4}$ alkyl), NR'($C_{1-4}$ alkyl), C(=O)—($C_{1-4}$ alkyl), S(=O)—($C_{1-4}$ alkyl), NR'C(=O)—($C_{1-4}$ alkyl), S(=O)$_2$—($C_{1-4}$ alkyl), O-phenyl, S-phenyl, NR'-phenyl, C(=O)-phenyl, S(=O)-phenyl, NR'C(=O)-phenyl, S(=O)$_2$-phenyl, N(=O), N($C_{1-4}$ alkyl), N-aryl, phosphorus, P($C_{1-4}$ alkyl), and P-aryl; and wherein each R' is independently H or $C_{1-6}$ alkyl; and $R^2$ and $R^3$ are each independently selected from the group consisting of $C_{1-4}$ alkyl, $C_{1-4}$ haloalkyl, phenyl, O, S, NR', C(=O), S(=O), NR'C(=O), S(=O)$_2$, O—($C_{1-4}$ alkyl), S—($C_{1-4}$ alkyl), NR'($C_{1-4}$ alkyl), C(=O)—($C_{1-4}$ alkyl), S(=O)—($C_{1-4}$ alkyl), NR'C(=O)—($C_{1-4}$ alkyl), S(=O)$_2$—($C_{1-4}$ alkyl), O-phenyl, S-phenyl, NR'-phenyl, C(=O)-phenyl, S(=O)-phenyl, NR'C(=O)-phenyl, S(=O)$_2$-phenyl, N(=O), N($C_{1-4}$ alkyl), N-aryl, phosphorus, P($C_{1-4}$ alkyl), and P-aryl.

In exemplary embodiments, the electron-deficient multialkene is a bisnitroalkene or combination thereof. In exemplary embodiments, the bisnitroalkene is selected from the group consisting of:

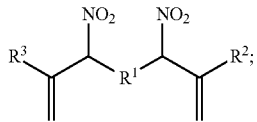

wherein $R^1$ is substituted by the two neighboring carbons and is selected from the group consisting of $C_{1-4}$ alkyl, $C_{1-4}$ haloalkyl, phenyl, O, S, NR', C(=O), S(=O), NR'C(=O), S(=O)$_2$, O—($C_{1-4}$ alkyl), S—($C_{1-4}$ alkyl), NR'($C_{1-4}$ alkyl), C(=O)—($C_{1-4}$ alkyl), S(=O)—($C_{1-4}$ alkyl), NR'C(=O)—($C_{1-4}$ alkyl), S(=O)$_2$—($C_{1-4}$ alkyl), O-phenyl, S-phenyl, NR'-phenyl, C(=O)-phenyl, S(=O)-phenyl, NR'C(=O)-phenyl, S(=O)$_2$-phenyl, N(=O), N($C_{1-4}$ alkyl), N-aryl, phosphorus, P($C_{1-4}$ alkyl), and P-aryl; and wherein each R' is independently H or $C_{1-6}$ alkyl; and $R^2$ and $R^3$ are each independently selected from the group consisting of $C_{1-4}$ alkyl, $C_{1-4}$ haloalkyl, phenyl, O, S, NR', C(=O), S(=O), NR'C(=O), S(=O)$_2$, O—($C_{1-4}$ alkyl), S—($C_{1-4}$ alkyl), NR'($C_{1-4}$ alkyl), C(=O)—($C_{1-4}$ alkyl), S(=O)—($C_{1-4}$ alkyl), NR'C(=O)—($C_{1-4}$ alkyl), S(=O)$_2$—($C_{1-4}$ alkyl), O-phenyl, S-phenyl, NR'-phenyl, C(=O)-phenyl, S(=O)-phenyl, NR'C(=O)-phenyl, S(=O)$_2$-phenyl, N(=O), N($C_{1-4}$ alkyl), N-aryl, phosphorus, P($C_{1-4}$ alkyl), and P-aryl.

In exemplary embodiments, the electron-deficient alkene or electron-deficient multialkene is an amide-substituted alkene or combination thereof. In exemplary embodiments, the amide-substituted alkene is a dialkene-diamide compound, a trialkene-triamide compound, a tetraalkene-tetraamide compound, a pentaalkene-pentaamide compound, or a hexaalkene-hexaamide compound.

In exemplary embodiments, the amide-substituted alkene is selected from the group consisting of:

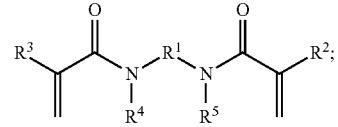

wherein $R^1$ is substituted by the two nitrogen moieties and is selected from the group consisting of $C_{1-4}$ alkyl, $C_{1-4}$ haloalkyl, phenyl, O, S, NR', C(=O), S(=O), NR'C(=O), S(=O)$_2$, O—($C_{1-4}$ alkyl), S—($C_{1-4}$ alkyl), NR'($C_{1-4}$ alkyl), C(=O)—($C_{1-4}$ alkyl), S(=O)—($C_{1-4}$ alkyl), NR'C(=O)—($C_{1-4}$ alkyl), S(=O)$_2$—($C_{1-4}$ alkyl), O-phenyl, S-phenyl, NR'-phenyl, C(=O)-phenyl, S(=O)-phenyl, NR'C(=O)-phenyl, S(=O)$_2$-phenyl, N(=O), N($C_{1-4}$ alkyl), N-aryl, phosphorus, P($C_{1-4}$ alkyl), and P-aryl; and wherein each R' is independently H or $C_{1-6}$ alkyl; $R^2$ and $R^3$ are each independently selected from the group consisting of $C_{1-4}$ alkyl, $C_{1-4}$ haloalkyl, phenyl, O, S, NR', C(=O), S(=O), NR'C(=O), S(=O)$_2$, O—($C_{1-4}$ alkyl), S—($C_{1-4}$ alkyl), NR'($C_{1-4}$ alkyl), C(=O)—($C_{1-4}$ alkyl), S(=O)—($C_{1-4}$ alkyl), NR'C(=O)—($C_{1-4}$ alkyl), S(=O)$_2$—($C_{1-4}$ alkyl), O-phenyl, S-phenyl, NR'-phenyl, C(=O)-phenyl, S(=O)-phenyl, NR'C(=O)-phenyl, S(=O)$_2$-phenyl, N(=O), N($C_{1-4}$ alkyl), N-aryl, phosphorus, P($C_{1-4}$ alkyl), and P-aryl; and $R^4$ and $R^5$ are each independently selected from the group consisting of $C_{1-4}$ alkyl, $C_{1-4}$ haloalkyl, phenyl, O, S, NR', C(=O), S(=O), NR'C(=O), S(=O)$_2$, O—($C_{1-4}$ alkyl), S—($C_{1-4}$ alkyl), NR'($C_{1-4}$ alkyl), C(=O)—($C_{1-4}$ alkyl), S(=O)—($C_{1-4}$ alkyl), NR'C(=O)—($C_{1-4}$ alkyl), S(=O)$_2$—($C_{1-4}$ alkyl), O-phenyl, S-phenyl, NR'-phenyl, C(=O)-phenyl, S(=O)-phenyl, NR'C(=O)-phenyl, S(=O)$_2$-phenyl, N(=O), N($C_{1-4}$ alkyl), N-aryl, phosphorus, P—($C_{1-4}$ alkyl), and P-aryl.

In exemplary embodiments, the electron-deficient multialkene is an imide-substituted alkene or combination thereof. In exemplary embodiments, the an imide-substituted alkene is selected from the group consisting of:

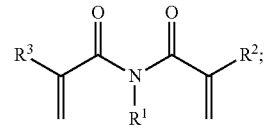

wherein $R^1$ is selected from the group consisting of H, $C_1$-$C_6$ alkyl aryl, O—($C_{1-4}$ alkyl), S—($C_{1-4}$ alkyl), NR'($C_{1-4}$ alkyl), P—($C_{1-4}$ alkyl); and $R^2$ and $R^3$ are each selected from the group consisting of $C_{1-4}$ alkyl, $C_{1-4}$ haloalkyl, phenyl, O, S, NR', C(=O), S(=O), NR'C(=O), S(=O)$_2$, O—($C_{1-4}$ alkyl), S—($C_{1-4}$ alkyl), NR'($C_{1-4}$ alkyl), C(=O)—($C_{1-4}$ alkyl), S(=O)—($C_{1-4}$ alkyl), NR'C(=O)—($C_{1-4}$ alkyl), S(=O)$_2$—($C_{1-4}$ alkyl), O-phenyl, S-phenyl, NR'-phenyl, C(=O)-phenyl, S(=O)-phenyl, NR'C(=O)-phenyl, S(=O)$_2$-phenyl, N(=O), N($C_{1-4}$ alkyl), N-aryl, phosphorus, P($C_{1-4}$ alkyl), and P-aryl; wherein and wherein each R' is independently H or $C_{1-6}$ alkyl.

In exemplary embodiments, the electron-deficient alkene or electron-deficient multialkene is a haloalkyl-substituted alkene or a combination thereof. In exemplary embodiments, the haloalkyl-substituted alkene is an alkene group substituted by a $C_1$-$C_{10}$ haloalkyl group which includes 1-20 halo groups, e.g. fluoro, chloro, bromo, or iodo. In exemplary embodiments, the haloalkyl-substituted alkene is selected from the group consisting of:

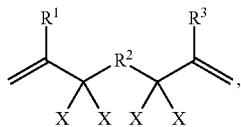

wherein each X is independently F, $C_1$, Br, or I; $R^2$ is substituted by the two neighboring carbons and is selected from the group consisting of $C_{1-4}$ alkyl, $C_{1-4}$ haloalkyl, phenyl, O, S, NR', C(=O), S(=O), NR'C(=O), S(=O)$_2$, O—($C_{1-4}$ alkyl), S—($C_{1-4}$ alkyl), NR'($C_{1-4}$ alkyl), C(=O)—($C_{1-4}$ alkyl), S(=O)—($C_{1-4}$ alkyl), NR'C(=O)—($C_{1-4}$ alkyl), S(=O)$_2$—($C_{1-4}$ alkyl), O-phenyl, S-phenyl, NR'-phenyl, C(=O)-phenyl, S(=O)-phenyl, NR'C(=O)-phenyl, S(=O)$_2$-phenyl, N(=O), N($C_{1-4}$ alkyl), N-aryl, phosphorus, P($C_{1-4}$ alkyl), and P-aryl; and wherein each R' is independently H or $C_{1-6}$ alkyl; and $R^1$ and $R^3$ are each independently selected from the group consisting of $C_{1-4}$ alkyl, $C_{1-4}$ haloalkyl, phenyl, O, S, NR', C(=O), S(=O), NR'C(=O), S(=O)$_2$, O—($C_{1-4}$ alkyl), S—($C_{1-4}$ alkyl), NR'($C_{1-4}$ alkyl), C(=O)—($C_{1-4}$ alkyl), S(=O)—($C_{1-4}$ alkyl), NR'C(=O)—($C_{1-4}$ alkyl), S(=O)$_2$—($C_{1-4}$ alkyl), O-phenyl, S-phenyl, NR'-phenyl, C(=O)-phenyl, S(=O)-phenyl, NR'C(=O)-phenyl, S(=O)$_2$-phenyl, N(=O), N($C_{1-4}$ alkyl), N-aryl, phosphorus, P($C_{1-4}$ alkyl), and P-aryl.

In exemplary embodiments, the haloalkyl-substituted alkene is selected from the group consisting of:

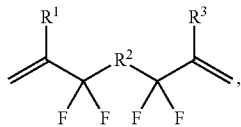

wherein $R^2$ is substituted by the two neighboring carbons and is selected from the group consisting of $C_{1-4}$ alkyl, $C_{1-4}$ haloalkyl, phenyl, O, S, NR', C(=O), S(=O), NR'C(=O), S(=O)$_2$, O—($C_{1-4}$ alkyl), S—($C_{1-4}$ alkyl), NR'($C_{1-4}$ alkyl), C(=O)—($C_{1-4}$ alkyl), S(=O)—($C_{1-4}$ alkyl), NR'C(=O)—($C_{1-4}$ alkyl), S(=O)$_2$—($C_{1-4}$ alkyl), O-phenyl, S-phenyl, NR'-phenyl, C(=O)-phenyl, S(=O)-phenyl, NR'C(=O)-phenyl, S(=O)$_2$-phenyl, N(=O), N($C_{1-4}$ alkyl), N-aryl, phosphorus, P($C_{1-4}$ alkyl), and P-aryl; and wherein each R' is independently H or $C_{1-6}$ alkyl; and $R^1$ and $R^3$ are each independently selected from the group consisting of $C_{1-4}$ alkyl, $C_{1-4}$ haloalkyl, phenyl, O, S, NR', C(=O), S(=O), NR'C(=O), S(=O)$_2$, O—($C_{1-4}$ alkyl), S—($C_{1-4}$ alkyl), NR'($C_{1-4}$ alkyl), C(=O)—($C_{1-4}$ alkyl), S(=O)—($C_{1-4}$ alkyl), NR'C(=O)—($C_{1-4}$ alkyl), S(=O)$_2$—($C_{1-4}$ alkyl), O-phenyl, S-phenyl, NR'-phenyl, C(=O)-phenyl, S(=O)-phenyl, NR'C(=O)-phenyl, S(=O)$_2$-phenyl, N(=O), N($C_{1-4}$ alkyl), N-aryl, phosphorus, P($C_{1-4}$ alkyl), and P-aryl.

In one embodiment, the at least one chain architecture modifying agent is a multianhydride, a multioxazoline, a multiepoxide, or a multilactone.

In exemplary embodiments, the at least one chain architecture modifying agent is a multianhydride. In exemplary embodiments, the multianhydride is a dianhydride, trianhydride, tetraanhydride, pentaanhydride or hexaanhydride compound.

In exemplary embodiments, the dianhydride is a selected from the group consisting of:

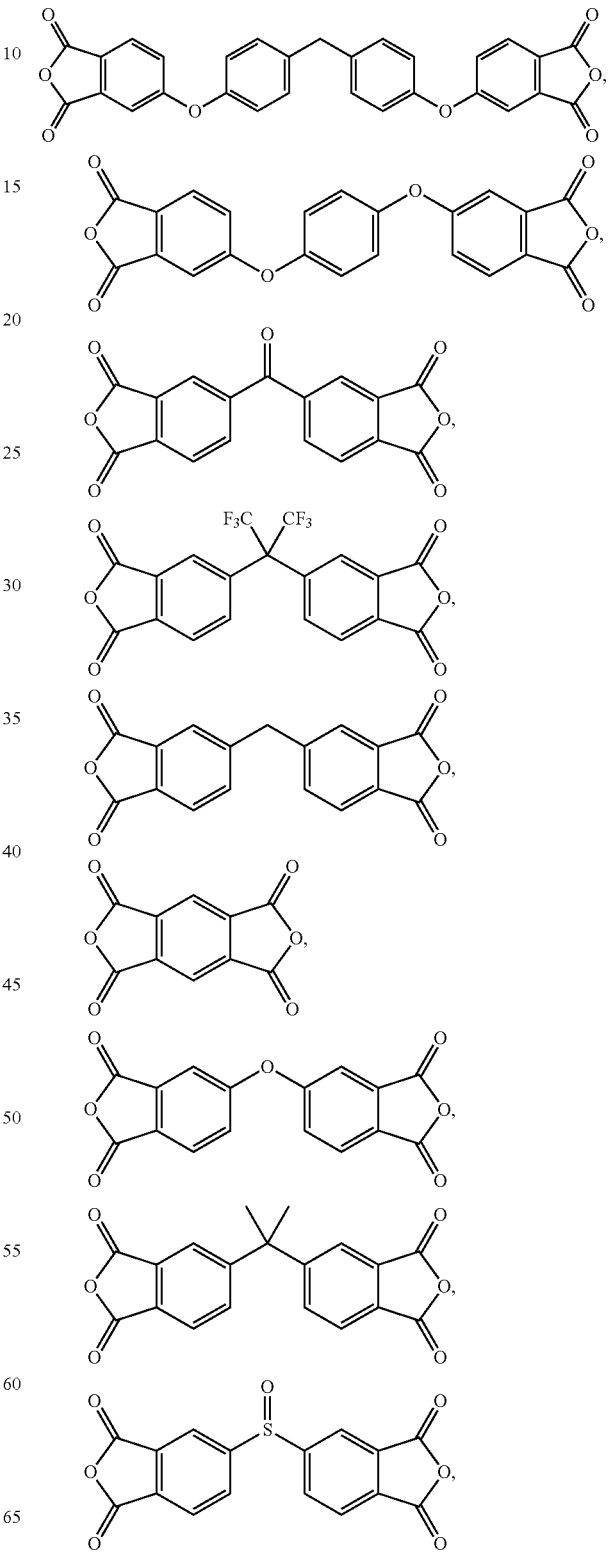

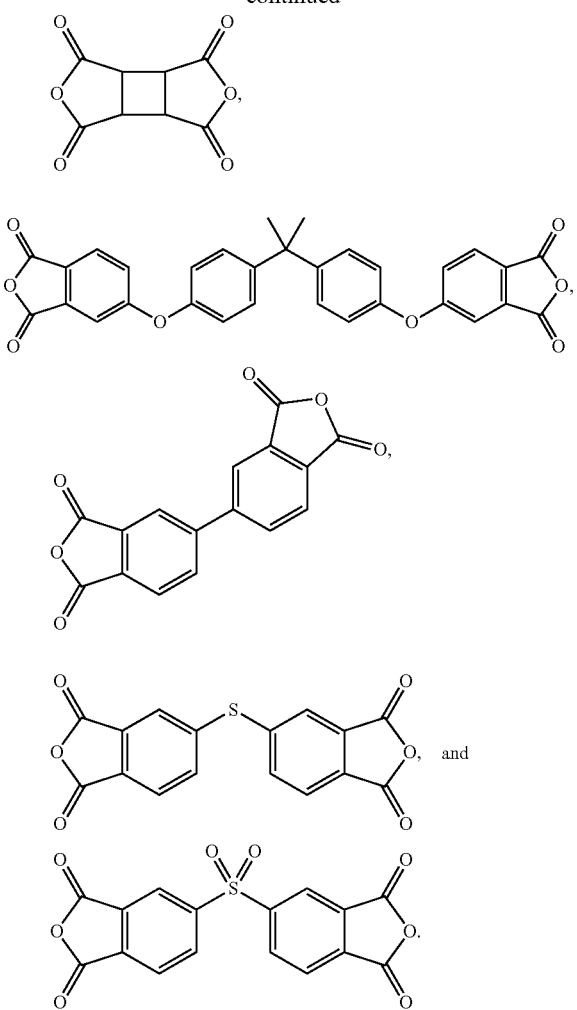

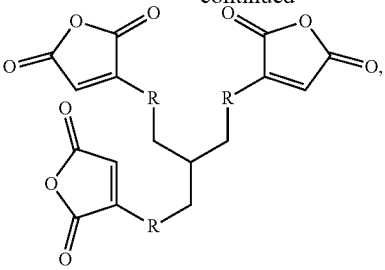

and wherein R is selected from the group consisting $C_{1-4}$ alkyl, $C_{1-4}$ haloalkyl, phenyl, O, S, NR', C(=O), S(=O), NR'C(=O), S(=O)$_2$, O—($C_{1-4}$ alkyl), S—($C_{1-4}$ alkyl), NR' ($C_{1-4}$ alkyl), C(=O)—($C_{1-4}$ alkyl), S(=O)—($C_{1-4}$ alkyl), NR'C(=O)—($C_{1-4}$ alkyl), S(=O)$_2$—($C_{1-4}$ alkyl), O-phenyl, S-phenyl, NR'-phenyl, C(=O)-phenyl, S(=O)-phenyl, NR'C(=O)-phenyl, and S(=O)$_2$-phenyl; or wherein R is a $C_2$-$C_6$ hydrocarbon containing 0-3 units of unsaturation that is bonded to the furan or dihydrofuran group through two carbons so as to form a ring; and wherein R' is H or $C_{1-6}$ alkyl.

In exemplary embodiments, the tetraanhydride is selected from the group consisting of:

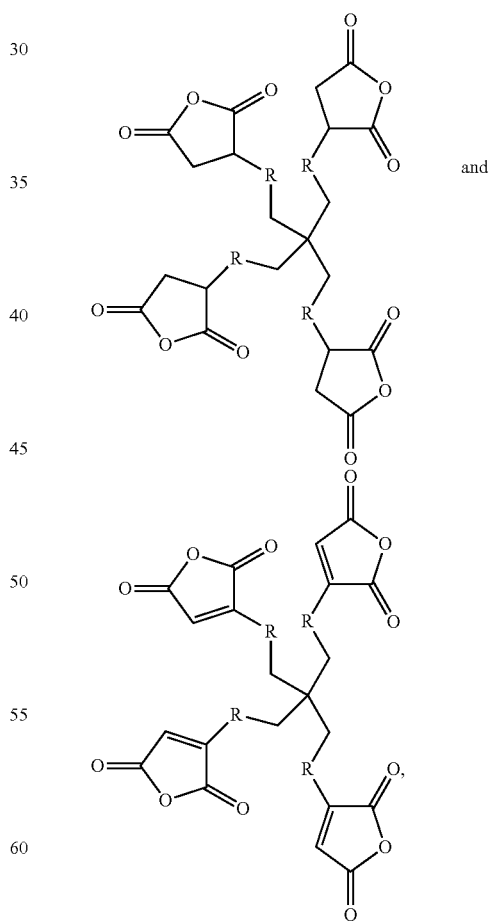

In exemplary embodiments, the trianhydride is selected from the group consisting of:

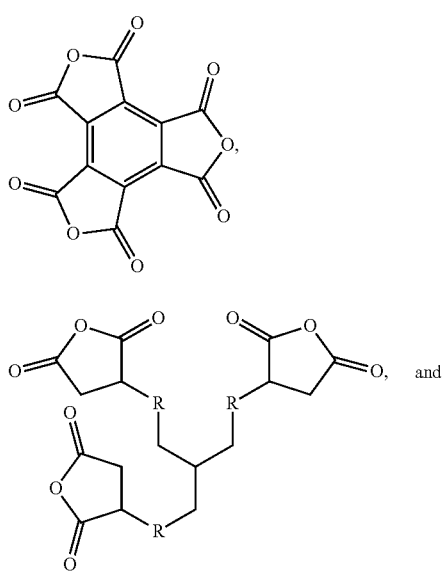

and wherein R is selected from the group consisting $C_{1-4}$ alkyl, $C_{1-4}$ haloalkyl, phenyl, O, S, NR', C(=O), S(=O), NR'C(=O), S(=O)$_2$, O—($C_{1-4}$ alkyl), S—($C_{1-4}$ alkyl), NR'

($C_{1-4}$ alkyl), C(=O)—($C_{1-4}$ alkyl), S(=O)—($C_{1-4}$ alkyl), NR'C(=O)—($C_{1-4}$ alkyl), S(=O)$_2$—($C_{1-4}$ alkyl), O-phenyl, S-phenyl, NR'-phenyl, C(=O)-phenyl, S(=O)-phenyl, NR'C(=O)-phenyl, and S(=O)$_2$-phenyl; or wherein R is a $C_2$-$C_6$ hydrocarbon containing 0-3 units of unsaturation that is bonded to the furan or dihydrofuran group through two carbons so as to form a ring; and wherein R' is H or $C_{1-6}$ alkyl.

In exemplary embodiments, the hexaanhydride is selected from the group consisting of:

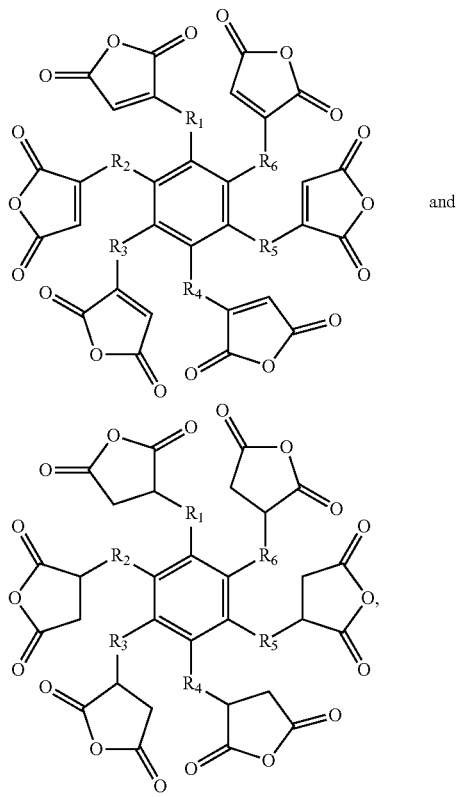

and wherein $R^1$, $R^2$, $R^3$, $R^4$, $R^5$, and $R^6$ are each selected from the group consisting $C_{1-4}$ alkyl, $C_{1-4}$ haloalkyl, phenyl, O, S, NR', C(=O), S(=O), NR'C(=O), S(=O)$_2$, O—($C_{1-4}$ alkyl), S—($C_{1-4}$ alkyl), NR'($C_{1-4}$ alkyl), C(=O)—($C_{1-4}$ alkyl), S(=O)—($C_{1-4}$ alkyl), NR'C(=O)—($C_{1-4}$ alkyl), S(=O)$_2$—($C_{1-4}$ alkyl), O-phenyl, S-phenyl, NR'-phenyl, C(=O)-phenyl, S(=O)-phenyl, NR'C(=O)-phenyl, and S(=O)$_2$-phenyl; or wherein each $R^1$, $R^2$, $R^3$, $R^4$, $R^5$, and $R^6$ is a $C_2$-$C_6$ hydrocarbon containing 0-3 units of unsaturation that is bonded to the furan or dihydrofuran group through two carbons so as to form a ring; and wherein R' is H or $C_{1-6}$ alkyl.

In exemplary embodiments, the multianhydride is selected from the group consisting of:

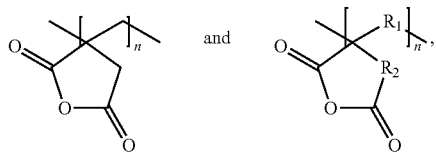

and wherein $R^1$ is selected from the group consisting $C_{1-4}$ alkyl, $C_{1-4}$ haloalkyl, phenyl, O, S, NR', C(=O), S(=O), NR'C(=O), S(=O)$_2$, O—($C_{1-4}$ alkyl), S—($C_{1-4}$ alkyl), NR' ($C_{1-4}$ alkyl), C(=O)—($C_{1-4}$ alkyl), S(=O)—($C_{1-4}$ alkyl), NR'C(=O)—($C_{1-4}$ alkyl), S(=O)$_2$—($C_{1-4}$ alkyl), O-phenyl, S-phenyl, NR'-phenyl, C(=O)-phenyl, S(=O)-phenyl, NR'C(=O)-phenyl, and S(=O)$_2$-phenyl; or wherein $R^1$ is a $C_2$-$C_6$ hydrocarbon containing 0-3 units of unsaturation that is bonded to the furan or dihydrofuran group through two carbons so as to form a ring; and wherein R' is H or $C_{1-6}$ alkyl; $R^2$ is divalent and is selected from the group consisting of $C_1$-$C_3$ alkyl, C(=O), NR', phenylene, S, and S(=O); and n is 1-500,000.

In exemplary embodiments, the at least one chain architecture modifying agent is a multioxazoline. In exemplary embodiments, the multioxazoline is a dioxazoline, trioxazoline, tetraoxazoline, pentaoxazoline or hexaoxazoline compound.

In exemplary embodiments, the multioxazoline is selected from the group consisting of:

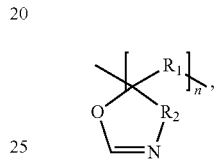

and wherein $R^1$ is selected from the group consisting $C_{1-4}$ alkyl, $C_{1-4}$ haloalkyl, phenyl, O, S, NR', C(=O), S(=O), NR'C(=O), S(=O)$_2$, O—($C_{1-4}$ alkyl), S—($C_{1-4}$ alkyl), NR' ($C_{1-4}$ alkyl), C(=O)—($C_{1-4}$ alkyl), S(=O)—($C_{1-4}$ alkyl), NR'C(=O)—($C_{1-4}$ alkyl), S(=O)$_2$—($C_{1-4}$ alkyl), O-phenyl, S-phenyl, NR'-phenyl, C(=O)-phenyl, S(=O)-phenyl, NR'C(=O)-phenyl, and S(=O)$_2$-phenyl; or wherein $R^1$ is a $C_2$-$C_6$ hydrocarbon containing 0-3 units of unsaturation that is bonded to the furan or dihydrofuran group through two carbons so as to form a ring; and wherein R' is H or $C_{1-6}$ alkyl; $R^2$ is divalent and is selected from the group consisting of $C_1$-$C_3$ alkyl, C(=O), NR', phenylene, S, and S(=O); and n is 1-500,000.

In exemplary embodiments, the hexaoxazoline is selected from the group consisting of:

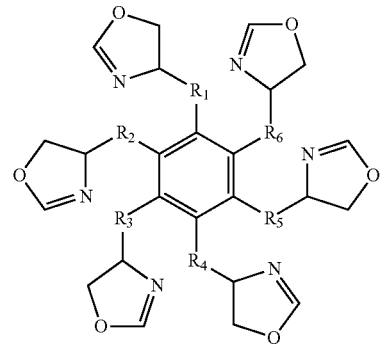

and wherein $R^1$, $R^2$, $R^3$, $R^4$, $R^5$, and $R^6$ are each selected from the group consisting $C_{1-4}$ alkyl, $C_{1-4}$ haloalkyl, phenyl, O, S, NR', C(=O), S(=O), NR'C(=O), S(=O)$_2$, O—($C_{1-4}$ alkyl), S—($C_{1-4}$ alkyl), NR'($C_{1-4}$ alkyl), C(=O)—($C_{1-4}$ alkyl), S(=O)—($C_{1-4}$ alkyl), NR'C(=O)—($C_{1-4}$ alkyl), S(=O)$_2$—($C_{1-4}$ alkyl), O-phenyl, S-phenyl, NR'-phenyl, C(=O)-phenyl, S(=O)-phenyl, NR'C(=O)-phenyl, and S(=O)$_2$-phenyl; or wherein each $R^1$, $R^2$, $R^3$, $R^4$, $R^5$, and $R^6$ is a $C_2$-$C_6$ hydrocarbon containing 0-3 units of unsaturation that is bonded to the furan or dihydrofuran group through two carbons so as to form a ring; and wherein R' is H or $C_{1-6}$ alkyl.

In exemplary embodiments, the chain architecture modifying agent is a multiepoxide. In exemplary embodiments, the multiepoxide is a diepoxide, triepoxide, tetraepoxide, pentaepoxide or hexaepoxide compound.

In exemplary embodiments, the diepoxide is selected from the group consisting of:

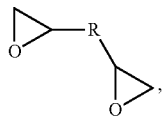

and wherein R is selected from the group consisting $C_{1-4}$ alkyl, $C_{1-4}$ haloalkyl, phenyl, O, S, C(=O), S(=O), S(=O)$_2$, O—($C_{1-4}$ alkyl), S—($C_{1-4}$ alkyl), C(=O)—($C_{1-4}$ alkyl), S(=O)—($C_{1-4}$ alkyl), S(=O)$_2$—($C_{1-4}$ alkyl), O-phenyl, S-phenyl, C(=O)-phenyl, S(=O)-phenyl, and S(=O)$_2$-phenyl; NH, N—($C_{1-4}$ alkyl), and N-aryl. In exemplary embodiments, N—($C_{1-4}$ alkyl) includes unsubstituted and substituted N—($C_{1-4}$ alkyl), for example, asymmetric-substituted N—($C_{1-4}$ alkyl); and N-aryl includes unsubstituted and substituted N-aryl, for example, asymmetric-substituted N-aryl.

In exemplary embodiments, the triepoxide is selected from the group consisting of:

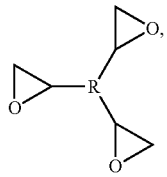

and wherein R is selected from the group consisting $C_{1-4}$ alkyl, $C_{1-4}$ haloalkyl, phenyl, O, S, C(=O), O—($C_{1-4}$ alkyl), S—($C_{1-4}$ alkyl), C(=O)—($C_{1-4}$ alkyl), S(=O)—($C_{1-4}$ alkyl), S(=O)$_2$—($C_{1-4}$ alkyl), O-phenyl, S-phenyl, C(=O)-phenyl, S(=O)-phenyl, S(=O)$_2$-phenyl, N—($C_{1-4}$ alkyl), N-aryl, trivalent phosphorus, trivalent phosphorus alkyl, and trivalent phosphorus aryl. In exemplary embodiments, N—($C_{1-4}$ alkyl) includes unsubstituted and substituted N—($C_{1-4}$ alkyl), for example, asymmetric-substituted N—($C_{1-4}$ alkyl); and N-aryl includes unsubstituted and substituted N-aryl, for example, asymmetric-substituted N-aryl.

In exemplary embodiments, the tetraepoxide is selected from the group consisting of:

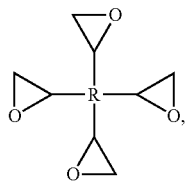

and wherein R is selected from the group consisting $C_{1-4}$ alkyl, $C_{1-4}$ haloalkyl, phenyl, O—($C_{1-4}$ alkyl), S—($C_{1-4}$ alkyl), C(=O)—($C_{1-4}$ alkyl), S(=O)—($C_{1-4}$ alkyl), S(=O)$_2$—($C_{1-4}$ alkyl), O-phenyl, S-phenyl, C(=O)-phenyl, S(=O)-phenyl, and S(=O)$_2$-phenyl.

In exemplary embodiments, the multiepoxide is selected from the group consisting of:

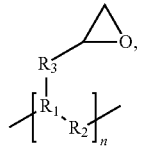

and wherein $R^1$ and $R^2$ are each independently selected from the group consisting of $CH_2$, $CH_2CH_2$, $C_3$-$C_6$ cycloalkyl, and aryl; and $R^3$ is selected from the group consisting $C_{1-4}$ alkyl, $C_{1-4}$ haloalkyl, phenyl, O, S, C(=O), S(=O), S(=O)$_2$, O—($C_{1-4}$ alkyl), S—($C_{1-4}$ alkyl), C(=O)—($C_{1-4}$ alkyl), S(=O)—($C_{1-4}$ alkyl), S(=O)$_2$—($C_{1-4}$ alkyl), O-phenyl, S-phenyl, C(=O)-phenyl, S(=O)-phenyl, and S(=O)$_2$-phenyl; and n is 1-500,000.

In exemplary embodiments, the chain architecture modifying agent is a multilactone. In exemplary embodiments, the multilactone is a dilactone, trilactone, tetralactone, pentalactone or hexalactone compound.

In exemplary embodiments, the dilactone selected from the group consisting of:

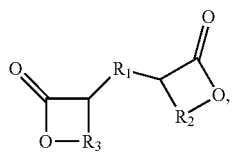

and wherein $R^1$ is selected from the group consisting $C_{1-4}$ alkyl, $C_{1-4}$ haloalkyl, phenyl, O, S, C(=O), S(=O), S(=O)$_2$, O—($C_{1-4}$ alkyl), S—($C_{1-4}$ alkyl), C(=O)—($C_{1-4}$ alkyl), S(=O)—($C_{1-4}$ alkyl), S(=O)$_2$—($C_{1-4}$ alkyl), O-phenyl, S-phenyl, C(=O)-phenyl, S(=O)-phenyl, and S(=O)$_2$-phenyl; N—($C_{1-4}$ alkyl), N-aryl, phosphorus, phosphorus alkyl, and phosphorus aryl; and wherein $R^2$ and $R^3$ are each divalent and independently selected from the group consisting of $C_1$-$C_3$ alkyl, C(=O), NR', phenylene, S, and S(=O). In exemplary embodiments, N—($C_{1-4}$ alkyl) includes unsubstituted and substituted N—($C_{1-4}$ alkyl), for example, asymmetric-substituted N—($C_{1-4}$ alkyl); and N-aryl includes unsubstituted and substituted N-aryl, for example, asymmetric-substituted N-aryl.

In exemplary embodiments, the multilactone is selected from the group consisting of:

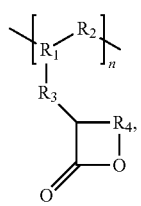

and wherein $R^1$ and $R^2$ are each independently selected from the group consisting of $CH_2$, $CH_2CH_2$, $C_3$-$C_6$ cycloalkyl, and aryl; $R^3$ is selected from the group consisting $C_{1-4}$ alkyl, $C_{1-4}$ haloalkyl, phenyl, O, S, C(=O), S(=O), S(=O)$_2$, O—($C_{1-4}$ alkyl), S—($C_{1-4}$ alkyl), C(=O)—($C_{1-4}$ alkyl), S(=O)—($C_{1-4}$ alkyl), S(=O)$_2$—($C_{1-4}$ alkyl), O-phenyl, S-phenyl, S(=O)-phenyl, S(=O)$_2$-phenyl, N—($C_{1-4}$ alkyl), N-aryl, phosphorus, phosphorus alkyl, and phosphorus aryl; and $R^4$ is divalent and selected from the group consisting of $C_1$-$C_3$ alkyl, C(=O), NR', phenylene, S, and S(=O); n is 1-500,000.

In exemplary embodiments, the at least one chain architecture modifying agent comprises a cyclic reactive moieties: oxetanes, oxolanes, dioxolanes, oxepanes, dioxepanes and trioxepanes.

The weight percentage of the at least one chain architecture modifying agent may vary. In one embodiment, is in the range of about 0.0001% to about 20%, about 0.0001% to about 1%, about 0.0025% to about 1%, about 0.02% to about 0.08%, or about 0.03% to about 0.05%.

In one embodiment, the weight percentage of the at least one chain architecture modifying agent is from about 0.010 to about 1.2%, about 0.01 to about 1.15%, about 0.010 to about 1.0%, about 0.010 to about 0.95%, about 0.010 to about 0.90, about 0.010 to about 0.85%, about 0.010 to about 0.80%, about 0.010 to about 0.75%, about 0.010 to about 0.70%, about 0.010 to about 0.65%, about 0.010 to about 0.60%, about 0.010 to about 0.55%, about 0.010 to about 0.50%, about 0.010 to about 0.45%, about 0.010 to about 0.40%, about 0.010 to about 0.35%, about 0.010 to about 0.30%, about 0.010 to about 0.25%, about 0.010 to about 0.20%, about 0.010 to about 0.15%, or about 0.010 to about 0.10%.

In exemplary embodiments, the weight percentage of the at least one chain architecture modifying agent is from about 0.010 to about 1.0%, about 0.010 to about 0.50%, about 0.010 to about 0.45%, about 0.010 to about 0.25%, about 0.010 to about 0.20%, about 0.010 to about 0.12%.

In exemplary embodiments, the weight percentage of the at least one chain architecture modifying agent is from about 0.025 to about 0.20%, about 0.025 to about 0.15%, or about 0.025 to about 0.125%.

In exemplary embodiments, the present invention provides a PEF copolymer comprising at least one chain architecture modifying agent, wherein the chain architecture modifying agent has a reactive functionality of three or more (F=3 or <3), and more particularly, four (F=4), wherein the weight percentage chain architecture modifying agent is in the range of about 0.0001% to about 20%, about 0.0001% to about 1%, about 0.0025% to about 1%, about 0.02% to about 0.08%, or about 0.03% to about 0.05%.

In exemplary embodiments, the present invention provides a PEF copolymer comprising at least one chain architecture modifying agent, wherein the chain architecture modifying agent has a reactive functionality of three or more (F=3 or <3), and more particularly, four (F=4), wherein the weight percentage chain architecture modifying agent is in the range of about 0.010 to about 1.2%, about 0.01 to about 1.15%, about 0.010 to about 1.0%, about 0.010 to about 0.95%, about 0.010 to about 0.90, about 0.010 to about 0.85%, about 0.010 to about 0.80%, about 0.010 to about 0.75%, about 0.010 to about 0.70%, about 0.010 to about 0.65%, about 0.010 to about 0.60%, about 0.010 to about 0.55%, about 0.010 to about 0.50%, about 0.010 to about 0.45%, about 0.010 to about 0.40%, about 0.010 to about 0.35%, about 0.010 to about 0.30%, about 0.010 to about 0.25%, about 0.010 to about 0.20%, about 0.010 to about 0.15%, or about 0.010 to about 0.10%.

In exemplary embodiments, the present invention provides a PEF copolymer comprising at least one chain architecture modifying agent, wherein the chain architecture modifying agent has a reactive functionality of three or more (F=3 or <3), and more particularly, four (F=4), wherein the weight percentage chain architecture modifying agent is in the range of about 0.010 to about 1.0%, about 0.010 to about 0.50%, about 0.010 to about 0.45%, about 0.010 to about 0.25%, about 0.010 to about 0.20%, about 0.010 to about 0.12%.

In exemplary embodiments, the present invention provides a PEF copolymer comprising at least one chain architecture modifying agent, wherein the chain architecture modifying agent has a reactive functionality of three or more (F=3 or <3), and more particularly, four (F=4), wherein the weight percentage chain architecture modifying agent is in the range of about 0.025 to about 0.20%, about 0.025 to about 0.15%, or about 0.025 to about 0.125%.

In exemplary embodiments, the present invention provides a PEF copolymer comprising at least one chain architecture modifying agent, wherein the chain architecture modifying agent has a reactive functionality of four or more (F=4 or F<4), and more particularly, four (F=4), wherein the weight percentage chain architecture modifying agent is in the range of about 0.0001% to about 20%, about 0.0001% to about 1%, about 0.0025% to about 1%, about 0.02% to about 0.08%, or about 0.03% to about 0.05%. In a particular embodiment, the weight percentage chain architecture modifying agent is between about 0.010 to about 1.2%, about 0.01 to about 1.15%, about 0.010 to about 1.0%, about 0.010 to about 0.95%, about 0.010 to about 0.90, about 0.010 to about 0.85%, about 0.010 to about 0.80%, about 0.010 to about 0.75%, about 0.010 to about 0.70%, about 0.010 to about 0.65%, about 0.010 to about 0.60%, about 0.010 to about 0.55%, about 0.010 to about 0.50%, about 0.010 to about 0.45%, about 0.010 to about 0.40%, about 0.010 to about 0.35%, about 0.010 to about 0.30%, about 0.010 to about 0.25%, about 0.010 to about 0.20%, about 0.010 to about 0.15%, or about 0.010 to about 0.10%. In another particular embodiment, the weight percentage chain architecture modifying agent is about 0.010 to about 1.0%, about 0.010 to about 0.50%, about 0.010 to about 0.45%, about 0.010 to about 0.25%, about 0.010 to about 0.20%, about 0.010 to about 0.12%. In yet another particular embodiment, the weight percentage of the chain architecture modifying agent is about 0.025 to about 0.20%, about 0.025 to about 0.15%, or about 0.025 to about 0.125%.

In exemplary embodiments, the present invention provides a PEF copolymer comprising PMDA, wherein the weight percentage of PMDA in the copolymer is in the range of about 0.0001% to about 20%, about 0.0001% to about 1%, about 0.0025% to about 1%, about 0.02% to about 0.08%, or about 0.03% to about 0.05%, or about 0.1 to about 0.2%. In a particular embodiment, the weight percentage of PDMA in the copolymer is between about 0.010 to about 1.2%, about 0.01 to about 1.15%, about 0.010 to about 1.0%, about 0.010 to about 0.95%, about 0.010 to about 0.90, about 0.010 to about 0.85%, about 0.010 to about 0.80%, about 0.010 to about 0.75%, about 0.010 to about 0.70%, about 0.010 to about 0.65%, about 0.010 to about 0.60%, about 0.010 to about 0.55%, about 0.010 to about 0.50%, about 0.010 to about 0.45%, about 0.010 to about 0.40%, about 0.010 to about 0.35%, about 0.010 to about 0.30%, about 0.010 to about 0.25%, about 0.010 to about 0.20%, about 0.010 to about 0.15%, or about 0.010 to about 0.10%. In exemplary embodiments, the weight percentage of PDMA is from about 0.010 to about 1.0%, about 0.010 to about 0.50%, about 0.010 to about 0.45%, about 0.010 to about 0.25%, about 0.010 to about 0.20%, about 0.010 to about 0.12%. In exemplary embodiments, the weight percentage of PMDA is from about 0.025 to about 0.20%, about 0.025 to about 0.15%, or about 0.025 to about 0.125%.

In a preferred embodiment, the present invention provides a copolymer comprising PEF and PMDA, wherein the weight percentage of PDMA is between about 0.010 and about 0.9%, or more particularly, about 0.025 and about 0.9%.

In exemplary embodiments, the present invention provides a PEF copolymer comprising PENTA, wherein the weight percentage of PENTA in the copolymer is in the range of about 0.010 to about 1.2%, about 0.01 to about 1.15%, about 0.010 to about 1.0%, about 0.010 to about 0.95%, about 0.010 to about 0.90, about 0.010 to about 0.85%, about 0.010 to about 0.80%, about 0.010 to about 0.75%, about 0.010 to about 0.70%, about 0.010 to about 0.65%, about 0.010 to about 0.60%, about 0.010 to about 0.55%, about 0.010 to about 0.50%, about 0.010 to about 0.45%, about 0.010 to about 0.40%, about 0.010 to about 0.35%, about 0.010 to about. 0.30%, about 0.010 to about 0.25%, about 0.010 to about 0.20%, about 0.010 to about 0.15%, or about 0.010 to about 0.10%. In exemplary embodiments, the weight percentage of PENTA is from about 0.010 to about 1.0%, about 0.010 to about 0.50%, about 0.010 to about 0.45%, about 0.010 to about 0.25%, about 0.010 to about 0.20%, about 0.010 to about 0.12%. In exemplary embodiments, the weight percentage of PENTA is from about 0.025 to about 0.20%, about 0.025 to about 0.15%, or about 0.025 to about 0.125%.

In a preferred embodiment, the present invention provides a copolymer comprising PEF and PENTA in a weight percentage between about 0.010 and about 0.30%, or more particularly, about 0.015 and about 0.30%, or even more particularly, about 0.025 and about 0.30%.

In exemplary embodiments, the present invention provides a PEF copolymer comprising (i) PEF; (ii) PMDA in a weight percentage hat ranges from about 0.01 to about 0.90%, or more particularly, about 0.025 to about 0.90%, or even more particularly, less than about 0.9% but greater than zero and (iii) PENTA in a weight percentage of about 0.01 to about 0.30%, or more particularly, about 0.025 to about 0.3%, or even more particularly, less than about 0.30% but greater than zero.

In exemplary embodiments, the present invention provides a PEF copolymer comprising PEF, PMDA and PENTA, wherein the weight percentage of PMDA (together) is between about 0.010 and about 1.5%, or more particularly, about 0.010 and about 1.4%, about 0.010 and about 1.3%, about 0.010 and about 1.2%, about 0.010 and about 1.1%, about 0.010 and about 1.0%, about 0.010 and about 0.90%, or about 0.010 and about 0.80%.

In exemplary embodiments, the present invention provides a PEF copolymer comprising at least one chain architecture modifying agent is selected from an electron-deficient alkene compound, electron-deficient multialkene compound or combinations thereof, wherein the weight percentage of the chain architecture modifying agent in the copolymer is in the range of about 0.0001% to about 20%, about 0.0001% to about 1%, about 0.0025% to about 1%, about 0.02% to about 0.08%, or about 0.03% to about 0.05%.

In exemplary embodiments, the present invention provides a PEF copolymer comprising at least one chain architecture modifying agent is selected from an electron-deficient alkene compound, electron-deficient multialkene compound or combinations thereof, wherein the weight percentage of the chain architecture modifying agent in the copolymer is in the range of about 0.010 to about 1.2%, about 0.01 to about 1.15%, about 0.010 to about 1.0%, about 0.010 to about 0.95%, about 0.010 to about 0.90, about 0.010 to about 0.85%, about 0.010 to about 0.80%, about 0.010 to about 0.75%, about 0.010 to about 0.70%, about 0.010 to about 0.65%, about 0.010 to about 0.60%, about 0.010 to about 0.55%, about 0.010 to about 0.50%, about 0.010 to about 0.45%, about 0.010 to about 0.40%, about 0.010 to about 0.35%, about 0.010 to about 0.30%, about 0.010 to about 0.25%, about 0.010 to about 0.20%, about 0.010 to about 0.15%, or about 0.010 to about 0.10%.

In exemplary embodiments, the present invention provides a PEF copolymer comprising at least one chain architecture modifying agent is selected from an electron-deficient alkene compound, electron-deficient multialkene compound or combinations thereof, wherein the weight percentage of the chain architecture modifying agent in the copolymer is in the range of about 0.010 to about 1.0%, about 0.010 to about 0.50%, about 0.010 to about 0.45%, about 0.010 to about 0.25%, about 0.010 to about 0.20%, about 0.010 to about 0.12%.

In exemplary embodiments, the present invention provides a PEF copolymer comprising at least one chain architecture modifying agent is selected from an electron-deficient alkene compound, electron-deficient multialkene compound or combinations thereof, wherein the weight percentage of the chain architecture modifying agent in the copolymer is in the range of about 0.025 to about 0.20%, about 0.025 to about 0.15%, or about 0.025 to about 0.125%.

In exemplary embodiments, present invention provides a PEF copolymer comprising at least one chain architecture modifying agent is selected from a multianhydride, multioxazoline, multiepoxide, multilactone or combinations of, wherein the weight percentage of the chain architecture modifying agent in the copolymer is in the range of about 0.0001% to about 20%, 0.0001% to about 1%, about 0.0025% to about 1%, about 0.02% to about 0.08%, or about 0.03% to about 0.05%.

In one embodiment, the weight percentage of the at least one chain architecture modifying agent is selected from a multianhydride, multioxazoline, multiepoxide, multilactone or combinations of is about 0.010 to about 1.2%, about 0.01 to about 1.15%, about 0.010 to about 1.0%, about 0.010 to about 0.95%, about 0.010 to about 0.90, about 0.010 to about 0.85%, about 0.010 to about 0.80%, about 0.010 to about 0.75%, about 0.010 to about 0.70%, about 0.010 to about 0.65%, about 0.010 to about 0.60%, about 0.010 to about 0.55%, about 0.010 to about 0.50%, about 0.010 to about 0.45%, about 0.010 to about 0.40%, about 0.010 to about 0.35%, about 0.010 to about 0.30%, about 0.010 to about 0.25%, about 0.010 to about 0.20%, about 0.010 to about 0.15%, or about 0.010 to about 0.10%.

In exemplary embodiments, the weight percentage of the at least one chain architecture modifying agent is selected from a multianhydride, multioxazoline, multiepoxide, multilactone or combinations of is about is from about 0.010 to about 1.0%, about 0.010 to about 0.50%, about 0.010 to about 0.45%, about 0.010 to about 0.25%, about 0.010 to about 0.20%, about 0.010 to about 0.12%.

In exemplary embodiments, the weight percentage of the chain architecture modifying agent is selected from a multianhydride, multioxazoline, multiepoxide, multilactone or combinations of is about from about 0.025 to about 0.20%, about 0.025 to about 0.15%, or about 0.025 to about 0.125%.

The mole percent of the chain architecture modifying agent may vary. In one embodiment, the mole percentage of the at least one chain architecture modifying agent is in the range of about 1 to about 200,000 ppm, about 1 to about 10,000 ppm, about 25 to about 10,000 ppm, about 200 to about 800 ppm, or about 300 to about 500 ppm.

In exemplary embodiments, the present invention provides a PEF copolymer comprising at least one chain architecture modifying agent, wherein the chain architecture modifying agent has a reactive functionality of three or more (F=3 or <3), and more particularly, four (F=4), wherein the mole percentage of the chain architecture modifying agent is in the range of about 1 to about 200,000 ppm, about 1 to about 10,000 ppm, about 25 to about 10,000 ppm, about 200 to about 800 ppm, or about 300 to about 500 ppm.

In exemplary embodiments, the present invention provides a PEF copolymer comprising at least one chain architecture modifying agent, wherein the chain architecture modifying agent has a reactive functionality of four or more (F=4 or F<4), and more particularly, four (F=4), wherein the mole percentage of the chain architecture modifying agent is in the range of about 1 to about 200,000 ppm, about 1 to about 10,000 ppm, about 25 to about 10,000 ppm, about 200 to about 800 ppm, or about 300 to about 500 ppm.

In exemplary embodiments, the present invention provides a PEF copolymer comprising PMDA, wherein the mole percentage of PMDA is in the range of about 1 to about 200,000 ppm, about 1 to about 10,000 ppm, about 25 to about 10,000 ppm, about 200 to about 800 ppm, or about 300 to about 500 ppm.

In exemplary embodiments, the present invention provides a PEF copolymer comprising PENTA, wherein the mole percentage of PENTA is in the range of about 1 to about 200,000 ppm, about 1 to about 10,000 ppm, about 25 to about 10,000 ppm, about 200 to about 800 ppm, or about 300 to about 500 ppm.

In exemplary embodiments, the present invention provides a PEF copolymer comprising PMDA and PENTA, wherein the mole percentage of PMDA and PENTA is in the range of about 1 to about 200,000 ppm, about 1 to about 10,000 ppm, about 25 to about 10,000 ppm, about 200 to about 800 ppm, or about 300 to about 500 ppm.

In exemplary embodiments, the present invention provides a PEF copolymer comprising at least one chain architecture modifying agent is selected from an electron-deficient alkene compound, electron-deficient multialkene compound or combinations thereof, wherein the mole percentage of the chain architecture modifying agent is in the range of about 1 to about 200,000 ppm, about 1 to about 10,000 ppm, about 25 to about 10,000 ppm, about 200 to about 800 ppm, or about 300 to about 500 ppm.

In exemplary embodiments, the present invention provides a PEF copolymer comprising a chain architecture modifying agent is selected from a multianhydride, multioxazoline, multiepoxide, multilactone or combinations of, wherein the mole percentage of the chain architecture modifying agent in the copolymer is in the range of about 1 to about 200,000 ppm, about 1 to about 10,000 ppm, about 25 to about 10,000 ppm, about 200 to about 800 ppm, or about 300 to about 500 ppm.

In exemplary embodiment, the present invention provides a PEF copolymer comprising PEF and two chain architecture modifying agents, wherein the mole ratio of the first chain architecture modifying agent to the second chain architecture modifying agent is about from about 1:1 to about 1:200, about 1:1 to about 1:150, about 1:1 to about 1:100, about 1:1 to about 1:75, about 1:1 to about 1:50, about 1:1 to about 1:25, about 1:1 to about 1:20, about 1:1 to about 1:15, about 1:1 to about 1:10, about 1:1 to about 1:8, about 1:1 to about 1:7, about 1:1 to about 1:6, about 1:1 to about 1:5, about 1:1 to about 1:4, about 1:1 to about 1:3, about 1:1 to about 1:3, or about 1:1.

In exemplary embodiments, the present invention provides a PEF copolymer comprising PEF, PMDA and PENTA, wherein the mole ratio of PENTA to PMDA is in the range of about 1:1 to about 1:9, about 1:2 to about 1:9. about 1:3 to about 1:7, or about 1:4 to about 1:6. In a preferred embodiment, the mole ratio of PENTA to PMDA is about 1:1.

The copolymer may container one or more additional additives or components. In one embodiment, the copolymer further comprises one or more of the following: crystallization modulating agents (e.g., enhancers, accelerators or inhibitors), reactive nucleating agents, non-reactive nucleating agents, plasticizers, barrier modulating agents, additives to enhance adhesive properties of the plastic, drawn fibers.

Resin Properties

The PEF copolymer of the present invention, as a resin, has one or more advantageous physical properties compared to unmodified PEF. These physical properties make the PEF copolymer attractive for processing into PEF articles, such as PEF preforms and containers (e.g., bottles). In certain embodiments, these physical properties make the PEF copolymer attractive for processing via extrusion blow molding.

In one embodiment, the PEF copolymer resin has one or more improved physical properties relative to unmodified PEF, selected from increased number average molecular weight ($M_n$), increased weight average molecular weight ($M_w$), increased entanglement density, decreased entanglement molecular weight ($M_e$), increased shear viscosity, increased melt strength, relaxation time ratio, primary relaxation time or combinations thereof.

The number average molecular mass is a way of determining the molecular mass of a polymer. Number average molecular weight ($M_n$) of the PEF copolymer of the present invention may vary, but in certain embodiments is increased relative to unmodified PEF.

In one embodiment, the PEF copolymer has a number average molecular weight that is about 10 to about 60%, about 20 to about 70%, about 30 to about 80%, about 40 to about 90%, or about 50 to 100% more than the number average molecular weight of unmodified PEF.

In another embodiment, the PEF copolymer has a number average molecular weight that is about 5, about 10, about 15, about 20, about 25, about 30, about 35, about 40, about 45, about 50, about 55, about 60, about 65, about 70, about 75, about 80, about 85, about 90, about 95, about 100% or about 100% or more than the number average molecular weight of unmodified PEF.

In exemplary embodiments, the present invention provides a PEF copolymer comprising PEF and at least one chain architecture modifying agent, wherein the chain architecture modifying agent has a reactive functionality of three or more (F=3 or <3), and more particularly, four (F=4), and wherein the copolymer has a number average molecular weight that is about 10 to about 60%, about 20 to about 70%, about 30 to about 80%, about 40 to about 90%, or about 50 to 100% more than the number average molecular weight of unmodified PEF. In exemplary embodiments, the PEF copolymer has a number average molecular weight that is about 5, about 10, about 15, about 20, about 25, about 30, about 35, about 40, about 45, about 50, about 55, about 60, about 65, about 70, about 75, about 80, about 85, about 90, about 95, about 100, or about 100% or more than the number average molecular weight of an unmodified PEF resin.

In exemplary embodiments, the present invention provides a PEF copolymer resin comprising PEF and PMDA, wherein the copolymer has a number average molecular weight that is about 10 to about 60%, about 20 to about 70%, about 30 to about 80%, about 40 to about 90%, or about 50 to 100% more than the number average molecular weight of unmodified PEF. In another embodiment, the PEF copolymer resin has a number average molecular weight that is about 5, about 10, about 15, about 20, about 25, about 30, about 35, about 40, about 45, about 50, about 55, about 60, about 65, about 70, about 75, about 80, about 85, about 90, about 95, about 100, or about 100% or more than the number average molecular weight of an unmodified PEF.

In exemplary embodiments, the present invention provides a PEF copolymer comprising PEF and PENTA, wherein the copolymer has a number average molecular weight that is about 10 to about 60%, about 20 to about 70%, about 30 to about 80%, about 40 to about 90%, or about 50 to 100% more than the number average molecular weight of unmodified PEF. In another embodiment, the copolymer has a number average molecular weight that is about 5, about 10, about 15, about 20, about 25, about 30, about 35, about 40, about 45, about 50, about 55, about 60, about 65, about 70, about 75, about 80, about 85, about 90, about 95, about 100, or about 100% or more than the number average molecular weight of an unmodified PEF.

In exemplary embodiments, the present invention provides a PEF copolymer comprising PEF, PMDA and PENTA, wherein the copolymer has a number average molecular weight that is about 10 to about 60%, about 20 to about 70%, about 30 to about 80%, about 40 to about 90%, or about 50 to 100% more than the number average molecular weight of unmodified PEF. In another embodiment, the copolymer has a number average molecular weight that is about 5, about 10, about 15, about 20, about 25, about 30, about 35, about 40, about 45, about 50, about 55, about 60, about 65, about 70, about 75, about 80, about 85, about 90, about 95, about 100, or about 100% or more than the number average molecular weight of an unmodified PEF.

In another embodiment, the present invention provides a PEF copolymer comprising at least one chain architecture modifying agent selected from the group consisting of an electron-deficient alkene compound, electron-deficient multialkene compound, a multianhydride, multioxazoline, multiepoxide, multilactone or combinations thereof, wherein the copolymer resin about 10 to about 60%, about 20 to about 70%, about 30 to about 80%, about 40 to about 90%, or about 50 to 100% more than the number average molecular weight of unmodified PEF. In exemplary embodiments, the PEF copolymer has a number average molecular weight that is about 5, about 10, about 15, about 20, about 25, about 30, about 35, about 40, about 45, about 50, about 55, about 60, about 65, about 70, about 75, about 80, about 85, about 90, about 95, about 100, or about 100% or more than the number average molecular weight of unmodified PEF.

In exemplary embodiments, the present invention provides a PEF copolymer comprising PEF and at least one chain architectures modifying agent, wherein the chain architecture modifying agent has a reactive functionality of three or more (F=3 or <3), and more particularly, four (F=4), and wherein the copolymer has a number average molecular weight that is between about 35,000 and about 100,000 daltons (Da), about 35,000 and about 100,000 Da, about 35,000 and about 85,000 Da, about 35,000 and about 80,000 Da, about 35,00 and about 75,000 Da, about 35,000 and about 70,000 Da, about 35,000 and about 65,000 Da, about 35,000 and about 60,000 Da, about 35,000 and about 55,000 Da, about 35,000 and about 50,000 Da, about 35,000 and about 45,000 Da, about 35,000 and about 40,000 Da.

In exemplary embodiments, the present invention provides a PEF copolymer resin comprising at least one chain architectures modifying agent, wherein the chain architecture modifying agent has a reactive functionality of three or more (F=3 or <3), and more particularly, four (F=4) and wherein the copolymer has a number average molecular weight that is between about 39,000 to 85,000.

In exemplary embodiments, the present invention provides a PEF copolymer comprising at least one chain architecture modifying agent selected from the group consisting of PDMA, PENTA and combinations thereof, wherein the copolymer resin has a number average molecular weight that is between about 35,000 and about 100,000 daltons (Da), about 35,000 and about 100,000 Da, about 35,000 and about 85,000 Da, about 35,000 and about 80,000 Da, about 35,00 and about 75,000 Da, about 35,000 and about 70,000 Da, about 35,000 and about 65,000 Da, about 35,000 and about 60,000 Da, about 35,000 and about 55,000 Da, about 35,000 and about 50,000 Da, about 35,000 and about 45,000 Da, about 35,000 and about 40,000 Da.

In exemplary embodiments, the present invention provides a PEF copolymer resin comprising PEF and PMDA, wherein the copolymer has a number average molecular weight that is between about 39,000 to 85,000.

In exemplary embodiments, the present invention provides a PEF copolymer resin comprising PEF and PENTA, wherein the copolymer resin has a number average molecular weight that is between about 39,000 to 85,000.

In exemplary embodiments, the present invention provides a PEF copolymer resin comprising PEF, PMDA and PENTA, wherein the copolymer resin has a number average molecular weight that is between about 39,000 to 85,000.

In exemplary embodiments, the present invention provides a PEF copolymer resin comprising at least one chain architecture modifying agent selected from the group consisting of an electron-deficient alkene compound, electron-deficient multialkene compound, a multianhydride, multioxazoline, multiepoxide, multilactone or combinations thereof, wherein the copolymer resin has a number average molecular weight that is between about 35,000 and about 100,000 daltons (Da), about 35,000 and about 100,000 Da, about 35,000 and about 85,000 Da, about 35,000 and about 80,000 Da, about 35,00 and about 75,000 Da, about 35,000 and about 70,000 Da, about 35,000 and about 65,000 Da, about 35,000 and about 60,000 Da, about 35,000 and about 55,000 Da, about 35,000 and about 50,000 Da, about 35,000 and about 45,000 Da, about 35,000 and about 40,000 Da.

In exemplary embodiments, the present invention provides a PEF copolymer resin comprising at least one chain architecture modifying agent selected from the group consisting of an electron-deficient alkene compound, electron-deficient multialkene compound, a multianhydride, multioxazoline, multiepoxide, multilactone or combinations thereof, wherein the copolymer resin has a number average molecular weight that is between about 39,000 to 85,000.

The weight average molecular weight ($M_w$) of the PEF copolymer may vary, but in certain embodiments, is increased relative to unmodified PEF. In one embodiment, the PEF copolymer has a weight average molecular weight that is about 5, about 10, about 15, about 20, about 25, about 30, about 35, about 40, about 45, about 50, about 55, about 60, about 65, about 70, about 75, about 80, about 85, about 90, about 95, about 100, or about 100% or more than the weight average molecular weight of unmodified PEF.

In one embodiment, the present invention provides a PEF copolymer comprising a chain architecture modifying agent, wherein the chain architecture modifying agent has a reactive functionality of three or more (F=3 or <3), and more particularly, four (F=4), wherein, the copolymer resin has a weight average molecular weight that is about 5, about 10, about 15, about 20, about 25, about 30, about 35, about 40, about 45, about 50, about 55, about 60, about 65, about 70, about 75, about 80, about 85, about 90, about 95, about 100, or about 100% or more than the weight average molecular weight of unmodified PEF resin.

In exemplary embodiments, the present invention provides a PEF copolymer resin comprising PMDA, PENTA or combinations thereof, wherein the copolymer resin has a weight average molecular weight that is about 5, about 10, about 15, about 20, about 25, about 30, about 35, about 40, about 45, about 50, about 55, about 60, about 65, about 70, about 75, about 80, about 85, about 90, about 95, about 100, or about 100% or more than the weight average molecular weight of unmodified PEF.

In exemplary embodiments, the present invention provides a PEF copolymer comprising at least one chain architecture modifying agent selected from the group consisting of an electron-deficient alkene compound, electron-deficient multialkene compound, a multianhydride, multioxazoline, multiepoxide, multilactone or combinations thereof, wherein the copolymer has a weight average molecular weight that is about 5, about 10, about 15, about 20, about 25, about 30, about 35, about 40, about 45, about 50, about 55, about 60, about 65, about 70, about 75, about 80, about 85, about 90, about 95, about 100, or about 100% or more than the weight average molecular weight of unmodified PEF.

In exemplary embodiments, the present invention provides a PEF copolymer comprising at least one chain architecture modifying agent, wherein the copolymer has an weight average molecular weight ($M_w$), of between about 80,000 and about 300,000 Da, about 90,000 and about 290,000 Da, about 100,000 and about 280,000 Da, about 110,000 and about 270,000 Da, about 120,000 and about 270,000 Da, about 130,000 and about 260,000, about 140,000 and about 250,000 Da, about 150,000 to about 240,000 Da, about 160,000 to about 230,000 Da, about 170,000 to about 220,000 Da, about 180,000 to about 210,000 Da, or about 190,000 to about 20,000 Da.

In a preferred embodiment, the present invention provides a PEF copolymer resin comprising at least one chain architecture modifying agent, wherein the copolymer resin has an weight average molecular weight of between about 56,000 to 120,000.

In exemplary embodiments, the present invention provides a PEF copolymer resin comprising PMDA, PENTA or combinations thereof, wherein the copolymer has an weight average molecular weight of between about 80,000 and about 300,000 Da, about 90,000 and about 290,000 Da, about 100,000 and about 280,000 Da, about 110,000 and about 270,000 Da, about 120,000 and about 270,000 Da, about 130,000 and about 260,000, about 140,000 and about 250,000 Da, about 150,000 to about 240,000 Da, about 160,000 to about 230,000 Da, about 170,000 to about 220,000 Da, about 180,000 to about 210,000 Da, or about 190,000 to about 20,000 Da.

In a preferred embodiment, the present invention provides a PEF copolymer comprising PMDA, PENTA or combinations thereof, wherein the copolymer resin has an weight average molecular weight of between about 56,000 to 120,000.

In exemplary embodiments, the present invention provides a PEF copolymer resin comprising a chain architecture modifying agent selected from the group consisting of an electron-deficient alkene compound, electron-deficient multialkene compound, a multi anhydride, multioxazoline, multiepoxide, multilactone or combinations thereof, wherein the copolymer resin has an weight average molecular weight of between about 80,000 and about 300,000 Da, about 90,000 and about 290,000 Da, about 100,000 and about 280,000 Da, about 110,000 and about 270,000 Da, about 120,000 and about 270,000 Da, about 130,000 and about 260,000, about 140,000 and about 250,000 Da, about 150,000 to about 240,000 Da, about 160,000 to about 230,000 Da, about 170,000 to about 220,000 Da, about 180,000 to about 210,000 Da, or about 190,000 to about 20,000 Da.

In a preferred embodiment, the present invention provides a PEF copolymer comprising the group consisting of an electron-deficient alkene compound, electron-deficient multialkene compound, a multianhydride, multioxazoline, multiepoxide, multilactone or combinations thereof wherein the copolymer resin has an weight average molecular weight of between about 56,000 to 120,000.

The entanglement density of the PEF copolymer may vary, and in certain embodiments, is increased relative to unmodified PEF and/or amorphous PET.

In one embodiment, the PEF copolymer has an entanglement density that is about 5, about 10, about 20, about 30, about 40, about 50, about 60, about 70, about 80, about 90 or about 100% or more than the entanglement density of unmodified PEF.

In exemplary embodiments, the present invention is a PEF copolymer comprising PEF and at least one chain architecture modifying agent, wherein the chain architecture modifying agent has a reactive functionality of three or more (F=3 or <3), and more particularly, four (F=4), and wherein the resin has an entanglement density that is about 5, about 10, about 20, about 30, about 40, about 50, about 60, about 70, about 80, about 90 or about 100% or more than the entanglement density of unmodified PEF.

In exemplary embodiments, the present invention is a PEF copolymer comprising PMDA, PENTA or combinations thereof, wherein the resin has an entanglement density that is about 5, about 10, about 20, about 30, about 40, about 50, about 60, about 70, about 80, about 90 or about 100% or more than the entanglement density of unmodified PEF.

In exemplary embodiments, the present invention is a PEF copolymer resin comprising a chain architecture modifying agent selected from the group consisting of an electron-deficient alkene compound, electron-deficient multialkene compound, a multianhydride, multioxazoline, multiepoxide, multilactone or combinations thereof, wherein the resin has an entanglement density that is about 5, about 10, about 20, about 30, about 40, about 50, about 60, about 70, about 80, about 90 or about 100% or more than the entanglement density of unmodified PEF.

In one embodiment, the PEF copolymer has an entanglement density that is about 5, about 10, about 20, about 30, about 40, about 50, about 60, about 70, about 80, about 90 or about 100% or more than the entanglement density of amorphous PET.

In exemplary embodiments, the present invention is a PEF copolymer comprising PEF and at least one chain architecture modifying agent, wherein the chain architecture modifying agent has a reactive functionality of three or more (F=3 or <3), and more particularly, four (F=4), and wherein the resin has an entanglement density that is about 5, about 10, about 20, about 30, about 40, about 50, about 60, about 70, about 80, about 90 or about 100% or more than the entanglement density of amorphous PET.

In exemplary embodiments, the present invention is a PEF copolymer resin comprising PDMA, PENTA or combinations thereof, wherein the resin has an entanglement density that is about 5, about 10, about 20, about 30, about 40, about 50, about 60, about 70, about 80, about 90 or about 100% or more than the entanglement density of amorphous PET.

In exemplary embodiments, the present invention is a PEF copolymer comprising at least one chain architecture modifying agent selected from the group consisting of an electron-deficient alkene compound, electron-deficient multialkene compound, a multianhydride, multioxazoline, multiepoxide, multilactone or combinations thereof, wherein the resin has an entanglement density that is about 50, about 55, about 60, about 65, about 70, about 75, about 80, about 85 or about 90% of the entanglement density of amorphous PET.

In exemplary embodiments, the PEF copolymer has an entanglement density in the range of about 0.13 to about 6.7, about 0.15 to about 6.0, about 0.30 to about 5.0, about 0.34 to about 4.6, or about 0.45 to about 3.4 mmol/cm$^3$.

In exemplary embodiments, the PEF copolymer has an entanglement density in the range of about 0.30 to about 0.40 mmol/cm$^3$.

In exemplary embodiments, the PEF copolymer has an entanglement density at least about 0.382 mmol/cm$^3$, at least about 0.50 mmol/cm$^3$, or at least about 1.1 mmol/cm$^3$.

In exemplary embodiments, the PEF copolymer has an entanglement density at least about 0.382, at least about 0.40, at least about 0.42, at least about 0.44, at least about 0.46, at least about 0.48, at least about 0.50, at least about 0.60, at least about 0.70, at least about 0.80, at least about 0.90, at least about 1.0, or at least about 1.1 mmol/cm$^3$.

In exemplary embodiments, the present invention is a PET copolymer comprising PEF and PMDA, PENTA or a combination thereof, wherein the copolymer has a entanglement density in the range of about 0.13 to about 6.7, about 0.15 to about 6.0, about 0.30 to about 5.0, about 0.34 to about 4.6, or about 0.45 to about 3.4 mmol/cm$^3$.

In exemplary embodiments, the present invention is a PET copolymer comprising PEF and PMDA, PENTA or a combination thereof, wherein the copolymer has a entanglement density in the range of about least about 0.382 mmol/cm$^3$, at least about 0.50 mmol/cm$^3$, or at least about 1.1 mmol/cm$^3$.

In exemplary embodiments, the present invention is a PET copolymer comprising PEF and PMDA, PENTA or a combination thereof, wherein the copolymer has a entanglement density in the range of 0.382, at least about 0.40, at least about 0.42, at least about 0.44, at least about 0.46, at least about 0.48, at least about 0.50, at least about 0.60, at least about 0.70, at least about 0.80, at least about 0.90, at least about 1.0, or at least about 1.1 mmol/cm$^3$.

In exemplary embodiments, the present invention is a PET copolymer comprising at least one chain architecture modifying agent selected from the group consisting of an electron-deficient alkene compound, electron-deficient multialkene compound, a multianhydride, multioxazoline, multiepoxide, multilactone or combinations thereof, wherein the copolymer has a entanglement density in the range of about 0.13 to about 6.7, about 0.15 to about 6.0, about 0.30 to about 5.0, about 0.34 to about 4.6, or about 0.45 to about 3.4 mmol/cm$^3$.

In exemplary embodiments, the present invention is a PET copolymer comprising at least one chain architecture modifying agent selected from the group consisting of an electron-deficient alkene compound, electron-deficient multialkene compound, a multianhydride, multioxazoline, multiepoxide, multilactone or a combination thereof, wherein the copolymer has a entanglement density in the range of about least about 0.382 mmol/cm$^3$, at least about 0.50 mmol/cm$^3$, or at least about 1.1 mmol/cm$^3$.

In exemplary embodiments, the present invention is a PET copolymer comprising at least one chain architecture modifying agent selected from the group consisting of an electron-deficient alkene compound, electron-deficient multialkene compound, a multianhydride, multioxazoline, multiepoxide, multilactone or a combination thereof, wherein the copolymer has a entanglement density in the range of 0.382, at least about 0.40, at least about 0.42, at least about 0.44, at least about 0.46, at least about 0.48, at least about 0.50, at least about 0.60, at least about 0.70, at least about 0.80, at least about 0.90, at least about 1.0, or at least about 1.1 mmol/cm$^3$.

The entanglement molecular weight of the PEF copolymer may vary, but in certain embodiments, is less than the entanglement molecular weight of unmodified PEF. In one embodiment, the PEF copolymer has an entanglement molecular weight ($M_e$) that is about 5, about 10, about 20, about 30, about 40, about 50, about 60, about 70, about 80, about 90 or about 100% or less than the entanglement molecular weight of unmodified PEF.

In another embodiment, the PEF copolymer has an entanglement molecular weight that is about 10 to about 30%, about 20 to about 40%, about 30 to about 50%, about 40 to about 60%, or about 50 to about 60% less than the entanglement molecular weight of unmodified PEF.

In exemplary embodiments, the present invention is PEF copolymer comprising PEF and PMDA, PENTA or combination thereof, wherein the PEF copolymer has an entanglement molecular weight ($M_e$) that is about 5, about 10, about 20, about 30, about 40, about 50, about 60, about 70, about 80, about 90 or about 100% or less than the entanglement molecular weight of unmodified PEF.

In exemplary embodiments, the present invention is PEF copolymer comprising PEF and PMDA, PENTA or combination thereof, wherein the PEF copolymer has an entanglement molecular weight that is about 10 to about 30%, about 20 to about 40%, about 30 to about 50%, about 40 to about 60%, or about 50 to about 60% less than the entanglement molecular weight of unmodified PEF.

In exemplary embodiments, the present invention is PEF copolymer comprising a chain architecture modifying agent selected from the group consisting of an electron-deficient alkene compound, electron-deficient multialkene compound, a multianhydride, multioxazoline, multiepoxide, multilactoneor combination thereof, wherein the PEF copolymer has an entanglement molecular weight ($M_e$) that is about 5, about 10, about 20, about 30, about 40, about 50, about 60, about 70, about 80, about 90 or about 100% or less than the entanglement molecular weight of unmodified PEF.

In exemplary embodiments, the present invention is PEF copolymer comprising a chain architecture modifying agent selected from the group consisting of an electron-deficient alkene compound, electron-deficient multialkene compound, a multianhydride, multioxazoline, multiepoxide, multilactone or combination thereof, wherein the PEF copolymer has an entanglement molecular weight that is about 10 to about 30%, about 20 to about 40%, about 30 to about 50%, about 40 to about 60%, or about 50 to about 60% less than the entanglement molecular weight of unmodified PEF.

In exemplary embodiments, the present invention is PEF copolymer comprising PEF and at least one chain architecture modifying agent, wherein the copolymer has an entanglement molecular weight in the range of about 1,500 to about 3,600 g/mol, about 1,600 to about 3,500 g/mol, about 1,700 to about 3,400 g/mol, about 1,800 to about 3,300 g/mol, about 1,900 to about 3,100 g/mol, about 2,000 to about 3,000 g/mol, about 2,100 to about 2,800 g/mol, about 2,200 to about 2,700 g/mol, about 2,300 to about 2,600 g/mol or about 2,400 to about 2,500 g/ml.

In a preferred embodiment, the present invention is PEF copolymer comprising PEF and at least one chain architecture modifying agent, wherein PEF copolymer resin has an entanglement molecular weight of about 1,600 to 3,000.

In a particular embodiment, the present invention is a PEF copolymer comprising PMDA, PENTA or a combination thereof, wherein the resin has an entanglement molecular weight in the range of about 1,500 to about 3,600 g/mol, about 1,600 to about 3,500 g/mol, about 1,700 to about 3,400 g/mol, about 1,800 to about 3,300 g/mol, about 1,900 to about 3,100 g/mol, about 2,000 to about 3,000 g/mol, about 2,100 to about 2,800 g/mol, about 2,200 to about 2,700 g/mol, about 2,300 to about 2,600 g/mol or about 2,400 to about 2,500 g/ml. In certain embodiments, the resin further comprises PENTA.

In a preferred embodiment, the present invention is a PEF copolymer comprising PMDA, PENTA or a combination thereof, wherein the copolymer has an entanglement molecular weight of about 1,600 to 3,000.

In exemplary embodiments, the present invention is a PEF copolymer comprising a chain architecture modifying agent selected from the group consisting of an electron-deficient alkene compound, electron-deficient multialkene compound, a multianhydride, multioxazoline, multiepoxide, multilactone or combinations thereof, wherein the resin has an entanglement molecular weight in the range of about 1,500 to about 3,600 g/mol, about 1,600 to about 3,500 g/mol, about 1,700 to about 3,400 g/mol, about 1,800 to about 3,300 g/mol, about 1,900 to about 3,100 g/mol, about 2,000 to about 3,000 g/mol, about 2,100 to about 2,800 g/mol, about 2,200 to about 2,700 g/mol, about 2,300 to about 2,600 g/mol or about 2,400 to about 2,500 g/ml.

In a preferred embodiment, the present invention is a PEF copolymer comprising a chain architecture modifying agent selected from the group consisting of an electron-deficient alkene compound, electron-deficient multialkene compound, a multianhydride, multioxazoline, multiepoxide, multilactone or combinations thereof, wherein the resin has an entanglement molecular weight of about 1,600 to 3,000.

The zero sheer viscosity of the PEF copolymer may vary, but in certain embodiments, is greater than the zero sheer viscosity of unmodified PEF.

In one embodiment, the zero sheer viscosity of the PEF copolymer is about 1 to about 5×, about 5 to about 10×, about 10 to about 20× the zero sheer viscosity of unmodified PEF.

In another embodiments, the zero sheer viscosity of the PEF copolymer is about 10× the zero sheer viscosity of unmodified PEF.

In a further embodiments, the zero sheer viscosity of the PEF copolymer is about 10× the zero sheer viscosity of unmodified PEF.

In exemplary embodiments, the present invention is a PEF copolymer comprising PEF and PMDA, PENTA or combinations thereof, wherein the zero sheer viscosity of the PEF copolymer is about 1 to about 5×, about 5 to about 10×, about 10 to about 20× the zero sheer viscosity of unmodified PEF.

In another embodiments, the present invention is a PEF copolymer comprising PEF and PMDA, PENTA or combinations thereof, wherein the zero sheer viscosity of the PEF copolymer is about 10× the zero sheer viscosity of unmodified PEF.

In a further embodiments, the present invention is a PEF copolymer comprising PEF and PMDA, PENTA or combinations thereof wherein zero sheer viscosity of the PEF copolymer is about 20× the zero sheer viscosity of unmodified PEF.

In exemplary embodiments, the present invention is a PEF copolymer comprising at least one chain architecture modifying agent selected from the group consisting of an electron-deficient alkene compound, electron-deficient multialkene compound, a multianhydride, multioxazoline, multiepoxide, multilactone or combinations thereof, wherein the zero sheer viscosity of the PEF copolymer is about 1 to about 5×, about 5 to about 10×, about 10 to about 20× the zero sheer viscosity of unmodified PEF.

In another embodiments, the present invention is a PEF copolymer comprising PEF and at least one chain architecture modifying agent selected from the group consisting of an electron-deficient alkene compound, electron-deficient multialkene compound, a multianhydride, multioxazoline, multiepoxide, multilactone or combinations thereof, wherein the zero sheer viscosity of the PEF copolymer is about 10× the zero sheer viscosity of unmodified PEF.

In a further embodiments, the present invention is a PEF copolymer comprising PEF and PMDA, PENTA or combinations thereof, wherein zero sheer viscosity of the PEF copolymer is about 20× the zero sheer viscosity of unmodified PEF.

In exemplary embodiments, the present invention is a PEF copolymer comprising at least one chain architecture modifying agents, wherein the PEF copolymer has a zero shear viscosity that is about 5, about 10, about 25, about 50, about 75, about 100, about 125, about 150, about 175, about 200, about 225, about 250, about 275, about 300, about 325, or about 350% or more than the zero shear viscosity of unmodified PEF.

In exemplary embodiments, the PEF copolymer has a zero shear viscosity that is between about 6 and about 325% more than the zero shear viscosity of unmodified PEF.

In exemplary embodiments, the present invention is a PEF copolymer comprising PEF and PMDA, PENTA or combinations thereof, wherein the PEF copolymer has a zero shear viscosity that is about 5, about 10, about 25, about 50, about 75, about 100, about 125, about 150, about 175, about 200, about 225, about 250, about 275, about 300, about 325, or about 350% or more than the zero shear viscosity of unmodified PEF.

In exemplary embodiments, the present invention is a PEF copolymer comprising at least one chain architecture modifying agent selected from the group consisting of an electron-deficient alkene compound, electron-deficient multialkene compound, a multianhydride, multioxazoline, multiepoxide, multilactone or combinations thereof, wherein the resin has a zero shear viscosity of the resin is about 5, about 10, about 25, about 50, about 75, about 100, about 125, about 150, about 175, about 200, about 225, about 250, about 275, about 300, about 325, or about 350% or more than the zero shear viscosity of unmodified PEF.

In exemplary embodiments, the zero shear viscosity of the PEF copolymer at 230-280° C. is between about 2,000 and about 125,000 Pa·s, about 8,000 and about 90,000 Pa·s, about 10,000 and about 80,000 Pa·s, about 20,000 and about 70,000 Pa·s, about 30,000 and about 60,000 Pa·s, or about 40,000 and about 50,000 Pa·s.

In exemplary embodiments, the present invention is a PEF copolymer resin comprising PEF and PMDA, PENTA and combinations thereof, wherein the zero shear viscosity of the PEF copolymer at 230-280° C. is between about 2,000 and about 125,000 Pa·s, about 8,000 and about 90,000 Pa·s, about 10,000 and about 80,000 Pa·s, about 20,000 and about 70,000 Pa·s, about 30,000 and about 60,000 Pa·s, or about 40,000 and about 50,000 Pa·s.

In exemplary embodiments, the present invention is a PEF copolymer resin comprising at least one chain architecture modifying agent selected from the group consisting of an electron-deficient alkene compound, electron-deficient multialkene compound, a multianhydride, multioxazoline, multiepoxide, multilactone or combinations thereof, wherein the zero shear viscosity of the resin at 230-280° C. is between about 2,000 and about 125,000 Pa·s, about 8,000 and about 90,000 Pa·s, about 10,000 and about 80,000 Pa·s, about 20,000 and about 70,000 Pa·s, about 30,000 and about 60,000 Pa·s, or about 40,000 and about 50,000 Pa·s.

The melt strength of the PEF copolymer may vary, but in certain embodiments, is greater than unmodified PEF. Melt strength is generally determined by measuring melt viscosity at very low shear rates (approaching zero shear rate). Low melt strength hinders the ability to form a suitable parison for extrusion blow molding, as discussed below.

In one embodiment, the melt strength of the PEF copolymer is about 1 to about 5×, about 5 to about 10×, about 10 to about 20× the melt strength of unmodified PEF.

In exemplary embodiments, the melt strength of the PEF copolymer is about 10× the melt strength of unmodified PEF.

In exemplary embodiments, the melt strength of the PEF copolymer is about 20× the melt strength of unmodified PEF.

In one embodiment, the present invention is a PEF copolymer comprising PEF and PMDA, PENTA or a combination thereof, wherein the copolymer has a melt strength of the PEF copolymer is about 1 to about 5×, about 5 to about 10×, about 10 to about 20× the melt strength of unmodified PEF.

In exemplary embodiments, the present invention is a PEF copolymer comprising PEF and PMDA, PENTA or a combination thereof, wherein the copolymer has a melt strength of about 10× the melt strength of unmodified PEF.

In exemplary embodiments, the present invention is a PEF copolymer comprising PEF and PMDA, PENTA or a combination thereof, wherein the copolymer has a melt strength of is about 20× the melt strength of unmodified PEF.

In one embodiment, the present invention is a PEF copolymer comprising at least one chain architecture modifying agent selected from the group consisting of an electron-deficient alkene compound, electron-deficient multialkene compound, a multianhydride, multioxazoline, multiepoxide, multilactone or combinations thereof, wherein the copolymer has a melt strength of the PEF copolymer is about 1 to about 5×, about 5 to about 10×, about 10 to about 20× the melt strength of unmodified PEF.

In one embodiment, the present invention is a PEF copolymer comprising at least one chain architecture modifying agent selected from the group consisting of an electron-deficient alkene compound, electron-deficient multialkene compound, a multianhydride, multioxazoline, multiepoxide, multilactone or combinations thereof, wherein the copolymer has a melt strength of about 10× the melt strength of unmodified PEF.

In one embodiment, the present invention is a PEF copolymer comprising at least one chain architecture modifying agent selected from the group consisting of an electron-deficient alkene compound, electron-deficient multialkene compound, a multianhydride, multioxazoline, multiepoxide, multilactone or combinations thereof, wherein the copolymer has a melt strength of about 20× the melt strength of unmodified PEF.

In exemplary embodiments, the melt strength of the PEF copolymer is about 5%, about 10%, about 25%, about 50%, about 75%, about 100%, about 125% or about 150% about 175, about 200, about 225, about 250, about 300, about 325, or about 350% greater than unmodified PEF.

The primary relaxation time of the PEF copolymer may vary, but in certain embodiments is greater than the primary relaxation time of unmodified PEF.

In one embodiment, the PEF copolymer resin has a primary relaxation time between about 1.25× and about 200×. In exemplary embodiments, the PEF copolymer has a primary relaxation time that is about 1× to about 10×, about 10× to about 50×, about 50× to about 100×, about 100× to about 150×, about 150× to about 200× than the primary relaxation time of unmodified PEF.

In exemplary embodiments, the PEF copolymer has a primary relaxation time of at least about 50 s at about 230° C.

In exemplary embodiments, the PEF copolymer has a primary relaxation time ratio of at least about 90, at least about 100, at least about 250, at least about 300, at least about 500, at least about 800, at least about 1000, at least about 10,000, at least about 50,000, at least about 100,000 or at least about 150,000.

In a particular embodiment, the present invention is a PEF copolymer comprising PEF and PMDA, PENTA or combinations thereof, wherein the PEF copolymer has a primary relaxation time between about 1.25× and about 200×, more particularly, about DC to about 10×, about 10× to about 50×, about 50× to about 100×, about 100× to about 150×, about 150× to about 200× than the primary relaxation time of unmodified PEF.

In a particular embodiment, the present invention is a PEF copolymer comprising at least one chain architecture modifying agent selected from the group consisting of an electron-deficient alkene compound, electron-deficient multialkene compound, a multianhydride, multioxazoline, multiepoxide, multilactone or combinations thereof, wherein the PEF copolymer has a primary relaxation time between about 1.25× and about 200×, more particularly, about 1× to about 10×, about 10× to about 50×, about 50× to about 100×, about 100× to about 150×, about 150× to about 200× than the primary relaxation time of unmodified PEF.

In a particular embodiment, the present invention is a PEF copolymer comprising PEF and PMDA, PENTA or combinations thereof, wherein the PEF copolymer has a relaxation time ratio of between about 90 and about 150,000, about 150 and about 120,000, about 300 and about 100,000, about 500 and about 75,000, about 1,000 and about 50,000, about 5,000 and about 35,000, about 10,000 and about 25,000. In certain embodiments, the copolymer further comprises PENTA.

In another particular embodiment, the present invention is a PEF copolymer resin comprising at least one chain architecture modifying agent selected from the group consisting of an electron-deficient alkene compound, electron-deficient multialkene compound, a multianhydride, multioxazoline, multiepoxide, multilactone or combinations thereof; wherein the resin has a relaxation time ratio of at least about 90, at least about 100, at least about 250, at least about 300, at least about 500, at least about 800, at least about 1000, at least about 10,000, at least about 50,000, at least about 100,000 or at least about 150,000. In certain embodiments, the resin further comprises PENTA.

In exemplary embodiments, the PEF copolymer has a molecular weight in the range of about 2,000 to about 10,000,000. In exemplary embodiments, the desired average molecular weight for an exemplary polymer suitable for bottle production via injection stretch blow molding processes is in the range of about 25,000 to about 90,000, or about 30,000 to about 100,000.

In order to prepare preforms and containers with adequate physical properties and an I.V. suitable for efficient molding of the preforms and blow molding of such preforms into containers, the polyester composition desirably has an I.V. of about 0.69 to about 1.6 dL/g, or more particularly, about 0.069 and about 1.39 dL/g, or even more particularly, about 0.80 and about 0.96, or in a particular embodiment, about 0.83 and about 0.91 dL/g.

Processes of Preparing the Copolymers

Generally, the copolymers are prepared by any polymerization process which includes the use of PEF and at least one chain architecture modifying agent(s) to form a copolymer. Increasing the units of chain architecture modifying agent can be used to increase the entanglements, chain length, branching or crosslinking of the copolymers. The ratios of the different components in the copolymer, e.g. PEF, PMDA, PE, may be adjusted as necessary to modify the properties of the polymers, for example the melt strength, strain hardening and creep resistance.

Examples of a polymerization method for obtaining the exemplary polymers include generally known methods such as solution polymerization, bulk polymerization, suspension polymerization, and emulsion polymerization. The polymerization method may be selected in accordance with the desired properties of the polymer or in accordance with the desired use of the polymer, for example for use in a packaging material or molded product. A polymerization temperature, a polymerization catalyst, a medium such as a solvent, and the like may be used in accordance with the polymerization method.

An illustrative example of how the exemplary multianhydride, multioxazoline, multi epoxide, or multilactone compounds interact with PEF is provided in the scheme shown below. $P_1$-$P_4$ refers to PEF polymer chains. $R_1$ and $R_2$ refer generally to linkers and are not particularly limited.

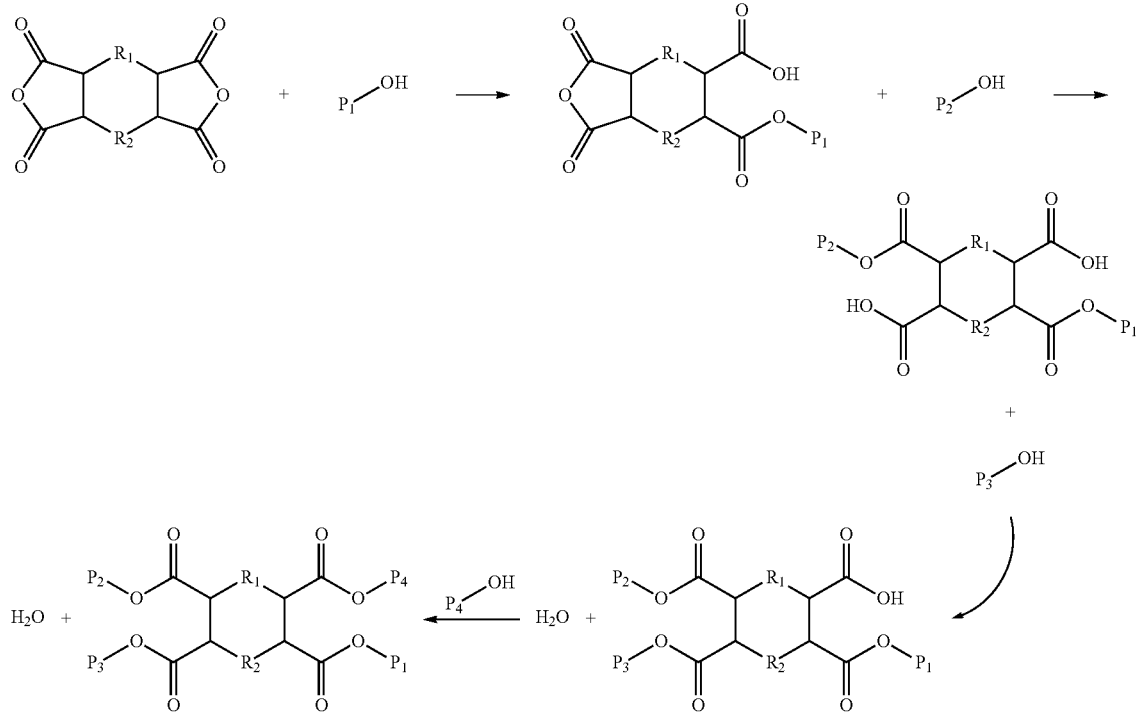

An illustrative example of how the exemplary electron-deficient alkene compound or electron-deficient multialkene compound interacts with the furan moiety of PEF is provided in the scheme shown below. $R_1$ refers generally to linkers and is not particularly limited.

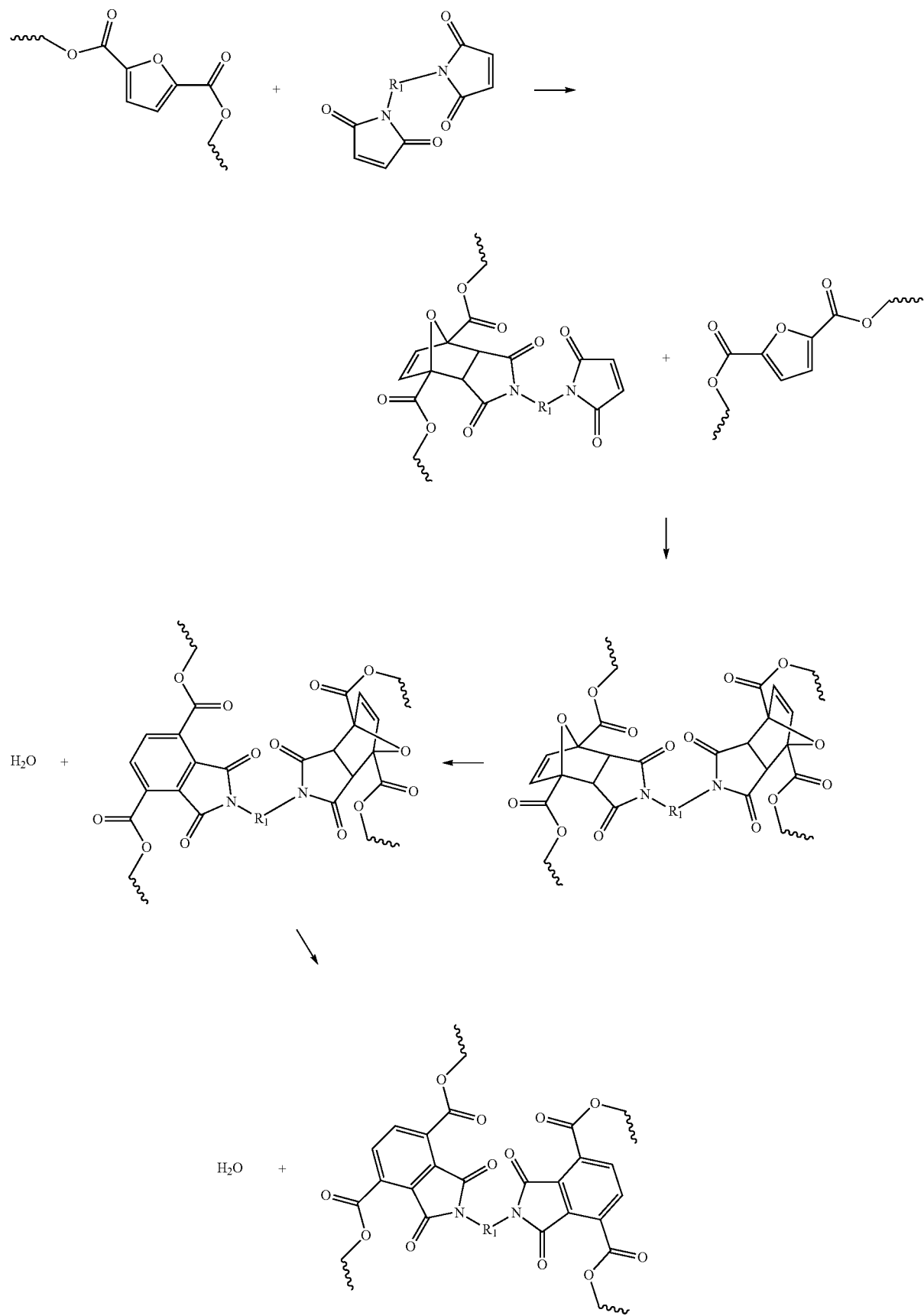

An exemplary copolymer in a molten state formed at the end of the polymerization process may be used as it is or molded into a required shape to be used for a thermoplastic resin for a molded product. A composition containing the exemplary copolymer with various additives added as required may be used as a raw material for a molded product.

In exemplary embodiments, a process for preparing a poly(ethylenefuranoate) copolymer is provided, the process comprising: adding one or more chain architecture modifying agents to poly(ethylenefuranoate); and heating the reaction mixture to a temperature of at least about 160° C. to produce a copolymer. In exemplary embodiments, the a temperature of at least about 220° C., or more particularly, about 250° C.

In exemplary embodiments, the reaction mixture is heated to a temperature of at least about 160° C., at least about 170° C., at least about 180° C., or at least about 200° C. In exemplary embodiments, the temperature is in the range of about 160° C. to about 260° C.

In exemplary embodiments, the chain architecture modifying agent(s) are added to PEF in a carrier, for example mineral oil or the like.

In exemplary embodiments, the process is carried out in the presence of a solvent, for example ethylene glycol.

In exemplary embodiments, the processes may be carried out under reduced pressure or under vacuum.

In exemplary embodiments, the reaction mixture is heated until a desired level of polymerization is achieved, for example until at least about 90%, about 95%, about 98% of the chain architecture modifying agent(s) have been polymerized.

In exemplary embodiments, a process for preparing a poly(ethylenefuranoate) copolymer is provided, the process comprising: adding a multianhydride, a multioxazoline, a multiepoxide, or a multilactone, to poly(ethylenefuranoate); and heating the reaction mixture to a temperature of at least about 120° C. to produce a copolymer, wherein the mole percent of multianhydride, multioxazoline, multiepoxide, or multilactone in the copolymer is in the range of about 0.0001 to about 20%. In exemplary embodiments, mole percent of multianhydride, multioxazoline, multiepoxide, or multilactone in the copolymer is in the range of about 0.0001 to about 1%. In exemplary embodiments, mole percent of multianhydride, multioxazoline, multiepoxide, or multilactone in the copolymer is in the range of about 0.0025 to about 1%. In exemplary embodiments, the temperature is at least about 220° C.

In exemplary embodiments, a process for preparing a poly(ethylenefuranoate) copolymer is provided, the process comprising: melt compounding a multianhydride, a multioxazoline, a multiepoxide, or a multilactone, and poly(ethylenefuranoate) at a temperature of at least about 120° C. to produce a copolymer, wherein the mole percent of multianhydride, multioxazoline, multiepoxide, or multilactone in the copolymer is in the range of about 0.0001 to about 20%. In exemplary embodiments, mole percent of multianhydride, multioxazoline, multiepoxide, or multilactone in the copolymer is in the range of about 0.0001 to about 1%. In exemplary embodiments, mole percent of multianhydride, multioxazoline, multiepoxide, or multilactone in the copolymer is in the range of about 0.0025 to about 1%. In exemplary embodiments, the temperature is at least about 220° C.

In exemplary embodiments, a process for preparing a poly(ethylenefuranoate) copolymer is provided, the process comprising: adding a multianhydride, a multioxazoline, a multiepoxide, or a multilactone, to poly(ethylenefuranoate); and heating the reaction mixture to a temperature of at least about 120° C. to produce a copolymer, wherein the weight percent of multianhydride, multioxazoline, multiepoxide, or multilactone in the copolymer is in the range of about 0.0001 to about 20%. In exemplary embodiments, weight percent of multianhydride, multioxazoline, multiepoxide, or multilactone in the copolymer is in the range of about 0.0001 to about 1%. In exemplary embodiments, weight percent of multianhydride, multioxazoline, multiepoxide, or multilactone in the copolymer is in the range of about 0.0025 to about 1%. In exemplary embodiments, the temperature is at least about 220° C.

In exemplary embodiments, a process for preparing a poly(ethylenefuranoate) copolymer is provided, the process comprising: melt compounding a multianhydride, a multioxazoline, a multiepoxide, or a multilactone, and poly(ethylenefuranoate) at a temperature of at least about 120° C. to produce a copolymer, wherein the weight percent of multianhydride, multioxazoline, multiepoxide, or multilactone in the copolymer is in the range of about 0.0001 to about 20%. In exemplary embodiments, weight percent of multianhydride, multioxazoline, multiepoxide, or multilactone in the copolymer is in the range of about 0.0001 to about 1%. In exemplary embodiments, weight percent of multianhydride, multioxazoline, multiepoxide, or multilactone in the copolymer is in the range of about 0.0025 to about 1%. In exemplary embodiments, the temperature is at least about 220° C.

In exemplary embodiments, the multianhydride, multioxazoline, multiepoxide, and/or multilactone compounds are added to PEF during an injection molding process. In exemplary embodiments, the multianhydride, multioxazoline, multiepoxide, and/or multilactone compounds are added to PEF in an extruder. In exemplary embodiments, the multianhydride, multioxazoline, multiepoxide, and/or multilactone compounds are added to PEF in a compounder. In exemplary embodiments, the multianhydride, multioxazoline, multiepoxide, and/or multilactone compounds are added to PEF in a melt mixer. In exemplary embodiments, the multianhydride, multioxazoline, multiepoxide, and/or multilactone compounds are added to PEF in a mixing vessel.

In exemplary embodiments, the reaction mixture is heated to a temperature of at least about 120° C., at least about 130° C., at least about 150° C., or at least about 200° C. In exemplary embodiments, the temperature is in the range of about 120° C. to about 260° C.

In exemplary embodiments, multianhydride, multioxazoline, multiepoxide, and/or multilactone compounds are added to PEF in a carrier, for example mineral oil or the like.

In exemplary embodiments, the process is carried out in the presence of a solvent, for example ethylene glycol.

In exemplary embodiments, the processes may be carried out under reduced pressure or under vacuum.

In exemplary embodiments, the reaction mixture is heated until a desired level of polymerization is achieved, for example until at least about 90%, about 95%, about 98% of the multianhydride, multioxazoline, multiepoxide, and/or multilactone compounds has been polymerized.

In exemplary embodiments, a process for preparing a poly(ethylenefuranoate) copolymer is provided, the process comprising: adding an electron-deficient alkene compound, an electron-deficient multialkene compound, or combination thereof, to poly(ethylenefuranoate); and heating the reaction mixture to a temperature of at least about 160° C. to produce a copolymer, wherein the mole percent of the electron-deficient alkene compound, the electron-deficient multialkene compound, or combination thereof in the copolymer is in the range of about 0.0001 to about 20%, about 0.0001 to about 1%, about 0.0025 to about 1%. In exemplary embodiments, the a temperature of at least about 220° C.

In exemplary embodiments, a process for preparing a poly(ethylenefuranoate) copolymer is provided, the process comprising: melt adding an electron-deficient alkene compound, an electron-deficient multialkene compound, or combination thereof, and poly(ethylenefuranoate) at a temperature of at least about 160° C. to produce a copolymer, wherein the mole percent of the electron-deficient alkene compound, the electron-deficient multialkene compound, or combination thereof in the copolymer is in the range about 0.0001 to about 20%, about 0.0001 to about 1%, about 0.0025 to about 1%. In exemplary embodiments, the a temperature of at least about 220° C.

In exemplary embodiments, a process for preparing a poly(ethylenefuranoate) copolymer is provided, the process comprising: adding an electron-deficient alkene compound, an electron-deficient multialkene compound, or combination thereof, to poly(ethylenefuranoate); and heating the reaction mixture to a temperature of at least about 160° C. to produce a copolymer, wherein the weight percent of the electron-deficient alkene compound, the electron-deficient multialkene compound, or combination thereof in the copolymer is in the range of about 0.0001 to about 20%, about 0.0001 to about 1%, about 0.0025 to about 1%. In exemplary embodiments, the a temperature of at least about 220° C.

In exemplary embodiments, a process for preparing a poly(ethylenefuranoate) copolymer is provided, the process comprising: melt adding an electron-deficient alkene compound, an electron-deficient multialkene compound, or combination thereof, and poly(ethylenefuranoate) at a temperature of at least about 160° C. to produce a copolymer, wherein the weight percent of the electron-deficient alkene compound, the electron-deficient multialkene compound, or combination thereof in the copolymer is in the range about 0.0001 to about 20%, about 0.0001 to about 1%, about 0.0025 to about 1%. In exemplary embodiments, the a temperature of at least about 220° C.

In exemplary embodiments, the electron-deficient alkene compounds, the electron-deficient multialkene compounds, or combination thereof, are added to PEF during an injection molding process. In exemplary embodiments, the electron-deficient alkene compounds, the electron-deficient multialkene compounds, or combination thereof, are added to PEF in an extruder. In exemplary embodiments, the electron-deficient alkene compounds, the electron-deficient multialkene compounds, or combination thereof, are added to PEF in a compounder. In exemplary embodiments, the electron-deficient alkene compounds, the electron-deficient multialkene compounds, or combination thereof, are added to PEF in a melt mixer. In exemplary embodiments, the electron-deficient alkene compounds, the electron-deficient multialkene compounds, or combination thereof, are added to PEF in a mixing vessel.

In exemplary embodiments, the reaction mixture is heated to a temperature of at least about 160° C., at least about 170° C., at least about 180° C., or at least about 200° C. In exemplary embodiments, the temperature is in the range of about 160° C. to about 260° C.

In exemplary embodiments, the electron-deficient alkene compounds, the electron-deficient multialkene compounds, or combination thereof, are added to PEF in a carrier, for example mineral oil or the like.

In exemplary embodiments, the process is carried out in the presence of a solvent, for example ethylene glycol.

In exemplary embodiments, the processes may be carried out under reduced pressure or under vacuum.

In exemplary embodiments, the reaction mixture is heated until a desired level of polymerization is achieved, for example until at least about 90%, about 95%, about 98% of the electron-deficient alkene compounds and/or electron-deficient multialkene compounds have been polymerized.

In exemplary embodiments, a process of preparing the exemplary copolymers may include adding one or more catalysts to the reaction mixture. Any catalyst suitable for use polycondensation reactions may be used, for example an acetate or carbonate of lead, zinc, manganese, calcium, cobalt, magnesium, or the like; a metal oxide of magnesium, zinc, lead, antimony or the like; and an organometallic compound of tin, lead, titanium or the like. In exemplary embodiments, the one or more catalysts is used in an amount of about 0.01 mol % to about 0.2 mol % relative to the amount of PEF monomers added to the reaction mixture.

In exemplary embodiments, the copolymer is prepared by process which comprises a transesterification step and a polycondensation step.

In exemplary embodiments, the process may further comprises a subsequent solid-state polycondensation step. In exemplary embodiments, the process may comprise a solid-state polycondensation step wherein pellets, granules, chips or flakes or polymer are subjected for a desired amount of time to elevated temperatures in a hopper, tumbling drier, vertical tube reactor or the like. In exemplary embodiments, a solid-state polycondensation step may increase the average molecular weight of the copolymer. Conditions and equipment for solid-state polycondensations are known in the art.

In exemplary embodiments, the copolymer obtained by the processes described herein is a thermoplastic resin.

Method of Producing Preforms and Articles

In one aspect, the present invention is a method of making PEF preforms and articles using the disclosed PE copolymer resins. Generally, such preforms and articles are made by forming the above described PEF copolymer into the desired article by conventional methods In one embodiment, the present invention is a method of making a PEF preform, using the disclosed copolymer.

Preforms are used in the injection stretch blow molding of plastic containers. A preform is generally made by injection molding a plastic resin.

In exemplary embodiments, the present invention is a method of providing a PEF preform, comprising (i) providing the PEF copolymer in a suitable form (e.g., a pellet); (ii) heating the PET copolymer to provide an amorphous PEF copolymer melt; (iii) injecting the amorphous PEF copolymer melt into a mold, to provide a PEF preform.

The preform is then stretch blow molded to provide a PEF container. The preform may be used in a single step process or a two-step process, the latter known as reheat injection blow molding. As would be understood by one of skill in the art, the two-step process differs from the single-step process in that the two-step process involves obtaining a preform previously injected molded and cooled to an appropriate storage temperature. In contrast, the one-step process involves stretch blow molding a preform that remains, as a result of injection molding, at a temperature suitable for stretch blow molding.

In one embodiment, the present invention is a method of making a PEF container, using the disclosed copolymer. Suitable methods include blow molding, and more particularly, extrusion blow molding, injection blow molding and injection stretch blow molding. In exemplary embodiments, the container is produced by compression molding.

In one embodiment, the method involves processing the PEF copolymer by extrusion blow molding to provide an article, such as a container. Advantageously, the PEF copolymer has the requisite rheological properties and mechanical performance for successful extrusion blow molding processing. The PEF copolymers of the present invention can be extrusion blow molded into large transparent bottles with handleware, such a gallon juice bottles. Table III in the Examples compares and contrasts the melt shear rheological properties of neat and modified PEF resins.

In extrusion blow molding, a specified length of a hollow melt tub (parison) is extruded, clamped in a mold, inflated and cooled against the mold wall, then ejected. Extrusion blow molding may be continuous or intermittent, and there any many variation on the method. To be suitable for use in extrusion blow molding, a polymer composition must exhibit adequate melt strength. Specifically, the polymer composition must exhibit a minimum level of melt strength to maintain parison shape during processing. If the polymer composition lacks sufficient melt strength, the parison will elongate and sag, making inflation and control of container wall thickness difficult.

As discussed above, the PEF copolymer of the present invention advantageously has high melt strength, such that it can be processed by extrusion blow molding to provide PEF articles, such as containers (e.g., bottles).

In exemplary embodiments, the copolymer may be used as a thermoplastic resin for extrusion blow molding or other processing methods that require high melt strengths.

In a particular embodiment, the copolymer is used as a thermoplastic resin for extrusion blow molding, which method may be continuous or intermittent.

In exemplary embodiments, the present invention is a method of extrusion blow molding, comprising (i) extruding a hollow tube (parison) of molten resin of an exemplary PEF copolymer until a desired length is achieved; (ii) cutting the tube of molten resin; (iii) clamping the tube into a mold having a shape of the container to be produced; (iv) injecting air; and (v) cooling the mold. The particular method of extrusion blow molding is not intended to be limiting, as would be understood by one of skill in the art. In exemplary embodiments, the extrusion blow molding method is continuous.

The exemplary PEF copolymers exhibit decreased parison sagging in comparison to neat (unmodified) PEF. In one embodiment, the parison sag ratio of the PEF copolymer is about 10%, about 20%, about 30%, about 40% or about 50% or less sagging in comparison to neat (unmodified) PEF.

The exemplary PEF copolymers are characterized by a lower parison sag ratios than neat (unmodified) PEF under the same conditions. In one embodiment, the parison sag ratio of the PEF copolymer is less than about 1.5, about 1.4, about 1.3, about 1.2, about 1.1 or about 1.0. In a preferred embodiment, the parison sag ratio is about between about 1.1 and about 1.0, or more particularly, about 1.05

In exemplary embodiments, the parison sag ratio of the PEF copolymer is less than about 1.2.

In exemplary embodiments, the parison sag ratio of the PEF copolymer is about between about 1.0 and about 1.2, or more particularly, between about 1.0 and about 1.1.

In exemplary embodiments, the resin is dried prior to injection molding such that the moisture content will be less than about 200 ppm by weight, or less than about 50 ppm by weight. In certain embodiments, the copolymer, for example the copolymer for use in bottles, undergoes a melt-processing step wherein the polymer is heated to a temperature in the range of about 220° C. to about 280° C. In certain embodiments, the temperature for injection stretch blow molding bottle comprised of the exemplary copolymers will be in the range of about 90° C. to 150° C. Blow molding machine parameters such as the timing of various events, injection rod speed, inflation pressure, inflation time, mold temperature, and the like are parameters which can be used to influence the bottle forming process.

The PEF copolymer resin can also be processed to produce a PET article by injection blow molding. With injection blow molding, the hot plastic material is first injected into a cavity where it encircles the blow stem, which is used to create the neck and establish the gram weight. The injected material is then carried to the next station on the machine, where it is blown up into the finished container as in the extrusion blow molding process above. Injection blow molding is generally suitable for smaller containers but not suitable for handleware.

The PEF copolymer resin can also be processed to produce a PET article by injection stretch blow molding As would be recognized by one of ordinary skill in the art, stretch blow molded plastic containers are manufactured by first preparing an injection molded preform from plastic resin. There are two processes for stretch blow molding containers—single step and two-step.

In one process (single step), the machinery involved injection molds a preform, which is then transferred within the machine to another station where it is blown and then ejected from the machine. This type of machinery is generally called injection stretch blow molding (ISBM) and usually requires large runs.

Thus, in exemplary embodiments, the present invention is a method of producing a PEF container; comprising i) providing the PEF copolymer in a suitable form (e.g., a pellet); (ii) heating the PET copolymer to provide an amorphous melt; (iii) injecting the amorphous melt into a mold, to provide a preform; (iv) biaxially stretching the preform by means of a stretch rod and pressurized air, thereby producing a PEF container.

In the other process, a preform has been injection molded previously then cooled. The preform is then place into a machine which reheats it so that it can be blown.

Thus, in exemplary embodiments, the present invention is a method of producing a PEF container, comprising (i) providing a preform comprising the PEF copolymer; (ii) heating the preform to a temperature suitable for stretching; and (iii) biaxially stretching the preform by means of a stretch rod and pressurized air, thereby producing a PEF container.

The preform stretch ratio is another valued used to describe the inventions herein. The preform stretch ratio refers to the nomenclature that is well known in the art and is defined according to the following formulas:

Overall stretch ratio=[(maximum internal container diameter/internal preform diameter)] times [height of container below finish)/(height of preform below finish)]. Or, in an alternate presentation, overall stretch ratio=hoop stretch ratio times axial stretch ratio Hoop stretch ratio=(maximum internal container diameter/internal preform diameter)

Axial stretch ratio=(height of container below finish/height of preform below finish)

According to one aspect of this invention, the injection molded preforms of the present invention are designed to have overall stretch ratios of from about 6 and about 30, or more particularly about 10 and about 28, or more particularly, about 12 and about 28, about 12 and about 24, about 12 and about 22, about 12 and about 20, about 12 and about 18 or about 12 and about 17.

In exemplary embodiments, the axial stretch ratio is between about 2.50 and about 3.50, while the corresponding inside hoop ratio is between about 3.50 and about 5.50. The areal stretch ratio is between about 6 and about 30, or more particularly, about 6 and about 38., compression molding, expandable bead molding. foam molding, In exemplary embodiments, the areal stretch ratio is about 28, with an axial stretch ratio of about 3.45 and an inside hoop stretch ratio of about 8.07.

Other suitable methods for processing the PEF copolymer resins include but are not limited to compaction plus sintering laminating, reaction injection molding, matched mold, matrix molding, plastic molding, pressure plug assist molding, rotational molding (or rotomolding), transfer molding, thermoforming, vacuum forming, vacuum plug assist molding Uses of Copolymers/Articles The exemplary copolymers are of value in all forms of application where currently PEF, PET and similar polyesters or polymers are used, for example in fiber, film and packaging materials.

In exemplary embodiments, the copolymer may be used as a thermoplastic resin for molding and molded into a desired shape to obtain a molded product. The molding method is not particularly limited. Exemplary molding methods include but are not limited to compression molding, extrusion molding, blow molding or injection molding.

In exemplary embodiments, the copolymer may be used with or may contain a required amount of an additive such as a colorant, dye, pigment, UV absorbing compound, antioxidant, plasticizer, softener, IR absorbers, flame retardant, an internal releasing agent, stabilizer, or any of various fillers known in the art.

In exemplary embodiments, a molded article molded with an exemplary polymer or a resin formulation comprising an exemplary copolymer is provided.

In exemplary embodiments, the copolymers may be used in fiber, film or packaging materials where high barrier properties are desirable, for example in packaging or containers for carbonated beverages or oxygen sensitive food. In exemplary embodiments, the copolymers may be used in fiber, film or packaging materials where to protect oxygen sensitive substances, beverages or materials, for example in packaging or containers for fruit juices, vitamin waters, beer, and wine. In exemplary embodiments, the protection of oxygen sensitive substances or materials can be achieved by using the exemplary copolymers and without the use of oxygen scavengers or multilayer film technology.

In exemplary embodiments, the dioxygen permeability of the PEF article is equal to or less than the dioxygen permeability of a similar article, formed from PET or unmodified PEF. In one embodiment, the dioxygen permeability is 15×, about 14×, about 13×, about 12×, about 11× or about 10× or greater than a similar article formed from PET or unmodified PEF.

In one embodiment, the PEF article has a dioxygen permeability no greater than about $0.06 \times 10^{-13}$ $cm^3$ $cm$ $cm^{-2}$ $s^{-1}$ $Pa^{-1}$.

In exemplary embodiments, the carbon dioxide permeability of the PEF article is equal to or less than the carbon dioxide permeability of a similar article, formed from PET or unmodified PEF. In one embodiment, the carbon dioxide permeability is 8×, about 7×, about 6×, about 5×, about 4×, about 3×, or about 2× greater than a similar article formed from PET or unmodified PEF.

In another embodiment, the PEF article has a carbon dioxide permeability no greater than about $0.4 \times 10^{-13}$ $cm^3$ $cm$ $cm^{-2}$ $s^{-1}$ $Pa^{-1}$.

In exemplary embodiments, the water permeability of the PEF article is equal to or less than the water permeability of a similar article, formed from PET or unmodified PEF. In one embodiment, the carbon dioxide permeability is 5×, about 4×, about 3×, about 2×, or about 1.5× greater than a similar article formed from PET or unmodified PEF.

In another embodiment, the PEF article has a water permeability of no greater than about no greater than 200× $10^{-13}$ $cm^3$ $cm$ $cm^{-2}$ $Pa^{-1}$.

Optionally, the PEF article may include a gas barrier additive, to decrease permeability to oxygen, carbon dioxide or water.

In one embodiment, the PEF article is a container, such as a bottle, can, pouch, carton, form-filled seal pack, bag-in-a-box, and primary packaging wraps. The PEF article can also be a component of packaging, for example, a barrier liner for a closure or a finish design part for a closure, frangible seal, heat seal or recloseable seal.

In exemplary embodiments, the PEF article is a bottle, such as a beverage bottle. In a particular embodiment, the PEF article is a bottle having a volume of about 500 mL or less. In another particular embodiment, the PEF article is a bottle having a volume of about 400 mL, about 350 mL, about 300 mL, about 250 mL, about 200 mL or less.

In other embodiments, the PEF article is a bottle having a volume of about 500 mL or greater.

In another embodiment, the PEF article is a film, such as an architectural film, construction film, consumer film, labels, heat-shrinkable monolayer film or heat-shrinkable multilayer film. The PEF article can also be an article comprising or containing a film, where the article is primary packaging: plastic wraps, case-ready films, sandwich bags, freezer bags, chip bags, vacuum-sealed bags, bags for bag-in-a-box containers, heat-shrink wraps, microwavable bags, microwavable wraps and foamed films. The PEF article can also be an article that comprises a film, where the article is secondary packaging: sleeves for aggregating containers, sealed bags for aggregating containers, and blister pack films for encasing prior-wrapped foods and drugs.

In another embodiment, the article is an adhesive, such as a reactive or non-reactive adhesive. The adhesive may be, for example, drying, pressure-sensitive adhesive, contact adhesive, or a hot-melt adhesive. In an exemplary embodiment, the PEF copolymer resin forms adhesives at a temperature selected from the range of 160 to 260° C.

In a further embodiment, the article is a bag. In exemplary embodiments, the article is a grocery bag, trash bag, laundry bags, dry-cleaning cover, shopping bag, or promotional bag.

In yet another embodiment, the article is a wrapper, such as a wrapper for items in storage, sealed wrappers for products on sale, or a resealable wrappers.

In a further embodiment, the article may be a coating, for example, a coating on an internal surface of a bottle, can, pouch, carton, form-filled seal packs, bag-in-a-box, or as a coating on a product-facing surface of a primary packaging wrap In a still further embodiment, the article is dinnerware or an eating utensil.

In yet another embodiment, the article is a molded part, for example for a vending machine.

In exemplary embodiments, the article is a heat-tolerant article such as (i) bowls or cups for holding coffee, tea, cocoa, and soup; (ii) hot fill cans, pouches and cartons; or (iii) microwavable packaging for food and beverages.

In exemplary embodiments, the article is used to contain a beverage or food that is hot-filled. For example, a beverage or food that is hot-filled into the containers (e.g., container made from polyethylene terephthalate (PET), or glass bottles and/or aluminum cans) and sealed so as to eliminate microbial contamination.

In exemplary embodiments, the article is a hot-fill container for containing a food or beverage, wherein the article is designed to manage the shrinkage during cooling. For example, the article is design to accommodate shrinkage during cooling by means of one or more concave vacuum panel areas into the sidewall of the container that are designed to deflect inwardly as the product cools.

In exemplary embodiments, the article is a hot-fill container for containing a high acid beverage or food (pH less than about 4.6). In a particular embodiment, the article is a hot-fill container for containing juice, vegetable juice, nectar, tea or the like.

In exemplary embodiments, the article is a form of packaging selected from the group consisting of: meal trays, meal covers, clamshells, plates, platters, bowls, saucers, mugs, drink cups, custard cups, lids, forks, knives, spoons, chop sticks, combination utensils, skewer, tongs, toothpicks, straws, seasoning dispensers, pitchers, gravy boats and casserole dishes.

In exemplary embodiments, when the copolymer is used for packaging, for example for bottles, then it may also be desired to incorporate other improvements into the packaging, such as the use of a bio-based closure. Exemplary materials for closures, include the use of poly(hydroxyl butyrate-co-valerate) (PBHV), other poly(hydroxyalkanoates), poly(lactic acid), new bio-based materials such as poly(butylene succinate), bio-based polyethylene, biobased polypropylene, polylactic acid, modified starches, and the blends above. The label may be of clear or colored material, and may be attached with adhesives or used as a shrink sleeve. Either the adhesive or shrink sleeve could be made, for example, from bio-based materials including but not limited to poly(lactic) acid based materials. In exemplary embodiments, a dye may be included in the copolymer or in a resin formulation comprising the copolymer, in order to give a distinctive look to the packaging or to protect the materials from light. For example, a dark amber or green bottle may be used in the packaging of light-sensitive substances or beverages. For colorless or substantially colorless bottles, a suitable amount of a bluing agent can be used to help mask the small amount of yellow color which is found in many polymeric resins, including those based on the 2,5-furancarboxylate moiety. For printing directly onto the copolymer or copolymer product, various surface treatments, such as corona treatment, may be used. If used as a packaging material, the copolymer or copolymer product may be subject to sterilization using any of the techniques known in the art, including but not limited to ozone treatment, UV treatment e-beam treatment, chemical surface contact treatment (aseptic), and the like.

In exemplary embodiments, the copolymer is used to form a bottle. In exemplary embodiments, the axial stretch ratio will be in the range of about 2.0 to about 3.7. In exemplary embodiments, the radial ratio will be in the range of about 2.5 to about 6.8. In exemplary embodiments, the overall areal ratio will be in the range of about 6 to about 25, or about 6 to about 28. In exemplary embodiments, the volume of the bottle will be in the range of about 150 mL to about 3 liters. In exemplary embodiments, the sidewall thickness of the bottle will be in the range of about 0.005 inch to about 0.030 inch, or about 0.005 inch to about 0.015 inch. In exemplary embodiments, functional products comprising the polymers can be made even when using a reduced about of polymer on a volume basis, compared to conventional PET bottles.

Plastic containers must conform to fairly rigid specifications, especially when used to contain and store carbonated beverages in warm climates and/or in the summer months. Under such conditions, the containers often undergo thermal expansion, commonly referred to in the industry as "creep", caused by the high pressure in the container at high temperature. The expansion increases the space between the PET molecules in the side wall of the container thus allowing for $CO_2$ to escape through the side wall faster than under normal conditions. Expansion also increases the head space of the container, which allows carbonation to escape from the beverage into the headspace area. Regardless of how carbonation is released from the beverage while enclosed in a container, loss of carbonation is undesirable because the beverage will taste "flat" when this occurs. Creep increases the interior space in the container which, in turn, reduces the height of the beverage in the container. This reduced height can translate into a perception by the consumer that the container is not completely full and, as such, perception of product quality is reduced.

In exemplary embodiments, the bottles made of the exemplary polymers may be stiffer than conventional bottles, with less pronounced creep, or will have increased creep resistance.

In one embodiment, the article formed from the PEF copolymer resin (e.g., a bottle) has one or more improved properties relative to PET and/or unmodified (i.e., neat) PEF, selected from improved resistance to creep and improved shelf life.

In exemplary embodiments, the article formed from the PEF copolymer resin has reduced creep relative to a similar article formed from PET or an unmodified PEF and more particularly, about 1%, about 5% less, about 10% less, about 15% less, about 20% less, about 25% less, about 30% less, about 35% less, about 40% less, about 45% less or about 50% or less creep. Optionally, the PEF copolymer may further comprise a creep control agent.

Advantageously, the container produced from the PEF copolymer of the present invention has increased shelf life relative to a similar container formed from PET or unmodified PEF—in each case measured under similar conditions (e.g., temperature and humidity). It is generally accepted that a packaged carbonated soft drink reaches the end of its shelf life when 17.5 percent of the carbon dioxide in the container is lost due to permeation of the carbon dioxide through the container side wall and closure. After a PET bottle is filled with approximately four volumes of carbon dioxide, the PET bottle will slowly expand with time due to the creep of PET molecules under pressure. The carbonation level is reduced due to the bottle expansion. The permeability of PET to carbon dioxide and the degree of bottle expansion due to PET molecule creep therefore determines the shelf life of the packaged carbonated beverage and thus, the suitability of PET as a packaging material.

In exemplary embodiments, the present invention is an extrusion blow molded bottle formed from the PEF copolymer resin having a shelf life of about 8, about 10, about 12, about 14, about 16, about 18 or about 20 weeks or greater. In a particular embodiment, the extrusion blow molded PEF bottle has a shelf life of about 20 weeks, about 30 weeks, about 40 weeks or about 50 weeks or more.

In exemplary embodiments the article formed from the PEF copolymer has a shelf life of about 8 about 10, 8, about 10, about 12, about 14, about 16, about 18, about 20, about 22, about 24, about 26, about 28, about 30, about 32, about 34, about 36, about 38 or about 40, about 42, about 44, about 46, about 48 or about 50 weeks or greater.

In exemplary embodiments, a bottle, film or fiber-containing object formed from an exemplary copolymer is provided. In exemplary embodiments, the bottle is an injection stretch blow-molded bottle. In exemplary embodiments, the film is a biaxially oriented film. In exemplary embodiments, the fiber-containing object is a drawn fiber.

The following examples are presented for illustrative purposes only, and are not intended to be limiting.

EXAMPLES

Example 1. Preparation of Exemplary Copolymers

PEF is mixed with the desired branching, e.g. an electron-deficient alkene or electron-deficient multialkene, in the mole percent range of 0.0001 to 20 wt % via either direct combination or combination at the point of entry into an extruder or injection press. The materials are conveyed through the extruder or injection press at a temperature sufficient to melt the PEF and provide mixing of the additive into the PEF (for example, at a temperature of about 220° C.). The material is then injection molded into a part or extruded as film, fiber or a bulk material.

Example 2: Rheology Measurements of PEF

An evaluation of the entanglement density of PEF was conducted. A review of isochronal (1 Hz) dynamical mechanical data measured in tension indicated a plateau modulus of about 3.59 MPa at 125° C. According to the Doi-Edwards relationship for the rubbery plateau shear modulus:

$$G_N^0 = \frac{4\rho RT}{5M_e} \quad (1)$$

In the case of rubbers, the plateau modulus measured in tension, $E_N^0 = 3G_N^0$, so that Equation (1) must be modified as follows:

$$E_N^0 = \frac{12\rho RT}{5M_e} \quad (2)$$

One may see results quoted in the scientific literature using the more traditional equations for the plateau modulus which neglect the 4/5 prefactor. In this case, for shear the result is:

$$G_N^0 = \frac{\rho RT}{M_e} \quad (3)$$

And for measurement in tension:

$$E_N^0 = \frac{3\rho RT}{M_e} \quad (4)$$

The entanglement molecular weight, $M_e$, using Equation (4) with dynamic mechanical analysis data measured in tension was found to be 3,710 for PEF. Separate testing in the melt at 120° C. under dynamic shear for a 0.912 dL/g PEF resin, using the procedure described below, confirmed the validity of this this value with a result of 3,550 g/mol, using Equation (3). The values obtained using Equations (2) and (1) were 3,710 g/mol and 2,970 g/mol, respectively. As the value for $M_e$ decreases, the entanglement density of the polymer increases.

Simply stated, entanglements within the amorphous phase of a polymer provide the resistance to failure against which chains can be oriented as the article is formed into its final shape. A polymer with a higher entanglement density in its amorphous phase will be more ductile and less prone to fracture in brittle failure. Fetters et al. [*Physical Properties of Polymers Handbook*, Second Ed., Chapter 25, 445-452 (2006)] a value for the entanglement molecular weight for amorphous PET of 1,450 g/mol, using Equation (3) as the basis for calculation. The plateau modulus (and entanglement molecular weight) is generally considered a unique property of the particular polymer. These values indicate the entanglement density for amorphous PEF is roughly 41% of that for amorphous PET.

Melt rheological analyses were performed for a 0.912 dL/g IV virgin PEF resin prepared from 2,5-dimethyl furanoate. The samples were melt compounded and pressed into 25-mm diameter, 2 mm thick discs. The discs were dried in a vacuum oven at 140° C. for at least 20 hours and were placed in a dessicator.

Rheological measurements were performed using a Rheometrics ARES strain-controlled rheometer using a constant strain amplitude of 3%. Temperature-frequency sweeps were conducted from high frequency to low frequency (512 rad/s to 1 rad/s) at measurement temperatures of 240, 200, 160, and 120° C. following an initial preheat of 250° C. to erase vestiges of crystallinity. The resulting data were reduced to a master curve at 120° C. using time-temperature superposition, with an Arrhenius flow activation energy of 161.0 kJ/mol ($R^2=0.9681$). The plateau modulus $G_N^0$, extracted from the minimum in the loss tangent curve, was determined to be 1.25 MPa, yielding and entanglement density $v_e$ of 0.382 mmol/cm$^3$ and an entanglement molecular weight of 3,550 g/mol using the traditional equation $G_N^0 = v_e RT$, where R is the gas constant and T is the absolute temperature. The mass density of PEF at 120° C. (393K) was calculated using the equation $\rho$ (g/cm$^3$)=1.435 exp[$-6.0 \times 10^{-4}$(T−298)]. $M_e$ was computed using the equation $M_e = \rho/v_e$.

Example 3. Exemplary Polymer Comprising 1,1'-(propane-2,2'-diylbis(4,1-phenylene))bis(1H-pyrrole-2,5-dione) (BMI)

The exemplary polymer was prepared by melt compounding 1 wt % BMI with 0.86 dL/g IV PEF resin. The PEF resin was prepared from 2,5-dimethyl furanoate made from furan dicarboxylic acid.

Samples of the polymer were melt compounded and pressed into 25-mm diameter, 2 mm thick discs. The discs were dried in a vacuum oven at 140° C. for at least 20 hours and were placed in a desiccator.

Rheological measurements were performed using a Rheometrics ARES strain-controlled rheometer using a constant strain amplitude of 3%. Temperature-frequency sweeps were conducted from high frequency to low frequency (512 rad/s to 1 rad/s) at measurement temperatures of 220, 200, 180, and 160° C. following an initial preheat of 250° C. before each measurement to erase vestiges of crystallinity.

Runs below 160° C. were not possible die to the rapid onset of crystallization due to supercooling below the equilibrium melt temperature. The resulting data were reduced to a master curve at 160° C. using time-temperature superposition, with an Arrhenius flow activation energy of 124.1 kJ/mol ($R^2$=0.9919). The plateau modulus $G_N^0$, extracted from the minimum in the loss tangent curve, was determined to be 0.83 MPa, yielding and entanglement density $v_e$ of 0.230 mmol/cm$^3$ and an entanglement molecular weight of 5,750 g/mol using the traditional equation $G_N^0=v_e RT$, where R is the gas constant and T is the absolute temperature. The mass density of PEF at 160° C. (393K) was calculated using the equation $\rho$ (g/cm$^3$)=1.435 exp[$-6.0\times10^{-4}$(T$-$298)]. $M_e$ was computed using the equation $M_e=\rho/v_e$.

Example 4. Exemplary Polymer Comprising Pyromellitic Dianhydride (PMDA)

The exemplary polymer was prepared by melt compounding 0.1 wt % PMDA with 0.86 dL/g IV PEF resin. The PEF resin was prepared from 2,5-dimethyl furanoate made from furan dicarboxylic acid.

Samples of the polymer were melt compounded and pressed into 25-mm diameter, 2 mm thick discs. The discs were dried in a vacuum oven at 140° C. for at least 20 hours and were placed in a desiccator.

Rheological measurements were performed using a Rheometrics ARES strain-controlled rheometer using a constant strain amplitude of 3%. Temperature-frequency sweeps were conducted from high frequency to low frequency (512 rad/s to 1 rad/s) at measurement temperatures of 240, 200, 160, and 120° C. following an initial preheat of 250° C. before each measurement to erase vestiges of crystallinity. The resulting data were reduced to a master curve at 120° C. using time-temperature superposition, with an Arrhenius flow activation energy of 175.9 kJ/mol ($R^2$=0.9737). The plateau modulus $G_N^0$, extracted from the minimum in the loss tangent curve, was determined to be 0.90 MPa, yielding and entanglement density $v_e$ of 0.275 mmol/cm$^3$ and an entanglement molecular weight of 4,920 g/mol using the traditional equation $G_N^0=v_e RT$, where R is the gas constant and T is the absolute temperature. The mass density of PEF at 120° C. (393K) was calculated using the equation $\rho$ (g cm$^3$)=1.435 exp[$-6.0\times10^4$(T$-$298)]. $M_e$ was computed using the equation $M_e=\rho/v_e$.

Example 5: Rheological Properties of PET, Neat PEF and PEF Copolymers

Sample Preparation:

Bottles or preforms comprising PET or PEF were cut into small pieces (approximately 1 cm×1 cm) and ground in a CryoMill (Retsch) at a frequency of 250 Hz for 5 min. The resulting powder was compression molded (Carver Hydraulic Unit, Model #3912) into a 3 mm disc, 25 mm in diameter. All resin discs were dried overnight in a vacuum oven at 120° C. before testing.

Rheological Characterization

Shear viscosity-shear rate master curves for PET and PEF were determined using stepped isothermal frequency sweeps on an ARES G2 strain-controlled rheometer (TA Instruments). PEF-based samples were characterized using 25 mm diameter compression molded discs inserted between the parallel plates of the rheometer at 250° C., melted, set at the initial plate spacing, and trimmed to the plate diameter. A dynamic rate sweep over the angular frequency range 512 to 0.3 rad/s was performed with the parallel plate fixture set at an initial spacing of 1 mm, while the melt temperature was stepped in 20° C. increments from 240° C. to 140° C. using a 3% command strain under a dry nitrogen environment.

PET-based samples were characterized using 25 mm diameter compression molded discs inserted between the parallel plates of the rheometer at 290° C. and prepared as for the PEF samples. A dynamic rate sweep over the angular frequency range 512 to 0.3 rad/s was performed with the parallel plate fixture set at an initial spacing of 1.00 mm, while the melt temperature was stepped in 20° C. increments from 290° C. to 240° C. using a 3% command strain in a heated, dry nitrogen environment.

Samples of unmodified and modified PEF 25 mm discs were made by compression molding at a temperature of 260° C. All the sample discs were dried in the vacuum oven for at least overnight before testing. Steady shear rheological measurements were carried out on a 0.1001 rad, 25.0 mm stainless steel cone and plate fixture using a TA Instruments Ares-G2 rheometer operating under a dry nitrogen environment. The samples were mounted at 230° C. and trimmed to a gap of 0.10 mm. The testing gap (truncated cone) was set to 0.0532 mm. After the samples are conditioned at 230° C. for 30 s, shear rates from 0.1 to $1\times10^{-5}$ s$^{-1}$ were applied for steady flow sweep. Data points were collected at every five points per decade. Data points below the transducer sensitivity limit were rejected as noise.

Data Analysis

Master curves were constructed using time-temperature superposition (horizontal shifting only) with reference temperatures of 140° C. and 240° C. for PEF-based melts. Master curves reference to 140° C. were used to extract the plateau modulus from the value of the storage modulus taken at the loss tangent minimum and to facilitate the calculation of the entanglement molecular weight, whereas master curves at 240° C. were used to assess resin melt processing. Master curves at the reference temperature of 290° C. were obtained. Master curves were constructed using time-temperature superposition (horizontal shifting only) with a reference temperature of 290° C.

Polymer melts are said to be thermorheologically simple if time-temperature superposition (TTS) can be used successfully to shift isothermal rheological data horizontally on a double logarithmic plot along the time or rate abcissa. Adherence to TTS implies the material's described rheological function exhibits the same temperature dependence over a broad rate or frequency range since relaxation motions remain consistent over that range. This implies that material viscoelastic functions may be shifted horizontally and vertically (if a density correction is needed) on a double logarithmic plot to collapse the rheological data into a single curve that is useful for expanding the frequency range of material response.

In this study, the TTS of PET and PEF-based polymers was performed to obtain master flow curves for assessing the deformation rate dependence of the respective polymer at a given reference temperature. Van Gurp-Palmen diagrams were constructed using the developed master curves were plotted to analyze the relative increase in long chain branching architecture generated by reactive extrusion modification of the polymer melt by the addition of pyromellitic dianhydride (PMDA) and pentaerythritol (PENTA).

Van Gurp-Palmen diagrams were constructed by plotting phase angle, δ, between storage modulus and loss modulus vs the absolute value of the complex modulus, |G*| at a given reference temperature. Van Gurp-Palmen plots are temperature invariant and prove a method to check conformance with the time-temperature superposition principle. One advantage of utilizing Van Gurp-Palmen curves to analyze polymer viscoelastic response is the changes in the polymer chemical nature (e.g. weight-average molecular weight, $M_w$; polydispersity index, PI; presence and extent of long chain branching; etc.) may be inferred by comparing the curves of two different polymers. For examples, compared to linear polymers, the polymer incorporating long chain branching exhibit lower phase angles and reduced areas under the in the Van Gurp-Palmen curves for the same complex modulus limits. This provides a powerful tool to analyze the relative effects the effect of long-chain branching on the constitutive response of the polymers.

TABLE III

Variation of rheological properties for neat PET, PEF, and chain modified PEF melts at 230° C. as measured in dynamic and steady shear. The PET melt is referenced to 290° C.

| Item | PMDA Added (wt. %) | PENTA Added (wt. %) | Zero-Shear Viscosity $\eta_0$ (Pa · s) | Relaxation Time $\lambda_1$ (s) | Relaxation Time $\lambda_2$ (s) | Relaxation Time Ratio | Solution Intrinsic Viscosity (dL/g) |
|---|---|---|---|---|---|---|---|
| PET-0 | 0.0000 | 0.0000 | 644.0 | 0.0585 | $6.75 \times 10^{-4}$ | 86.7 | 0.823 |
| PEF-0 | 0.0000 | 0.0000 | 6,160 | 0.0292 | $7.56 \times 10^{-4}$ | 38.6 | 0.900 |
| PEF-1 | 0.0250 | 0.0156 | 6,580 | 0.0646 | $1.56 \times 10^{-3}$ | 41.5 | 0.822 |
| PEF-3 | 0.1581 | 0.0970 | 12,530 | 4.97 | $6.17 \times 10^{-4}$ | 8,060 | 0.923 |
| PEF-4 | 0.1913 | 0.1216 | 23,270 | 3.68 | $1.62 \times 10^{-3}$ | 2,270 | 0.910 |
| PEF-5 | 0.2627 | 0.0332 | 80,840 | 17.7 | $1.47 \times 10^{-3}$ | 12,100 | 1.168 |
| PEF-6 | 0.4271 | 0.0531 | 100,000 | 49.8 | $3.54 \times 10^{-4}$ | 141,000 | 1.265 |

NOTE:
The zero-shear viscosity and the relaxation times $\lambda_1$ and $\lambda_2$ were computed from a modified Carreau model fit [see Stadler and Münstedt, *J. Non-Newtonian Fluid Mech.*, 151 (2008) 129-135] to the master curve at 230° C. for PEF and 290° C. for PET.

Example 6: Free Blow Experiments

Injection Molding

Preforms were injection molded on an Arburg 420 injection molding machine at Plastics Technologies, Inc. in Holland, Ohio.

TABLE 4

Preform injection molding conditions for unmodified PET and PEF, and modified PEF resins.

| Variable Description | PET-0 | PEF-0 | PEF-1 | PEF-2 | PEF-3 | PEF-4 | PEF-5 | PEF-6 |
|---|---|---|---|---|---|---|---|---|
| Injection Molding Machine | Arburg 420 C | Arburg 420 C | Arburg 420 C | Arburg 420 C | Arburg 420 C | Arburg 420 C | Arburg 420 C | Arburg 420 C |
| Preform # | 29 | 29 | 29 | 29 | 29 | 29 | 29 | 29 |
| Preform Weight (g) | 12.9 | 13.7 | 13.7 | 13.7 | 13.7 | 13.7 | 13.7 | 13.8 |
| Relative Humidity (% RH) | 32% | 18% | 22% | 17% | 17% | 17% | 32% | 31% |
| Dew Point (° F.) | 45.8 | 25 | 29.7 | 24.8 | 24.3 | 24.3 | 41.9 | 42.8 |
| Mold Temp (° F.) | 45 | 45 | 45 | 45 | 45 | 45 | 45 | 45 |
| Ambient Temp (° F.) | 78.6 | 71 | 70.7 | 71 | 71 | 71.2 | 74.1 | 75.3 |
| Dryer Temp (° F.) | 250 | 250 | 250 | 250 | 250 | 250 | 250 | 250 |
| Barrel Temperatures | | | | | | | | |
| Feed (° C.) | 264 | 253 | 255 | 256 | 255 | 255 | 273 | 275 |
| Zone 2 (° C.) | 268 | 255 | 255 | 261 | 256 | 255 | 275 | 278 |
| Zone 3 (° C.) | 270 | 254 | 255 | 257 | 255 | 255 | 275 | 275 |
| Zone 4 (° C.) | 274 | 255 | 255 | 256 | 255 | 255 | 275 | 275 |
| Nozzle (° C.) | 277 | 260 | 259 | 260 | 260 | 260 | 285 | 284 |
| Injection | | | | | | | | |
| Injection Pressure 1 (bar) | 1,500 | 1,200 | 1,800 | 1,200 | 1,200 | 1,200 | 1,500 | 1,500 |
| Injection Pressure 2 (bar) | 1,500 | 1,200 | 1,800 | 1,200 | 1,200 | 1,200 | 1,500 | 1,500 |
| Injection Time (sec) | 1.4 | 1.4 | 1.3 | 1.4 | 1.4 | 1.4 | 1.4 | 1.5 |
| 1st Injection Speed (ccm/sec) | 12.0 | 12.0 | 12.0 | 12.0 | 12.0 | 12.0 | 12.0 | 12.0 |
| 2nd Injection Speed (ccm/sec) | 10.0 | 10.0 | 10.0 | 10.0 | 10.0 | 10.0 | 10.0 | 10.0 |
| 3rd Injection Speed (ccm/sec) | 0.0 | 0.0 | 0.0 | 0.0 | 0.0 | 0.0 | 0.0 | 0.0 |
| Holding Pressure | | | | | | | | |
| Switch-Over Point (ccm) | 6.0 | 5.0 | 6.0 | 5.0 | 5.0 | 5.0 | 6.0 | 6.0 |
| 1st Hold Pressure (bar) | 300.0 | 500.0 | 600.0 | 500.0 | 500.0 | 500.0 | 0.0 | 0.0 |
| 2nd Hold Pressure (bar) | 300.0 | 500.0 | 600.0 | 500.0 | 500.0 | 500.0 | 0.0 | 0.0 |
| 3rd Hold Pressure (bar) | 0.0 | 0.0 | 0.0 | 0.0 | 0.0 | 0.0 | 0.0 | 0.0 |

TABLE 4-continued

Preform injection molding conditions for unmodified PET and PEF, and modified PEF resins.

| Variable Description | PET-0 | PEF-0 | PEF-1 | PEF-2 | PEF-3 | PEF-4 | PEF-5 | PEF-6 |
|---|---|---|---|---|---|---|---|---|
| 4th Hold Pressure (bar) | 0.0 | 0.0 | 0.0 | 0.0 | 0.0 | 0.0 | 0.0 | 0.0 |
| 1st Hold Pr. Time (sec) | 0.0 | 0.0 | 0.0 | 0.0 | 0.0 | 0.0 | 0.0 | 0.0 |
| 2nd Hold Pr. Time (sec) | 3.0 | 3.0 | 5.0 | 3.0 | 3.0 | 3.0 | 3.0 | 3.0 |
| 3rd Hold Pr. Time (sec) | 0.0 | 0.0 | 0.0 | 0.0 | 0.0 | 0.0 | 0.0 | 0.0 |
| 4th Hold Pr. Time (sec) | 0.0 | 0.0 | 0.0 | 0.0 | 0.0 | 0.0 | 0.0 | 0.0 |
| Remain Cool Time (sec) | 9.0 | 9.0 | 12.0 | 9.0 | 9.0 | 9.0 | 9.0 | 9.0 |
| Dosage | | | | | | | | |
| Circumf. Speed (m/min) | 6.0 | 4.0 | 6.0 | 4.0 | 4.0 | 4.0 | 4.0 | 4.0 |
| Back Pressure (bar) | 30.0 | 30.0 | 30.0 | 30.0 | 30.0 | 30.0 | 30.0 | 30.0 |
| Dosage Volume (ccm) | 17.0 | 15.0 | 16.0 | 15.0 | 15.0 | 15.0 | 17.0 | 17.0 |
| Meas. Dosage Time (sec) | 3.3 | 4.8 | 3.2 | 5.0 | 4.9 | 5.0 | 5.5 | 5.8 |
| Cushion (ccm) | 4.6 | 1.4 | 2.8 | 2.1 | 2.2 | 2.2 | 2.2 | 2.2 |
| Adjustment Data | | | | | | | | |
| Plastic Pressure (bar) | 600.0 | 780.0 | 860.0 | 880.0 | 890.0 | 830.0 | 1,210.0 | 1,360.0 |
| Preform SIV | 0.823 | 0.900 | 0.822 | 0.921 | 0.923 | 0.910 | 1.168 | 1.265 |
| Cycle Time (sec) | 17.3 | 17.2 | 22.6 | 17.2 | 17.2 | 17.2 | 17.2 | 17.2 |

Freeblow Stretching Experiments

Preform free blow experiments were performed using an apparatus designed and developed by Plastic Technologies, Inc. Preforms were preheated in an infrared oven and thermally equilibrated at the desired stretching temperature in a hot air convection oven prior to free blow testing. Biaxial stretching progress during the free blow experiment was followed by high-speed videography. Specifically, diamond-shaped reference marks on the preform were used to gather information about preform stretching as a function of time.

Data Analysis

Screen captures were performed at selected intervals in order to successfully discretize the progression of preform deformation in the axial and hoop directions. Dimensional data extracted from the captured screen images were used to determine the local and global stretch ratios and stretch rates using the equations summarized below, where i refers to the local or global measurement at the $k^{th}$ time, and the subscript 0 refers to the instant ($t_0$=0) when the stretch rod deploys, preblow is initiated, and the free blow experiment starts.

The instantaneous axial stretch ratios $\lambda_{axial,i}(t_k)$ at any time $t_k$ are given by

TABLE 5

Conditions employed for free blow experiments.

| Variable Description | PET-0 | PEF-0 | PEF-1 | PEF-2 | PEF-3 | PEF-4 | PEF-5 |
|---|---|---|---|---|---|---|---|
| IR Oven Process Inputs | | | | | | | |
| Lamp Power (w) | 1,000 | 1,000 | 1,100 | 1,000 | 1,000 | 1,000 | 1,150 |
| Blower Speed (%) | 75 | 75 | 75 | 75 | 75 | 75 | 75 |
| Heating Time (sec) | 35.0 | 50.0 | 65.0 | 60.0 | 60.0 | 60.0 | 60.0 |
| Final Temp (° C.) | 100.4 | 103.6-107 | 108 | 114.7-119 | 116.9 | 114.6 | 125 |
| Convection Oven Inputs | | | | | | | |
| Oven Temp (° C.) | 115 | 120 | 120 | 120 | 115 | 115 | 120 |
| Preform Position | 5 | 1 | | 1 | 1 | 1 | 1 |
| Preform Heating Time (min) | 5 | 5 | 5 | 5 | 5 | 5 | 5 |
| Preform Temp (° C.) | 110 | 108.7 | 109 | 108 | 108-110 | 110 | |
| Preform Expansion Process Inputs | | | | | | | |
| Stretch Rod Extension (mm) | 5 | 5 | 5 | 5 | 5 | 5 | 5 |
| Clamp Close Fault Delay (sec) | 3.0 | 3.0 | 0.0 | 3.0 | 3.0 | 3.0 | 3.0 |
| Stretch Rod Delay (sec) | 1.0 | 0.0 | 1.0 | 1.0 | 1.0 | 1.0 | 0.0 |
| Stretch Rod Down (sec)' | 1.0 | 0.0 | 1.0 | 1.0 | 1.0 | 1.0 | 1.0 |
| Preblow Delay (sec) | 0.0 | 0.0 | 0.0 | 0.0 | 0.0 | 0.0 | 0.0 |
| Preblow Time (sec) | 25 | 25 | 15 | 20 | 20 | 25 | 25 |
| Preblow Pressure (psi) | 58.0 | 55.0 | 55.0 | 56.0 | 60.0 | 58.0 | 96.0 |
| Secondary Blow Delay (sec) | 0.0 | 0.0 | 0.0 | 0.0 | 0.0 | 0.0 | 0.0 |
| Secondary Blow Time (sec) | 25.0 | 15.0 | 25.0 | 25.0 | 25.0 | 25.0 | 15.0 |
| Secondary Blow Pressure (psi) | 55.0 | 40.0 | 57.0 | 50.0 | 50.0 | 55.0 | 75.0 |
| Clamp Open Delay | 3.0 | 3.0 | 3.0 | 3.0 | 3.0 | 3.0 | 3.0 |
| Preform Expansion Process Outputs | | | | | | | |
| Blow Temp (° C.) | 106.7 | 108.3 | 111.4 | 110.4 | — | 113.6 | 105.9 |
| Maximum Temp (° C.) | 125 | 124.5 | — | 124.9 | — | 124 | 118.1 |
| Maximum Pressure (psi) | 58.0 | 55.2 | — | 56.4 | — | 58.0 | 54.2 |

$$\lambda_{axial,i}(t_k) = \frac{l_i(t_k)}{l_{0,i}};$$

$$\lambda_{axial,i}(t_k) \geq 1$$

the ratio of the axial length $l_i(t_k)$ specified relative to the measurement mode i (local diamond or overall preform dimension) for the time or frame k at which the measurements were taken, to the initial preform length above the support ring datum plane at the start of the experiment.

Similarly, the instantaneous hoop stretch ratios $\lambda_{hoop,i}(t_k)$ at any time $t_k$ are given by $$\lambda_{hoop,i}(t_k) = \frac{w_i(t)}{w_{0,i}};$$

$$\lambda_{hoop,i}(t) \geq 1$$

the ratio of the projected hoop width $w_i(t_k)$ specified relative to the measurement mode i (local diamond or overall preform dimension) for the time or frame k at which the measurements were taken, to the initial preform projected width above the support ring datum plane at the start of the experiment.

The instantaneous areal stretch ratio is simply the product of the instantaneous axial and hoop stretch ratios, respectively.

$$\lambda_{areal,i}(t_k) = \lambda_{axial,i}(t_k) \cdot \lambda_{hoop,i}(t_k) = \frac{l_i(t_k)}{l_{0,i}} \frac{w_i(t_k)}{w_{0,i}}$$

Axial, hoop and areal stretch rate were computed from the discrete data by assuming forward and backward differences for the starting and ending points, $$\frac{d\lambda_{axial,i}}{dt} = \frac{1}{l_{0,i}} \frac{dl_i(t_0)}{dt} \approx \frac{\lambda_{axial,i}(t_0 + \Delta t) - \lambda_{axial,i}(t_0)}{\Delta t}$$

$$\frac{d\lambda_{hoop,i}}{dt} = \frac{1}{w_{0,i}} \frac{dl_i(t_0)}{dt} \approx \frac{\lambda_{hoop,i}(t_0 + \Delta t) - \lambda_{hoop,i}(t_0)}{\Delta t}$$

$$\frac{d\lambda_{areal,i}}{dt} = \frac{\lambda_{areal,i}(t_0 + \Delta t) - \lambda_{areal,i}(t_0)}{\Delta t}$$

and central differences for the second to penultimate points.

$$\frac{d\lambda_{axial,i}}{dt} = \frac{1}{l_{0,i}} \frac{dl_i(t_k)}{dt} \approx \frac{\lambda_{axial,i}(t_k - \Delta t) - \lambda_{axial,i}(t_k + \Delta t)}{2\Delta t}$$

$$\frac{d\lambda_{hoop,i}}{dt} = \frac{1}{w_{0,i}} \frac{dl_i(t_k)}{dt} \approx \frac{\lambda_{hoop,i}(t_k - \Delta t) - \lambda_{hoop,i}(t_k + \Delta t)}{2\Delta t}$$

$$\frac{d\lambda_{areal,i}}{dt} = \frac{\lambda_{areal,i}(t_k - \Delta t) - \lambda_{areal,i}(t_k + \Delta t)}{\Delta t}$$

It should be noted that the use of central differences produces a measure of smoothing of the data.

Free blow pressure and balloon temperature were measured using an Omega PX209-200G5V pressure transducer and an Omega OS551-V1-6-BB infrared camera. A synchronous data sampling interval of 10 ms was used following preblow/highblow activation. Pressure and temperature data were synchronized with the timing of the indicator lights for preblow/highblow activation in the video frames. True axial and hoop stresses were compute using the following two equations, respectively:

$$\sigma_{axial}(t) = \frac{P_{gauge}(t) D_0 \lambda_{hoop,i}^2(t) \lambda_{axial,i}(t)}{4 h_0}$$

$$\sigma_{hoop}(t) = \frac{P_{gauge}(t) D_0 \lambda_{hoop,i}^2(t) \lambda_{axial,i}(t)}{2 h_0}$$

TABLE 6

Free blow experiment results for neat PET and PEF, and modified PEF performed preforms (CT-10029-1).

| Resin Formulation | PMDA (wt. %) | PENTA (wt. %) | Preform Solution Intrinsic Viscosity (dL/g) | Time to Peak Strain Rate (s$^{-1}$) | | | Peak Strain Rate (s$^{-1}$) | | | Final Stretch Ratio | | |
|---|---|---|---|---|---|---|---|---|---|---|---|---|
| | | | | Axial | Hoop | Areal | Axial | Hoop | Areal | Axial | Hoop | Areal |
| PET-0 | 0.0000 | 0.0000 | 0.823 | 0.35 | 0.33 | 0.35 | 11.63 | 36.16 | 79.63 | 2.87 | 4.30 | 12.33 |
| PEF-0 | 0.0000 | 0.0000 | 0.900 | 4.10 | 4.10 | 4.23 | 3.93 | 6.76 | 24.80 | 3.37 | 4.51 | 15.61 |
| PEF-1 | 0.0250 | 0.0156 | 0.822 | 6.67 | 6.50 | 6.58 | 2.89 | 5.34 | 19.07 | 3.10 | 4.69 | 14.58 |
| PEF-2 | 0.1178 | 0.0738 | 0.921 | 6.97 | 6.63 | 6.80 | 1.37 | 2.55 | 9.73 | 2.99 | 4.91 | 14.70 |
| PEF-3 | 0.1581 | 0.0970 | 0.923 | 13.00 | 11.33 | 13.00 | 0.35 | 0.56 | 2.28 | 2.72 | 4.78 | 13.00 |
| PEF-4 | 0.1913 | 0.1216 | 0.910 | 8.08 | 7.75 | 7.75 | 0.93 | 2.08 | 6.96 | 2.72 | 4.72 | 12.81 |

Example 7. Comparison of Carreau-Yasuda Model fit parameters of neat PEF resins with exemplary PEF copolymers.

| Cross Model Parameter | Neat PEF Resin | Modified PEF Resin (0.0500 wt. % PMDA + 0.0312 wt. % PENTA) | Modified PEF Resin (0.1178 wt. % PMDA + 0.0907 wt. % PENTA) |
|---|---|---|---|
| Reference Temperature, $T_r$ (° C.) | 230.0 | 230.0 | 230.0 |
| Flow Activation Energy, $E_A$ (kJ/mol) | 125 | 110 | 106 |
| Zero-Shear Viscosity, $\eta_0(T_r)$ (Pa · s) | 6,160 | 12,500 | 19,900 |
| Relaxation Time, $\lambda_1(T_r)$ (s) | 0.0292 | 4.97 | 2.41 |
| Exponent, $a_1$ | 2.00 | 2.00 | 2.00 |
| Relaxation Time, $\lambda_2(T_r)$ (s) | 7.56 × 10$^{-4}$ | 6.17 × 10$^{-4}$ | 3.97 × 10$^{-3}$ |

Example 7. Comparison of Carreau-Yasuda Model fit parameters of neat PEF resins with exemplary PEF copolymers.

| Cross Model Parameter | Neat PEF Resin | Modified PEF Resin (0.0500 wt. % PMDA + 0.0312 wt. % PENTA) | Modified PEF Resin (0.1178 wt. % PMDA + 0.0907 wt. % PENTA) |
| --- | --- | --- | --- |
| Exponent, $a_2$ | 0.412 | 0.285 | 0.312 |
| Power Law Exponent, n | 0.647 | 0.833 | 0.871 |

Experimental Analysis:

Rheological characterization for the shear viscosity-shear rate master curves for PEF were determined using stepped isothermal frequency sweeps on an ARES G2 strain-controlled rheometer (TA Instruments). Samples were characterized using 25 mm diameter compression molded discs inserted between the parallel plates of the rheometer at 240° C., melted, set at the initial plate spacing, and trimmed to the plate diameter. A dynamic rate sweep over the angular frequency range 512 to 0.3 rad/s was performed with the parallel plate fixture set at an initial spacing of 1 mm, while the melt temperature was stepped in 20° C. increments from 240° C. to 140° C. using a 3% command strain under a dry nitrogen environment. Master curves were constructed using time-temperature superposition (horizontal shifting only) with reference temperatures of 140° C. and 240° C. for PEF-based melts. Master curves reference to 140° C. were used to extract the plateau modulus from the value of the storage modulus taken at the loss tangent minimum and to facilitate the calculation of the entanglement molecular weight, whereas master curves at 240° C. were used to assess resin melt processing.

The Carreau-Yasuda model is an empirical, shear-rate ($\dot{\gamma}$) dependent (non-Newtonian) constitutive model given by the following equation (see Table 1 for the definition of variables):

$$\eta(T, \dot{\gamma}) = \frac{a_T \eta_0(T_r)}{[1 + \{a_T \lambda_0(T_r)\}^a]^{\frac{1-n}{a}}}$$

where $\eta_0$ is the zero-shear viscosity of the polymer melt comprising the extruding parison. After time t, the parison length x is composed of the extruded length, $x_e$ and an additional length increment due to sag, $x_s$:

$$x = x_e + x_s$$

The time derivative of the foregoing equation provide a basis for additional substitutions $$\frac{dx}{dt} = \frac{dx_e}{dt} + \frac{dx_s}{dt}$$

since the extrusion velocity is given by $$\frac{dx_e}{dt} = \frac{G}{\rho A}$$

and the sag velocity by $$\frac{dx_s}{dt} = \frac{\overline{\sigma}_{xx}}{3\eta_0} x$$

where $\overline{\sigma}_{xx}$ is the applied average tensile stress acting on the parison. Note that the tensile strain rate $\dot{\varepsilon}_{xx}$ given by:

$$\dot{\varepsilon}_{xx} = \frac{1}{x}\frac{dx_s}{dt}$$

is represented in the expression for $$\frac{dx_s}{dt}.$$

The tensile stress $\overline{\sigma}_{xx}$ is due to gravity, therefore:

$$\overline{\sigma}_{xx} = \frac{\rho g}{x}\int_0^x (x-x')dx' = \frac{\rho g x}{2}$$

Combining all results yields the final order, the solution to the non-linear differential equation describing the strain behavior of the parison in extrusion blow molding, $$\frac{dx}{dt} = \frac{G}{\rho A} + \frac{\rho g}{6\eta_0}x^2$$

is subject to the initial condition x=0 at t=0 while extrusion is proceeding, and when extrusion has ceased $$\left(\frac{G}{\rho A} = 0\right),$$

the equation simplifies further to:

$$\frac{dx}{dt} = \frac{\rho g}{6\eta_0}x^2$$

with the initial condition $x = x_f$ at $t = t_e$, where $t_e$ is the extrusion time and $x_f$ is the final parison length attained at the termination of extrusion. A more convenient analysis of these equations is accomplished by recasting them in terms of the following dimensionless variables:

Parison Sag Ratio: $\chi = \dfrac{x}{L_e}$

Dimensionless Extrusion Time: $\tau = \dfrac{Gt}{\rho A L_e} = \dfrac{t}{t_e}$

In the former case, the resulting non-dimensional equation becomes:

$$\frac{d\chi}{d\tau} = 1 + \frac{\rho g t_e L_e}{6\eta_0}\chi^2 = 1 + k\chi^2$$

with the transformed initial condition:

$\chi = 0$ at $\tau = 0$.

The analytical solution to the preceding equation is:

$$\chi(\tau) = \frac{\tan(\sqrt{k}\,\tau)}{\sqrt{k}}$$

where the non-dimensional constant k is given by:

$$k = \frac{\rho g t_e L_e}{6\eta_0}$$

In the latter case the transformed equation is:

$$\frac{d\chi}{d\tau} = k\chi^2$$

with the transformed initial condition:

$\chi = \chi_0$ at $\tau = 1$.

The analytical solution to the preceding equation for $\tau \geq 1$ is:

$$\chi(\tau) = \frac{\chi_0}{1 + \chi_0 k(\tau - 1)}$$

Figure 1:
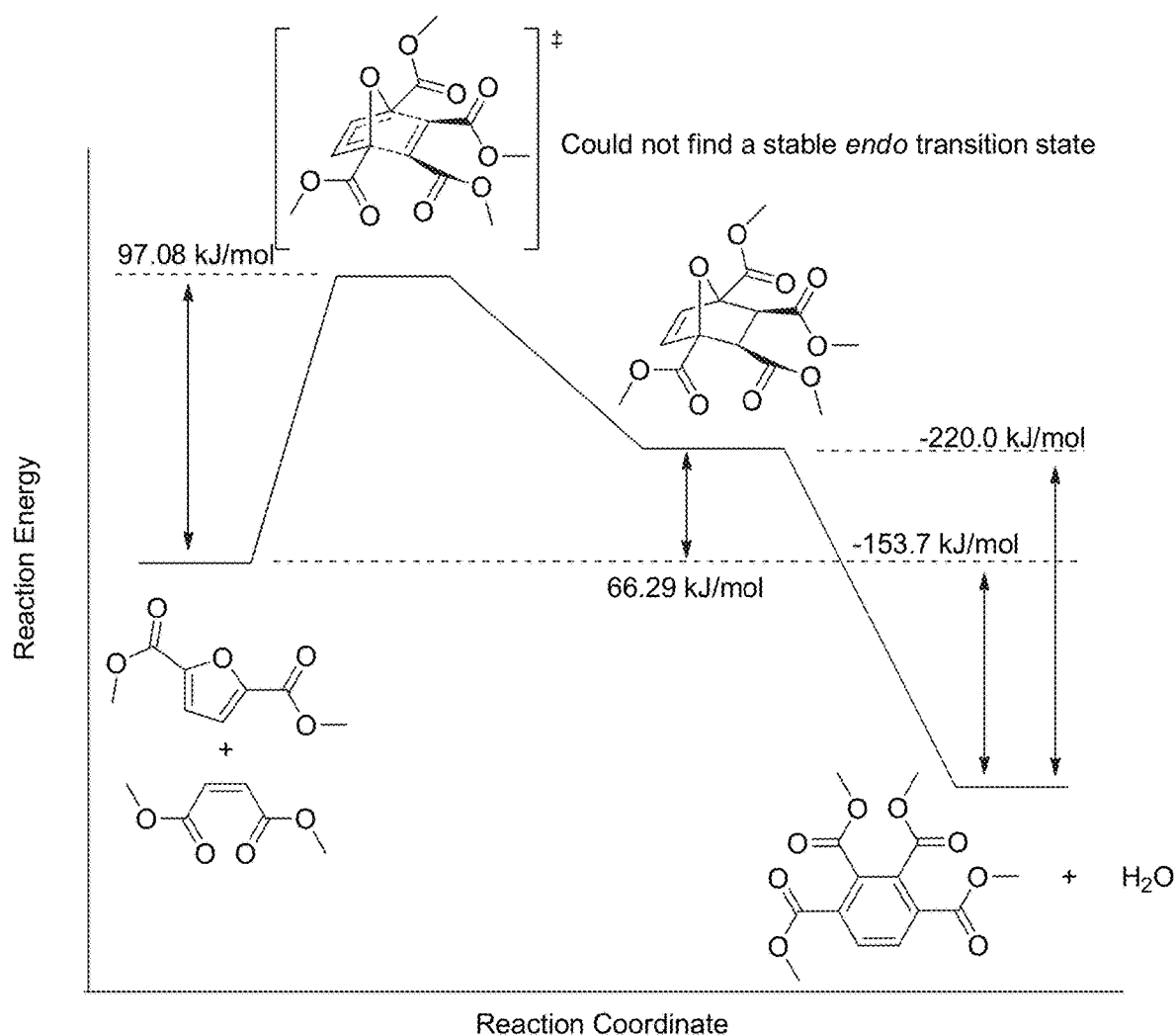
FIG. 1 shows a reaction coordinate diagram for the modeled reaction of dimethylfuran-2,5-dicarboxylate and dimethylmaleate.
Figure 2A:
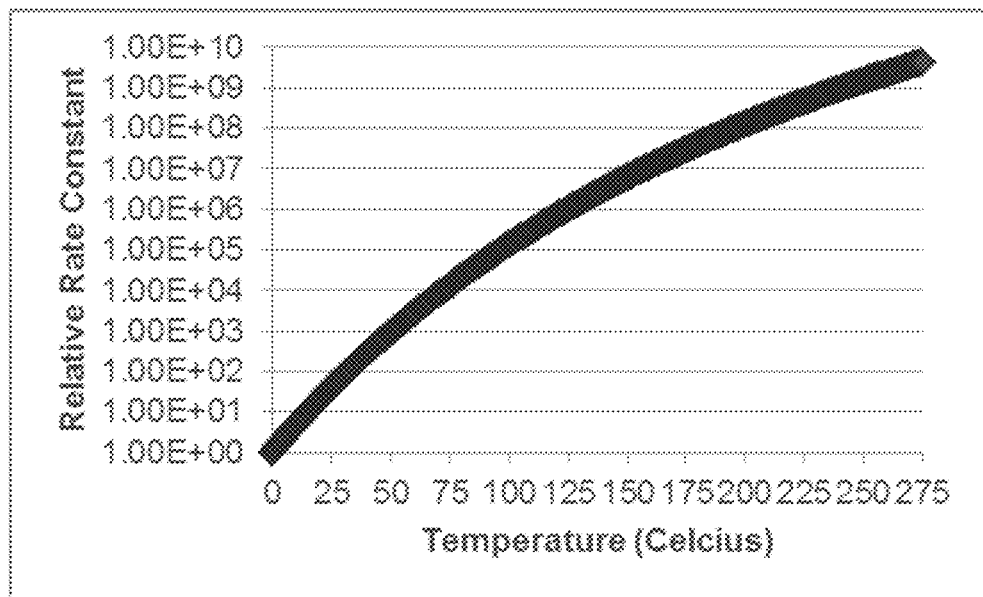
FIG. 2a shows a graph of the relative rate constant for the modeled reaction of dimethylfuran-2,5-dicarboxylate and dimethylmaleate.
Figure 2B:
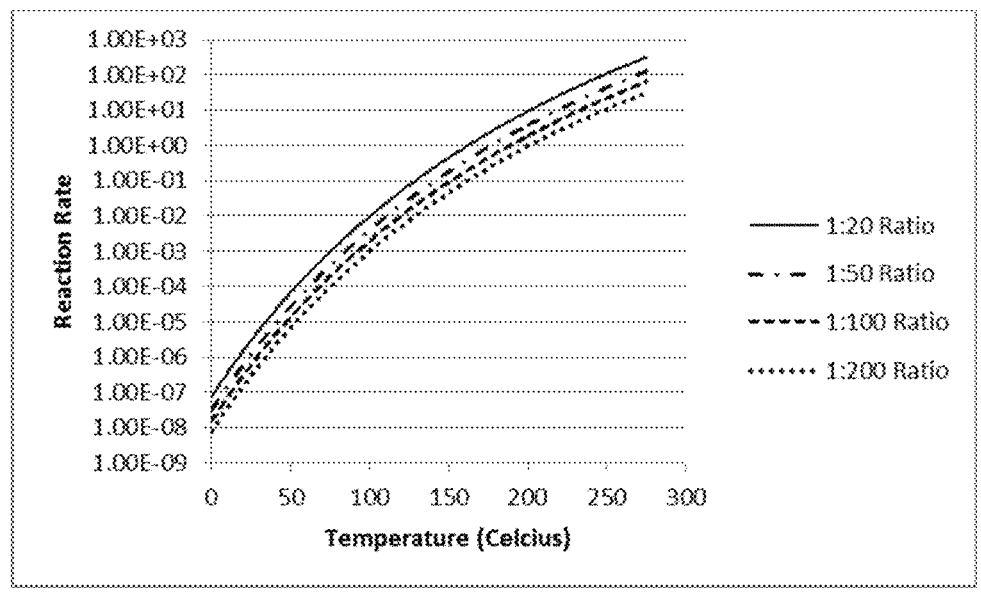
FIG. 2b shows a graph of the rate at different ratios of the reactants over a range of temperatures for the modeled reaction of dimethylfuran-2,5-dicarboxylate and dimethylmaleate.

The solutions to these equations are illustrated in FIG. 1. FIG. 1 highlights the importance of higher zero-shear viscosities in limiting the extent of parison sag in extrusion blow molding operations. FIG. 1 reveals that in progressing from an extruded parison with a PEF zero-shear viscosity similar to that of the unmodified (neat) resin with $\eta_0=1,980$ Pa·s, to a PEF resin modified with 0.050 wt. % PMDA and 0.031 wt. % PENTA with $\eta_0=5,840$ Pa·s, and finally to a modified PEF resin formulated with about 0.12 wt. % PMDA and 0.075 wt. % PENTA with $\eta_0=11,200$ Pa·s, the ultimate extent of parison sag decreases dramatically.

Example 8: Preparation of Resins for Extrusion Blow Molding

One neat (unmodified) PEF resin dried at XXX° C. under vacuum at 120° C. and two reactively modified PEF resins prepared on a Werner & Pfliederer ZSK-30 twin screw extruder (see attached screw element stacking arrangement) and dried under similar conditions are provided for extrusion blow molding evaluation trials on a Bekum 121 extrusion blow molding machine at Preform Technologies LLC in Holland, Ohio using a 38 mm finish, 300 cm³ bottle mold in a single side mold configuration.

Example 9: Extrusion Blow Molding of Neat PEF

Unmodified PEF resin with an intrinsic viscosity of 0.95 dL/g extrudes into a parison on a Bekum 121 extrusion blow molding machine with a single-sided mold placement at 250° C. Melt strength is not sufficient to permit the formation of a viable parison for blow molding.

Example 10: Extrusion Blow Molding of PEF Copolymer

A modified chain architecture PEF resin prepared by melt compounding 0.0500 wt. % PMDA and 0.0312 wt. % PENTA with an intrinsic viscosity of 0.90 dL/g extrudes into a parison on a Bekum 121 extrusion blow molding machine with a single-sided mold placement at 250° C. Melt strength is sufficient to permit the formation of a viable parison for blow molding, but the adverse effects of parison sag are evident in the quality of the 38 mm finish, 300 cm³ blow molded container produced.

Example 11: Extrusion Blow Molding of PEF Copolymer

A modified chain architecture PEF resin prepared by melt compounding 0.1178 wt. % PMDA and 0.1209 wt. % PENTA with an intrinsic viscosity of 0.90 dL/g extrudes into a parison on a Bekum 121 extrusion blow molding machine with a single-sided mold placement at 250° C. Melt strength is sufficient to permit the formation of a viable parison for blow molding, and the effects of parison sag are minimal as a relatively high quality 38 mm finish, 300 cm3 blow molded container blow molded container is produced.

What is claimed is:

1. A PEF container comprising a copolymer consisting essentially of polyethylene furanoate, pyromellitic dianhydride (PMDA), and pentaerythritol (PENTA) wherein the zero sheer viscosity of the copolymer is from about 1× to about 10× the zero sheer viscosity of neat PEF.

2. The container of claim 1, wherein the container is a food or beverage container.

3. The container of claim 1, wherein the container is a beverage bottle.

4. The container of claim 1, wherein the container has at least about 25% decreased creep relative to a similar container formed from PET.

5. The container of claim 1, wherein the container has at least about 25% increased shelf life relative to a similar container formed from PET.

6. The container of claim 1, wherein the container has a shelf-life of at least about 20 weeks.

7. A PEF container formed by a method comprising: (i) providing a preform consisting essentially of a copolymer comprising polyethylene furanoate, pyromellitic dianhydride (PMDA), pentaerythritol (PENTA) and (iii) blow molding the preform to provide a PEF container, wherein the zero sheer viscosity of the copolymer is from about 1× to about 10× the zero sheer viscosity of neat PEF.

8. The container of claim 7, wherein the container is a beverage bottle.

9. The container of claim 7, wherein the container has at least about 25% increased shelf life relative to a similar container formed from PET.

10. The container of claim 9, wherein the at least one chain architecture modifying agent is PMDA.

11. The container of claim 10, wherein the weight percentage of PMDA in the copolymer is between about 0.01 and about 0.90%.

12. The container of claim 9, wherein the at least one chain architecture modifying agent is PENTA.

13. The container of claim 12, wherein the weight percentage of PENTA in the copolymer is about between about 0.010 and about 0.30%.

14. The container of claim 9, wherein the copolymer comprises PMDA in a weight percentage of between about 0.010 and about 0.9% and PENTA in a weight percentage of between about 0.010 and about 0.30%.

15. The container of claim 1, wherein the copolymer has a number average molecular weight of between about 30,000 and about 100,000 daltons (Da).

16. The container of claim 1, wherein the copolymer has a weight average molecular weight ($M_w$), of between about 50,000 and about 180,000 Da.

17. The container of claim 1, wherein the copolymer has an entanglement density between about 0.13 to about 6.7 mol/cm$^3$.

18. The container of claim 1, wherein the copolymer has an entanglement density between about 0.30 and about 0.42 mmol/cm$^3$.

19. The container of claim 1, wherein the container has at least about 25% decreased creep relative to a similar container formed from PET.

20. The container of claim 1, wherein the melt strength of the copolymer is about 1 to about 20× the melt strength of neat PEF.

21. The container of claim 7, wherein the blow molding in (iii) is selected from the group consisting of extrusion blow molding, injection blow molding and injection stretch blow molding.

* * * * *